US009826152B1

(12) United States Patent
Martin et al.

(10) Patent No.: US 9,826,152 B1
(45) Date of Patent: Nov. 21, 2017

(54) SINGLE-UNIT 360-DEGREE CAMERA WITH A MULTIFUNCTIONAL LUMEN

(71) Applicant: SPHERICAM, INC, Dover, DE (US)

(72) Inventors: Jeffrey Martin, Prague (CZ); Servaes Joordens, Haarlem (NL)

(73) Assignee: SPHERICAM INC., Dover, DE (US)

( * ) Notice: Subject to any disclaimer, the term of this patent is extended or adjusted under 35 U.S.C. 154(b) by 0 days.

(21) Appl. No.: 15/362,972

(22) Filed: Nov. 29, 2016

Related U.S. Application Data

(63) Continuation-in-part of application No. 15/288,497, filed on Oct. 7, 2016.

(51) Int. Cl.
*H04N 7/00* (2011.01)
*H04N 5/232* (2006.01)
*H04N 5/225* (2006.01)
*H04N 5/247* (2006.01)
*G02B 13/06* (2006.01)

(52) U.S. Cl.
CPC ......... *H04N 5/23238* (2013.01); *G02B 13/06* (2013.01); *H04N 5/2252* (2013.01); *H04N 5/2254* (2013.01); *H04N 5/2256* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 6,937,266 B2 | 8/2005 | Rui et al. | |
| 7,583,288 B2 | 9/2009 | Uyttendaele et al. | |
| 8,106,932 B2 | 1/2012 | Yoshimura | |
| 8,228,364 B2 | 7/2012 | Cilia | |
| 2010/0111489 A1 | 5/2010 | Presler | |
| 2014/0267596 A1* | 9/2014 | Geerds | H04N 5/2252 348/38 |
| 2016/0059770 A1* | 3/2016 | Ji | B60Q 1/24 348/159 |

OTHER PUBLICATIONS http://www.nico360.com/#technology (downloaded Aug. 2, 2016).
The fourth wall: https//en.wikipedia.org/wiki/Fourth_wall.

* cited by examiner

*Primary Examiner* — James M Anderson, II
(74) *Attorney, Agent, or Firm* — Brian S. Boyer; Syndicated Law, PC

(57) ABSTRACT

Single-unit, 360-degree cameras are provided with lighting arrays and a multifunctional lumens, as well as systems and methods for mounting, moving, and/or cooling the cameras such that the operator, lighting, and carriers of the camera are at least substantially invisible to the lens of the camera when taking a spherical image.

19 Claims, 38 Drawing Sheets

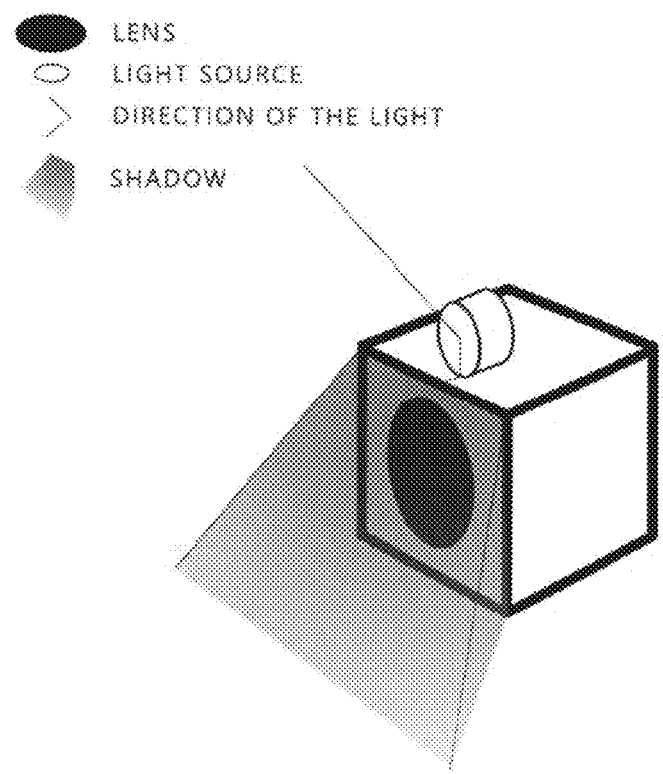
FIG. 7A
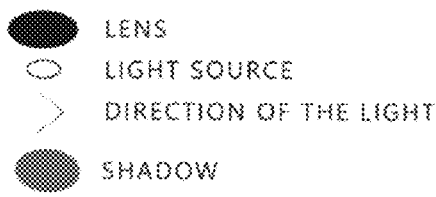
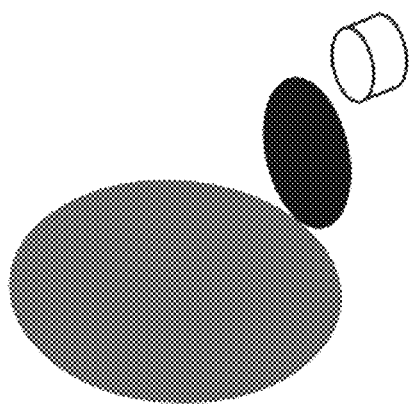
FIG. 7B

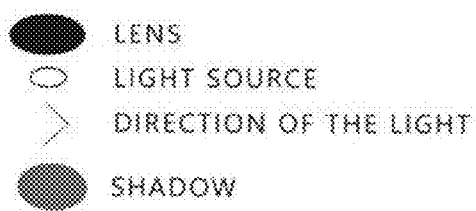
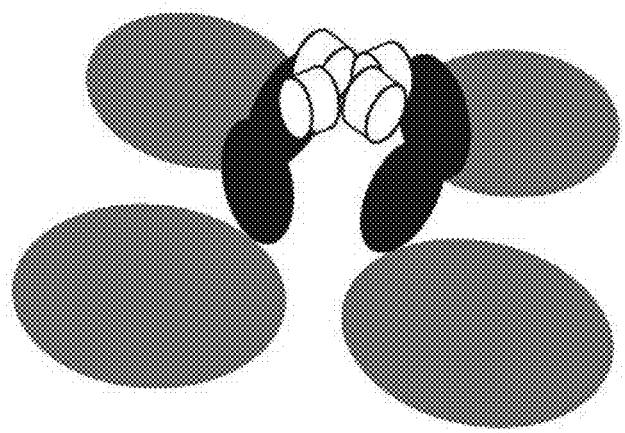
FIG. 7C
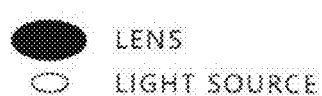
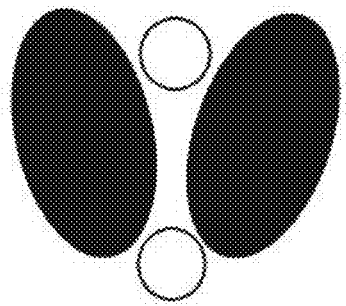
FIG. 7D

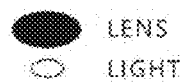
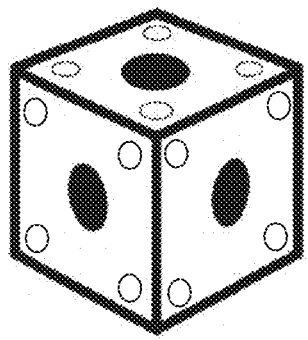
FIG. 8A
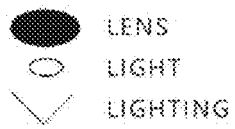
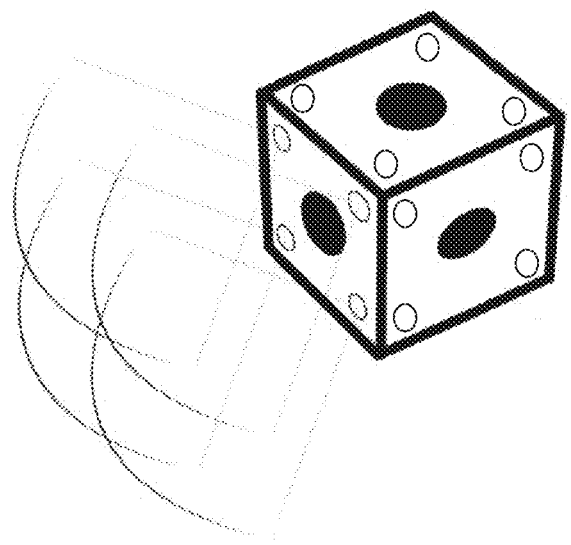
FIG. 8B cuboctahedron snub cuboctahedron chiral form of snubcuboctahedron

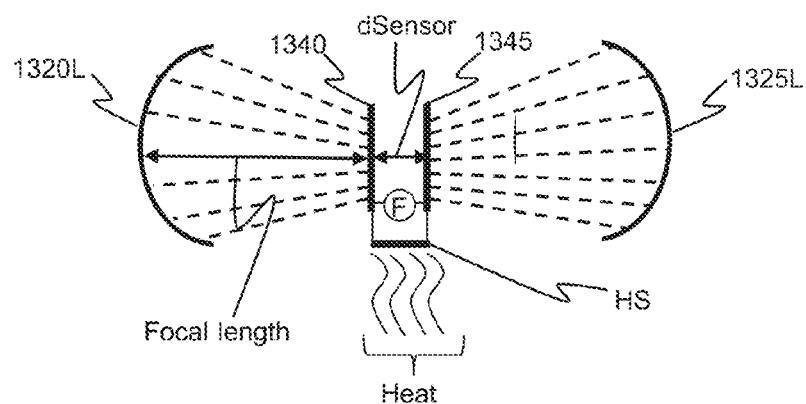
FIG. 13A
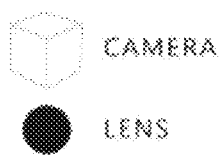
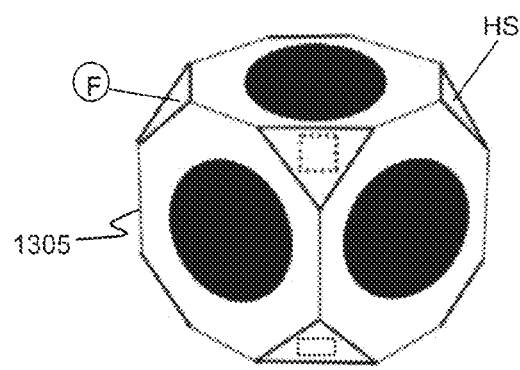
FIG. 13B

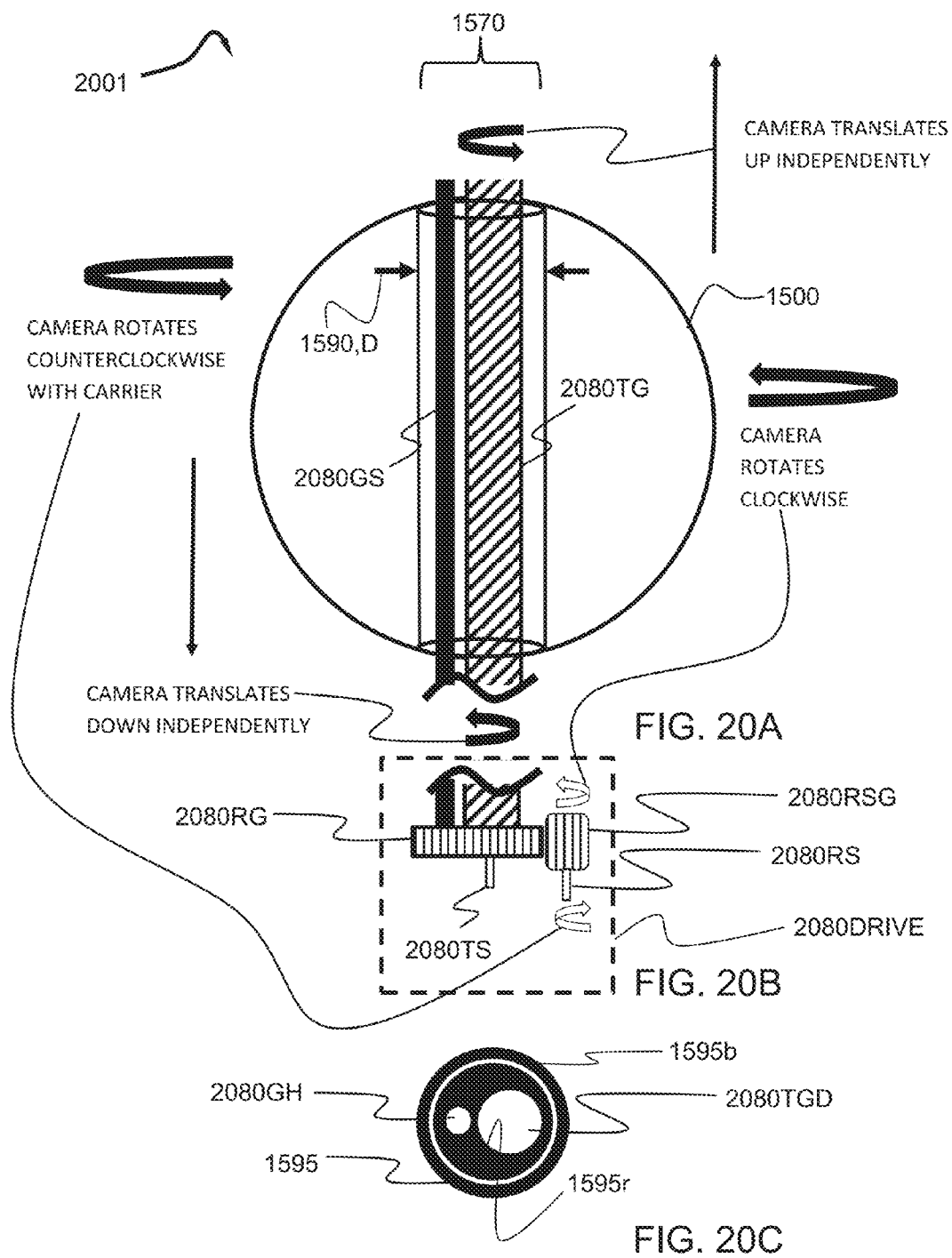

SINGLE-UNIT 360-DEGREE CAMERA WITH A MULTIFUNCTIONAL LUMEN

CROSS-REFERENCE TO RELATED APPLICATIONS

This application is a continuation-in-part of U.S. application Ser. No. 15/288,497, filed Oct. 7, 2016, which is hereby incorporated herein by reference in its entirety.

BACKGROUND

Field of the Invention

The teachings are directed to single-unit, 360-degree camera with a multifunctional lumen, as well as systems and methods for mounting, moving, and/or cooling the camera such that the operator of the camera is at least substantially invisible to the lens of the camera when taking a spherical image.

Description of the State-of-the-Art

Cinematography often requires camera movement for composition and scene construction, as different shots are needed to form a clear, cohesive narrative that is visually pleasing to a viewer. A problem in the art of spherical imaging, however, is in the mounting, moving, and cooling of a 360-degree camera that is used in taking the spherical image. Whereas the systems used to mount and move a standard camera (not a 360-degree camera) can be placed out of the field of view of the camera. Unfortunately, however, there are currently no systems and methods for moving a 360-degree camera without an operator becoming visible in the field of view of the spherical image, and while enhancing image stability and clarity. For example, one of skill would appreciate systems and methods for moving a 360-degree camera in any needed manner, keeping the image clear, unshaken, and stable, including (i) a pedestal motion (moving the camera up and/or down without changing the orientation of the vertical or horizontal axis), (ii) a dolly motion (moving the camera to and/or from the object being imaged), (iii) a truck motion (moving the camera left and/or right while maintaining the perpendicular relationship to the object being imaged), (iv) a pan motion (pivoting the camera on a fixed vertical axis to "pan" and change the field of view), and/or (v) a tilt motion (pivoting the camera on a fixed horizontal axis to "tilt" and change the field of view) without the operator becoming visible in the spherical image and while enhancing image stability and clarity.

Another problem in the art of spherical imaging is the inability of current systems to dissipate heat effectively. This is because the use of a plurality of cameras in a single-unit device currently requires having a plurality of camera electronics enclosed in the camera housing without sufficient heat transfer for cooling. This creation of heat can shorten the life of the camera and, at the very least, also shorten the length of time possible for filming before the operator feels the need to allow the camera to cool. One of skill will appreciate having a way to increase the dissipation of heat in order to keep the 360-degree camera cool.

Another problem in the art of spherical imaging is obtaining a desired amount of lighting without the lighting apparatus being visible in the spherical image. This is because the additional/sufficient/enhanced lightning that is desired over a scene is hard to achieve because there is no such thing as "behind the camera" in a panoramic video, for example. Current technology uses flooded lighting in the environment in which a spherical image is taken. The problem is that the lighting is often insufficient, and the only solution, currently, is to use an adjacent, independent source of lighting that needs to move independent of the spherical camera, which means the problem still remains that the lighting source is visible to the camera.

One of skill will appreciate having a solution to this problem, namely, a single unit, 360-degree camera with a lighting array, a carrier, or a combination of a lighting array and carrier, either or both being attached to the camera in a way that is at least substantially invisible to the lens of the camera when taking a spherical image.

SUMMARY

The teachings are directed to camera devices, systems that include those devices, and methods for mounting, moving, and cooling the device. The device can be, for example, a single-unit, 360-degree camera such that the operator of the camera is at least substantially invisible to the lens of the camera when taking a spherical image. In some embodiments, the single-unit, 360-degree camera has an integrated lighting array that is fixably attached to the camera or removably attached to the camera, the lighting array being at least substantially invisible to the lens of the camera when taking a spherical image.

The methods can include creating a 360 degree camera as a single unit with a lumen having an inlet port and an exit port is provided. The creating can include selecting a housing for the 360 degree camera, the housing configured (i) for passage of the lumen with the inlet port and the exit port and (ii) to have a plurality of surfaces that includes at least a first outer surface and a second outer surface, the lumen having a luminal surface for releasably mounting the camera to a carrier; positioning a plurality of lenses on the housing to collect a plurality of imaging spaces that are stitched together to form the spherical image, the plurality of lenses including a first lens on the first outer surface to collect a first imaging space and a second lens on the second outer surface to collect a second imaging space; operably connecting a plurality of image sensors to the plurality of lenses, each of the plurality of image sensors operably connected to a respective lens in the plurality of lenses, the operably connecting including placing a first image sensor in the housing behind the first lens and a second image sensor in the housing behind the second lens; configuring each of the image sensors for operably connecting to (i) a circuit that includes a processor and a memory on a non-transitory computer readable storage medium; and, (ii) a power source; and, defining a plurality of blind spaces, n, each of which includes a blind area on the housing, the plurality of blind spaces including an inlet port blind space that is at least substantially excluded from the plurality of imaging spaces, the inlet port blind space including the inlet port of the lumen; and, an outlet port blind space that is at least substantially excluded from the plurality of imaging spaces, the outlet port blind space including the outlet port of the lumen.

The cameras themselves are, of course provided by the teachings. For example, the teachings provide a 360 degree camera having a lumen for mounting, moving, and/or cooling the camera in a manner that is at least substantially invisible to the camera when acquiring a spherical image. And, the cameras can include a housing having a plurality of surfaces that includes at least a first outer surface, and a second outer surface, the housing configured (i) for passage of the lumen having an inlet port and an exit port and (ii) to have a plurality of surfaces that includes at least a first outer surface and a second outer surface; a plurality of lenses on the housing, the plurality of lenses configured to collect a plurality of imaging spaces that are stitched together to form the spherical image, the plurality of lenses including at least a first lens on the first outer surface and a second lens on the second outer surface; wherein, the first lens is configured to obtain a first image data set corresponding to a first imaging space and the second lens is configured to obtain a second image data set corresponding to a second imaging space; a plurality of image sensors in the housing, each of the plurality of image sensors configured for operably connecting to a respective lens in the plurality of lenses, the plurality of image sensors including at least a first image sensor placed in the camera housing behind the first lens and a second image sensor placed in the camera housing behind the second lens; a circuit that includes a processor and a memory on a non-transitory computer readable storage medium; a power source; and, a plurality of blind spaces, n, each of which include a blind area on the housing, the plurality of blind spaces including an inlet port blind space that is at least substantially excluded from the plurality of imaging spaces, the inlet port blind space including the inlet port of the lumen; and, an outlet port blind space that is at least substantially excluded from the plurality of imaging spaces, the outlet port blind space including the outlet port of the lumen.

Where an integrated lighting array is desired, the plurality of blind spaces, n, can include (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing; and, a plurality of light sources, n–x, where x ranges from 0 to (n–4), are integrated into the plurality of blind spaces, each of plurality of light sources placed in one of the plurality of blind spaces such that the plurality of light sources is at least substantially invisible to the camera when acquiring the plurality of imaging spaces, the plurality of light sources including a first light source in the first blind area and a second light source in the second blind area.

It should be appreciated that one of skill will select a carrier that is appropriate for a given camera shoot and location, as the ability to use the carrier will depend, at least in part, on the environment in which the camera shoot is occurring. In some embodiments, for example, the carrier can include a wire; rope; cable; rod; a conductive carrier such as a conductive metal, polymer, or optical fiber; or, a combination thereof.

Since lighting arrays can be added to the cameras taught herein, the methods can include defining the plurality of blind spaces, n, to include (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing; and, integrating a plurality of light sources, n–x, where x ranges from 0 to (n–4), into the plurality of blind spaces, the integrating including placing each of plurality of light sources placed in one of the plurality of blind spaces such that the plurality of light sources is at least substantially invisible to the camera when acquiring the plurality of imaging spaces, the placing including installing a first light source in the first blind area and a second light source in the second blind area.

Numerous camera housing shapes are possible for the cameras taught herein, virtually infinite in theory. For example, in some embodiments, a camera housing having up to 50 sides, 40 sides, 30 sides, 20 sides, 10 sides, 4 sides, or any number of sides therein in increments of 1 side, can be used. In fact, in some embodiments, the housing is a 4-sided polyhedron, a 6-sided polyhedron, an 8-sided polyhedron, a 12-sided polyhedron, or a 20-sided polyhedron. In fact, in some embodiments, the housing is a cuboctahedron, or a snub cuboctahedron. And, in some embodiments, the housing is a cylinder, a sphere, or a spherocylinder (capsule).

The teachings also provide systems. The systems can include any camera taught herein, for example, a camera having a lumen; and, a carrier for the camera. The carrier can include any means for mounting the camera at a desired location to obtain the spherical image. In some embodiments, the carrier can be selected from the group consisting of a wire, rope, cable, rod, optical fiber, or a combination thereof. And, since the lighting arrays can also be included, the systems can also comprise a lighting array for integrating with any of the cameras taught herein.

The teachings also provide methods of mounting and/or moving the cameras taught herein at a desired location for obtaining a spherical image. For example, the methods can include installing a carrier to at least a single point of attachment for mounting the camera at a desired location to obtain the spherical image, the carrier including at least a first point of attachment; and, releasably attaching the carrier to the camera, the releasably attaching including inserting the carrier in and/or through the lumen. The methods can also include moving the camera to a second desired location using a carrier that can include, for example, a wire, rope, cable, rod, or optical fiber. And, since an integrated lighting array can be added, the methods also include defining the plurality of blind spaces, n, to include (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing; and, integrating a plurality of light sources, n–x, where x ranges from 0 to (n–4), into the plurality of blind spaces, the integrating including placing each of plurality of light sources placed in one of the plurality of blind spaces such that the plurality of light sources is at least substantially invisible to the camera when acquiring the plurality of imaging spaces, the placing including installing a first light source in the first blind area and a second light source in the second blind area.

BRIEF DESCRIPTION OF THE DRAWINGS

FIGS. 7A through 7D illustrate the problem of shadowing due to lighting apparatus that remains visible to a camera while acquiring an image, and a solution to the problem, according to some embodiments.

FIGS. 8A through 8D illustrate the problem of hot spots and cold spots due to lighting that overlaps and is visible to the camera while acquiring an image, and a solution to the problem, according to some embodiments.

FIGS. 13A and 13B illustrate the miniaturization of a 360-degree camera using the camera configurations taught herein, according to some embodiments.

FIGS. 20A through 20C illustrate a system for translational and rotational movement of a 360-degree camera independent of the carrier using mechanical force, according to some embodiments.

DETAILED DESCRIPTION

The teachings are directed to a single unit, 360-degree camera with an integrated lighting array, fixably attached to the camera or removably attached to the camera, the lighting array being at least substantially invisible to the lens of the camera when taking a spherical image. In some embodiments, the image can be a "still" image. In some embodiments, the image can be a video image. And, in some embodiments, the image can be a combination of still and video images.

One of skill will appreciate that the term "integrated" refers to the parts of the methods, systems, and devices taught herein being linked or coordinated. For example, the lighting arrays are integrated with the 360-degree cameras taught herein because they are coordinated with the plurality of lenses on the camera. Such integrated lighting arrays can be fixably connected to the cameras taught herein, or they can be removable. One of skill will appreciate that the phrase "substantially", as used herein, refers to an object being "at least substantially invisible" to the lens of a camera, or "at least substantially excluded" from the field of view of lens, for example. In some embodiments, the object may include a light source, such as the integrated lighting arrays taught herein. In some embodiments, the object may include an operator of the camera or lighting for the camera. As such, the phrase can be referring to either completely excluding an object from an image obtained by the camera by placing it in a blind space, as taught herein, or excluding the object to a great degree, such that the object can be removed in the process of assembling the image, referred to as "stitching" in some embodiments. An operator of the camera, or lighting array, can also be excluded, for example, using a camera moving or cooling system as taught herein. The phrase is also used to teach "The computer processor and memory can be at least substantially entirely contained in the 360-degree camera, near the periphery", which will be understood by those of skill as meaning the processor and memory are brought at or near the surface of the periphery of the 360-degree camera to increase cooling and decrease size of the camera. In some embodiments, these components are either contained below the surface or mainly below the surface, although some of the components may be palpable at the surface of the device. Likewise, one of skill will understand the term "about" to mean that the method, system, or device can vary from the amount taught as long as the deviation does not create a noticeable change in the desired effect, function, or performance from the amount taught.

Figure 1A:
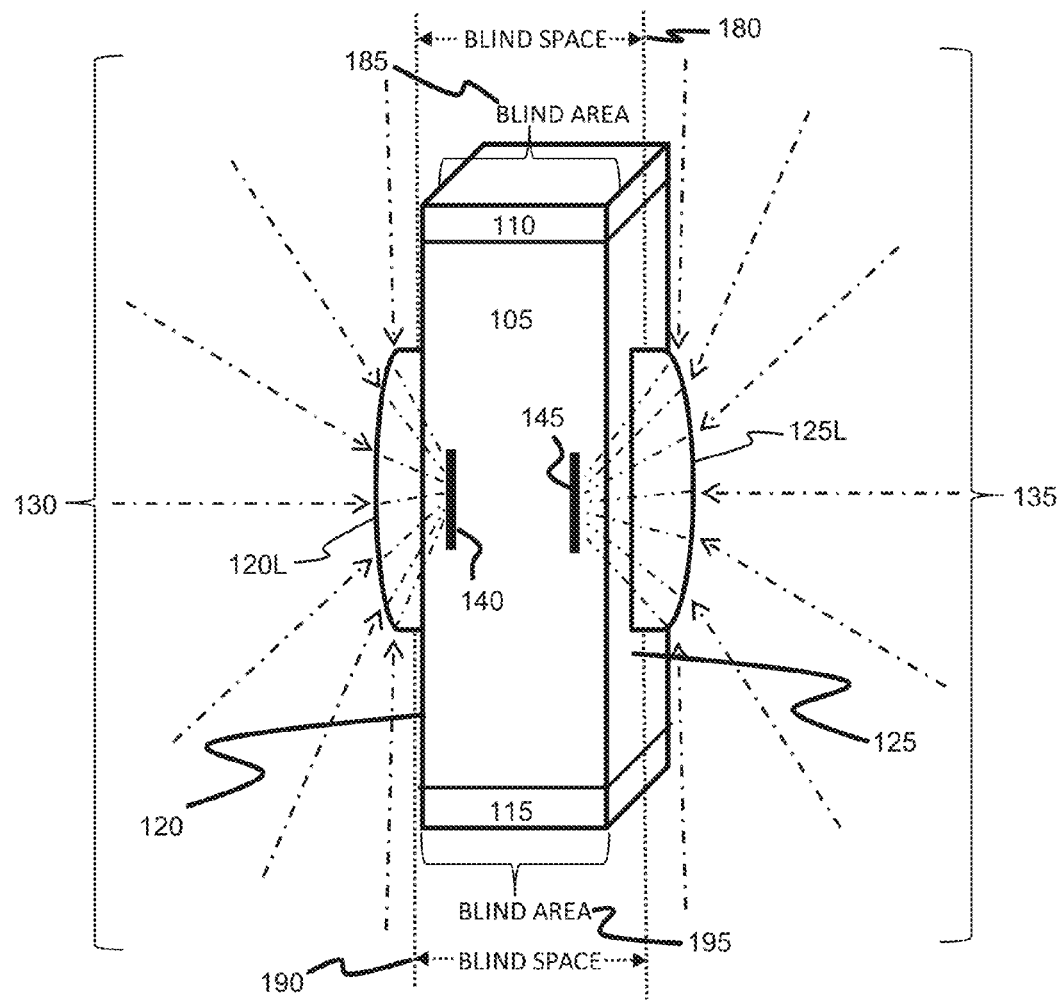
FIGS. 1A and 1B illustrate a single unit, 360-degree camera with an integrated lighting array that is at least substantially invisible to the camera when taking a spherical image, according to some embodiments.
Figure 1B:
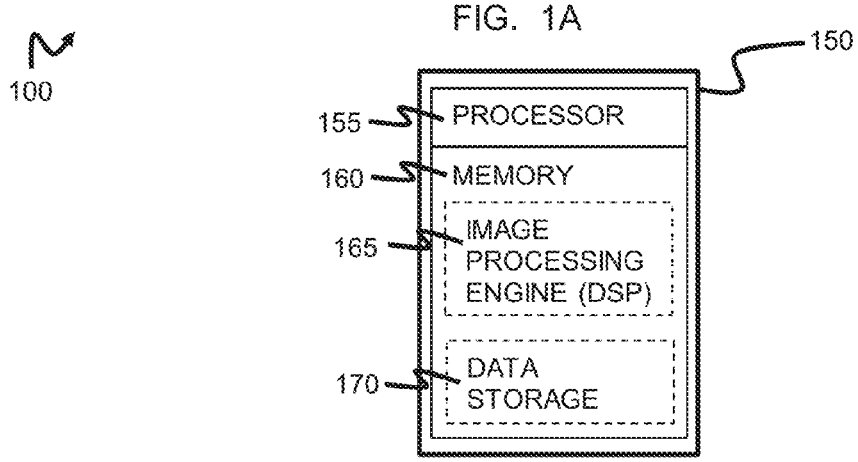

FIGS. 1A and 1B illustrate a single unit, 360-degree camera with an integrated lighting array that is at least substantially invisible to the camera when taking a spherical image, according to some embodiments. Methods of creating the 360 degree camera are provided herein. In these methods, the creating includes selecting a housing 105 for the 360 degree camera 100, the housing 105 (i) configured to carry an integrated lighting array 110,115 and (ii) having a plurality of surfaces 120,125 that includes at least a first outer surface 120 and a second outer surface 125; and, positioning a plurality of lenses 120L,125L on the housing 105 to collect a plurality of imaging spaces 130,135 that are stitched together to form a spherical image. The plurality of lenses 120L,125L can include a first lens 120 on the first outer surface 120 to collect a first imaging space 130 and a second lens 125 on the second outer surface 125 to collect a second imaging space 135.

A plurality of image sensors 140,145 are operably connected to the plurality of lenses 120L,125L, each of the plurality of image sensors 140,145 operably connected to a respective lens in the plurality of lenses 120L,125L, wherein a first image sensor 140 is positioned in the housing 105 behind the first lens 120L and a second image sensor 145 is positioned in the housing 105 behind the second lens 125L. Since the methods can include various ways of implementing computers, the methods can include configuring each of the image sensors 140,145 for operably connecting to (i) a circuit 150 that includes a processor 155 and a memory 160 on a non-transitory computer readable storage medium; and, (ii) a power source (not shown). In order to keep the lighting array 110,115 at least substantially invisible to the lenses 120L,125L of the camera 100, the methods can include defining a plurality of blind spaces 180,190, n, each of which includes a blind area 185,195 on the housing 105, the plurality of blind spaces 180,190 including (i) a first blind space 180 that is at least substantially excluded from the plurality of imaging spaces 130,135, the first blind space 180 including a first blind area 185 on the housing 105; and, (ii) a second blind space 190 that is at least substantially excluded from the plurality of imaging spaces 130,135, the second blind space 190 including a second blind area 195 on the housing 105. The methods can include integrating a plurality of light sources 110,115, n–x, where x ranges from 0 to (n–2), into the plurality of blind spaces 180,190, the integrating including placing each of the plurality of light sources 110,115 in one of the plurality of blind spaces 180,190 such that the plurality of light sources 110,115 is at least substantially invisible to the camera 100 when acquiring the plurality of imaging spaces 130,135, the placing including installing a first light source 110 in the first blind area 185 and a second light source 115 in the second blind area 195.

In some embodiments, the methods include operably connecting the circuit 150 that includes the processor 155 and the memory 160 on the non-transitory computer readable storage medium to the image sensor 140,145. Likewise, in some embodiments, the methods include operably connecting the circuit 150 that includes the processor 155 and the memory 160 on a non-transitory computer readable storage medium to the image sensor 140,145; and, a power source (not shown). And, in some embodiments, the memory 160 includes an image processing engine (DSP) 165 and data storage 170.

Consequently, a 360 degree camera having an integrated lighting array that is invisible to the camera when acquiring a spherical image is also provided herein. The camera can include a housing having a plurality of surfaces that includes at least a first outer surface, and a second outer surface; and, a plurality of lenses on the housing, the plurality of lenses configured to collect a plurality of imaging spaces that are stitched together to form the spherical image, the plurality of lenses including at least a first lens on the first outer surface and a second lens on the second outer surface. In these embodiments, the first lens can be configured to obtain a first image data set corresponding to a first imaging space and the second lens can be configured to obtain a second image data set corresponding to a second imaging space.

It should be appreciated by those of skill that the camera housing needs to be configured such that there are at least two sides of the camera that are at least substantially invisible to at least two lenses configured to capture a 360 degree image. As such, there are numerous camera housing shapes that are possible, virtually infinite in theory. For example, in some embodiments, a camera housing having up to 50 sides, 40 sides, 30 sides, 20 sides, 10 sides, 4 sides, or any number of sides therein in increments of 1 side, can be used. In fact, in some embodiments, the housing is a 4-sided polyhedron, a 6-sided polyhedron, an 8-sided polyhedron, a 12-sided polyhedron, or a 20-sided polyhedron. In fact, in some embodiments, the housing is a cuboctahedron, or a snub cuboctahedron. And, in some embodiments, the housing is a cylinder, a sphere, or a spherocylinder (capsule). One of skill will appreciate that the term "side" can be used to refer to a side of a polyhedron and, in some embodiments, it can be used to refer to an area of a housing that does not have demarcated sides, per se, such as a sphere or a spherocylinder, in some embodiments.

Figure 2A:
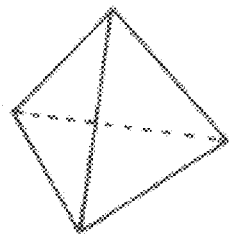
FIGS. 2A through 2L illustrate various shapes that may be used for a camera housing, according to some embodiments.
Figure 2B:
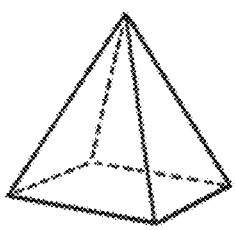
Figure 2C:
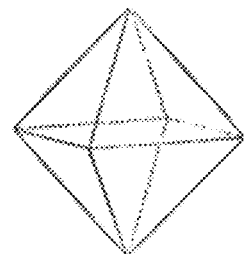
Figure 2D:
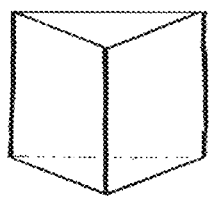
Figure 2E:
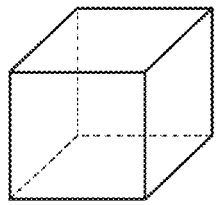
Figure 2F:
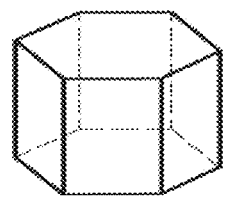
Figure 2G:
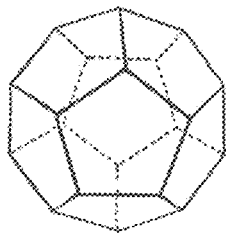
Figure 2H:
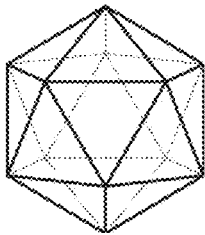
Figure 2I:
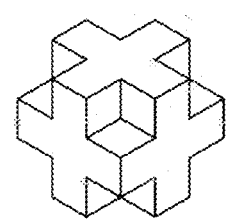
Figure 2J:
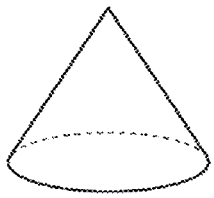
Figure 2K:
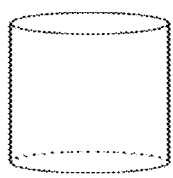
Figure 2L:
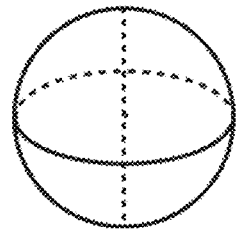

FIGS. 2A through 2L illustrate various shapes that may be used for a camera housing, according to some embodiments. The shape of the camera can be determined by the number of lenses we want to use in the camera. FIG. 2A illustrates a 4-sided polyhedron with 4 vertices that could each serve as a blind area for placement of a light, a mounting device (also referred to as a carrier, in some embodiments), or other component that can be kept at least substantially invisible to the lenses of the camera. FIGS. 2B and 2D illustrate 5-sided polyhedrons, FIG. 2B showing a 5-sided polyhedron with 5 such vertices, and FIG. 2D, on the other hand, offering 6 such vertices. FIG. 2E illustrates a 6-sided polyhedron with 8 such vertices. FIG. 2F illustrates a polyhedron an 8-sided polyhedron with 12 such vertices. FIG. 2G illustrates a 12-sided polyhedron with 20 such vertices. FIG. 2H illustrates a 20-sided polyhedron with only 12 vertices. FIG. 2I illustrates a polyhedron, possibly a modified form of FIG. 2E, wherein the 8 vertices have been countersunk or recessed to a desired shape, to accept the insertion of any of a variety of components into the blind areas. FIG. 2J is an example of a shape that has only one vertex but includes many other opportunities to place components where they can be kept at least substantially invisible to the lenses of the camera such as, for example, by placing them in a blind area anywhere around the circumference of the circular side of the polyhedron of FIG. 2J. FIG. 2K shows no vertex but plenty of blind areas anywhere around either circumference of either circular side of the polyhedron. FIG. 2L is technically not a polyhedron, but it is included as a desirable shape, as one of skill will recognize that there are several lens configurations having the potential of plenty of blind areas anywhere around the sphere.

In some embodiments, a suitable panoramic video can be obtained with minimum of two lenses, placed back-to-back, and with angle of view at least 180-degrees each. In some embodiments, a multiple-lens solution can use a pyramid-shaped camera housing for 4-lens configuration and, in some embodiments, a cube-shaped camera housing can be used for a 6-lens configuration. Any number of lenses can be used. In some embodiments, the camera can be configured with 2 lenses, 3 lenses, 4 lenses, 5 lenses, 6 lenses, 7 lenses, 8 lenses, 9 lenses, 10 lenses, 11 lenses, 12 lenses, 13 lenses, 14 lenses, 15 lenses, 16 lenses, 17 lenses, 18 lenses, 19 lenses, or 20 lenses.

One of skill should appreciate that, in any of the embodiments taught herein, components added into one or more blind areas can be independently select, alone or in combination, for example, to include one or more (i) lights; (ii) light sensors; (iii) mounting hardware or devices; (iv) computer hardware including, for example, processor, memory; (v) input/output ports; (vi) speaker/microphone; (vii) state selectors; (viii) video/LED screen graphical interface; (ix) Wi-Fi/Bluetooth; (x) a power source; and the like.

In some embodiments, the angle-of-view, or field-of-view, of the lenses can be set at a desired percentage, adjusted for the shape of the housing, and one lens per side can be used. Such a configuration designs a blind space at each corner between the lenses. In some embodiments, for example, the design would create 4 blind spaces in a pyramid-shaped housing, 8 blind spaces in a cube-shaped housing, and so on. One of skill in the art of acquiring images and designing cameras will appreciate that the lenses can be independently selected and/or designed for the camera, or for particular positions on the camera.

One of skill will appreciate that several angles-of-view can be implemented, and selected independently, when selecting and placing each of the plurality of lenses around the 360 degree camera. For comparison to the selection of an angle-of-view for the camera's taught herein, the human eye provides us with a perceived angle-of-view of about 140° by 80° In some embodiments, the lens of the camera can be a fisheye lens with an angle of view that can range, for example, from about 114° to about 180° or greater. In some embodiments, the lens can be an ultrawide angle lens with an angle of view that can range, for example, from about 84° to about 114°. In some embodiments, the lens can be a wide angle lens with an angle of view that can range, for example, from about 64° to about 84°. In some embodiments, the lens can be a normal or standard angle lens with an angle of view that can range, for example, from about 40° to about 62°. In some embodiments, the lens can be a long focus lens with an angle of view that can range, for example, from about 0.5° to about 35°, where a medium telephoto lens ranges from about 10° to about 30°, and a super telephoto lens ranges from about 0.5° to about 8°.

Likewise, in some embodiments, the lens can be a fisheye lens with a focal length that can range, for example, from about 8 mm to about 10 mm for a circular image and about 15 mm to about 16 mm for a full-frame image. In some embodiments, the lens can be an ultrawide angle lens with a focal length that can range, for example, from about 14 mm to about 24 mm. In some embodiments, the lens can be a wide angle lens with a focal length that can range, for example, from about 24 mm to about 35 mm. In some embodiments, the lens can be a normal or standard angle lens with a focal length that can range, for example, from about 36 mm to about 60 mm. In some embodiments, the lens can be a long focus lens with a focal length that can range, for example, from about 85 mm to about 300 mm or greater, where a medium telephoto lens ranges from about 85 mm to about 135 mm, and a super telephoto lens can be, for example about 300 mm, ranging from about 135 mm to about 300 mm or greater. In some embodiments, the focal length can be about 2 mm, about 12 mm, about 14 mm, about 16 mm, about 20 mm, about 24 mm, about 35 mm, about 50 mm, about 70 mm, about 85 mm, about 105 mm, about 200 mm, about 300 mm, about 400 mm, about 500 mm, about 600 mm, about 700 mm, about 800 mm, about 1200 mm, or any focal length therein in increments of 1 mm.

A plurality of image sensors are operably connected to the plurality of lenses, each of the plurality of image sensors operably connected to a respective lens in the plurality of lenses, wherein a first image sensor is positioned in the housing behind the first lens and a second image sensor is positioned in the housing behind the second lens. One of skill in the art of acquiring images and designing cameras will appreciate that the image sensors can be independently selected and/or designed for the camera, or for particular positions on the camera. The image sensor format is the shape and size of the image sensor.

The image sensor format, or optical format, can be selected to determine the angle-of-view of a particular lens. The following table provides examples of optical formats that may be used with the methods and systems taught herein:

| Sensor Type | Diagonal (mm) | Width (mm) | Height (mm) | Area (mm$^2$) | Stops (area) | Crop factor[32] |
|---|---|---|---|---|---|---|
| 1/10" | 1.60 | 1.28 | 0.96 | 1.23 | −9.51 | 27.04 |
| 1/8" | 2.00 | 1.60 | 1.20 | 1.92 | −8.81 | 21.65 |
| 1/6" (Panasonic SDR-H20, SDR-H200) | 3.00 | 2.40 | 1.80 | 4.32 | −7.64 | 14.14 |
| 1/4" | 4.00 | 3.20 | 2.40 | 7.68 | −6.81 | 10.81 |
| 1/3.6" (Nokia Lumia 720)[1] | 5.00 | 4.00 | 3.00 | 12.0 | −6.16 | 8.65 |
| 1/3.2" (iPhone 5) | 5.68 | 4.54 | 3.42 | 15.50 | −5.80 | 7.61 |
| Standard 8 mm film frame | 5.94 | 4.8 | 3.5 | 16.8 | −5.73 | 7.28 |
| 1/3" (iPhone 5S, iPhone 6) | 6.00 | 4.80 | 3.60 | 17.30 | −5.64 | 7.21 |
| 1/2.7" | 6.72 | 5.37 | 4.04 | 21.70 | −5.31 | 6.44 |
| Super 8 mm film frame | 7.04 | 5.79 | 4.01 | 23.22 | −5.24 | 6.15 |
| 1/2.5" (Nokia Lumia 1520, Sony Cyber-shot DSC-T5) | 7.18 | 5.76 | 4.29 | 24.70 | −5.12 | 6.02 |
| 1/2.3" (Pentax Q) (Sony Cyber-shot DSC-W330)(gopro hero 3) (Panasonic HX-A500) | 7.66 | 6.17 | 4.55 | 28.50 | −4.99 | 5.64 |
| 1/2.3" (Sony Exmor IMX220) | 7.87 | 6.30 | 4.72 | 29.73 | −4.91 | 5.49 |
| 1/2" (Fujifilm HS30EXR) (Espros EPC 660) | 8.00 | 6.40 | 4.80 | 30.70 | −4.87 | 5.41 |
| 1/1.8" (Nokia N8) (Olympus C-5050, C-5060, C-7070) | 8.93 | 7.18 | 5.32 | 38.20 | −4.50 | 4.84 |
| 1/1.7" (Pentax Q7, Canon G10, G15) | 9.50 | 7.60 | 5.70 | 43.30 | −4.32 | 4.55 |
| 1/1.6" | 10.07 | 8.08 | 6.01 | 48.56 | −4.15 | 4.30 |
| 2/3" (Nokia Lumia 1020, Fujifilm X-S1, X20, XF1) | 11.00 | 8.80 | 6.60 | 58.10 | −3.89 | 3.93 |
| Standard 16 mm film frame | 12.7 | 10.26 | 7.49 | 76.85 | −3.49 | 3.41 |
| 1/1.2" (Nokia 909 PureView) | 13.33 | 10.67 | 8.00 | 85.33 | −3.34 | 3.24 |
| Blackmagic Pocket Cinema Camera & Blackmagic Studio Camera | 14.32 | 12.48 | 7.02 | 87.6 | −3.30 | 3.02 |
| Super 16 mm film frame | 14.54 | 12.52 | 7.41 | 92.80 | −3.22 | 2.97 |
| 1" Sony RX100 and RX10, Nikon CX, Samsung NX Mini | 15.86 | 13.20 | 8.80 | 116 | −2.90 | 2.72 |
| 1" Digital Bolex d16 | 16.00 | 12.80 | 9.60 | 123 | −2.81 | 2.70 |
| Blackmagic Cinema Camera EF | 18.13 | 15.81 | 8.88 | 140 | −2.62 | 2.38 |
| Four Thirds, Micro Four Thirds ("4/3", "m4/3") | 21.60 | 17.30 | 13 | 225 | −1.94 | 2.00 |

-continued

| Sensor Type | Diagonal (mm) | Width (mm) | Height (mm) | Area (mm$^2$) | Stops (area) | Crop factor[32] |
|---|---|---|---|---|---|---|
| Blackmagic Production Camera/URSA/URSA Mini 4K | 24.23 | 21.12 | 11.88 | 251 | −1.78 | 1.79 |
| 1.5" Canon PowerShot G1 X Mark II | 23.36 | 18.70 | 14 | 262 | −1.72 | 1.85 |
| "35 mm" 2 Perf Techniscope | 23.85 | 21.95 | 9.35 | 205.23 | N/A | N/A |
| original Sigma Foveon X3 | 24.90 | 20.70 | 13.80 | 286 | −1.60 | 1.74 |
| "Super 35 mm" 2 Perf | 26.58 | 9.35 | 24.89 | 232.7 | N/A | N/A |
| Canon EF-S, APS-C | 26.82 | 22.30 | 14.90 | 332 | −1.39 | 1.61 |
| Standard 35 mm film frame | 27.20 | 22.0 | 16.0 | 352 | −1.34 | 1.59 |
| Blackmagic URSA/URSA Mini 4.6 | 28.20 | 25.34 | 14.25 | 361 | −1.23 | 1.53 |
| APS-C (Sony α DT, Sony E, Nikon DX, Pentax K, Samsung NX, Fuji X) | 28.2-28.4 | 23.6-23.7 | 15.60 | 368-370 | −1.23 | 1.52-1.54 |
| "35 mm 3 Perf" | 28.48 | 24.89 | 13.86 | 344.97 | N/A | N/A |
| Super 35 mm film 4 Perf | 31.11 | 24.89 | 18.66 | 464 | −0.95 | 1.39 |
| Canon APS-H | 33.50 | 27.90 | 18.60 | 519 | −0.73 | 1.29 |
| 35 mm full-frame, (Canon EF, Nikon FX, Sony α, Sony FE, Leica M) | 43.1-43.3 | 35.8-36 | 23.9-24 | 856-864 | 0 | 1.0 |
| Leica S | 54 | 45 | 30 | 1350 | +0.64 | 0.80 |
| Pentax 645D, Hasselblad X1D-50c | 55 | 44 | 33 | 1452 | +0.75 | 0.78 |
| Standard 65 mm film frame | 57.30 | 52.48 | 23.01 | 1208 | +0.81 | 0.76 |
| Kodak KAF 39000 CCD | 61.30 | 49 | 36.80 | 1803 | +1.06 | 0.71 |
| Leaf AFi 10 | 66.57 | 56 | 36 | 2016 | +1.22 | 0.65 |
| Medium-format (Hasselblad H5D-60) | 67.08 | 53.7 | 40.2 | 2159 | +1.26 | 0.65 |
| Phase One P 65+, IQ160, IQ180 | 67.40 | 53.90 | 40.40 | 2178 | +1.33 | 0.64 |
| Medium Format Film 6 × 4.5 | 70 | 56 | 42 | 2352 | +1.66 | 0.614 |
| Medium Format Film 6 × 6 | 79 | 56 | 56 | 3136 | +2 | 0.538 |
| Medium Format Film 6 × 7 | 87 | 67 | 56 | 3752 | +2.05 | 0.505 |
| IMAX film frame | 87.91 | 70.41 | 52.63 | 3706 | +2.05 | 0.49 |
| Large Format Film 4 × 5 | 150 | 121 | 97 | 11737 | +3.8 | 0.29 |
| Large Format Film 5 × 7 | 210 | 178 | 127 | 22606 | +4.5 | 0.238 |
| Large Format Film 8 × 10 | 300 | 254 | 203 | 51562 | +6 | 0.143 |

In some embodiments, the sensor sizes for each lens on the camera can be independently selected, for example, from sizes that include 10.24 mm×5.76 mm, 15 mm×12 mm, 17.8 mm×10 mm, 21.1 mm×11.9 mm, 21.6 mm×13.3 mm, 22.18 mm×22.18 mm, 22.5 mm×11.9 mm, 23.04 mm×10.8 mm, 23.4×15.6 mm, 23.76 mm×13.37 mm, 23.76 mm×17.82 mm, 24 mm×12.7 mm, 24 mm×18 mm, 24.2 mm×12.5 mm, 24.4 mm×13.7 mm, 24.6 mm×13.8 mm, 24.89 mm×16.86 mm, 25.6 mm×13.5 mm, 26.2×13.8 mm, 23.6 mm×13.3 mm, 27.7 mm×14.6 mm, 28.17 mm×18.13 mm, 30.7 mm×15.8 mm, 34 mm×17.2 mm, 35.8 mm×23.9 mm, 40.96 mm×21.60 mm, 52.1 mm×30.5 mm, 54.12 mm×25.58 mm, or any combination thereof. In some embodiments, the sensor sizes for each lens on the camera can be independently selected, for example, from sizes that include 15.81 mm×8.88 mm CMOS, 12.48 mm×7.02 mm CMOS, 21.12 mm×11.88 mm CMOS, 25.34 mm×14.25 mm CMOS, 12.85 mm×9.64 mm CCD, or any combination thereof. In some embodiments, the sensor sizes for each lens on the camera can be independently selected, for example, from sizes that include ⅔" CCD×3, ⅔" CCD.

One of skill will appreciate that the angle-of-view, the focal length, and the sensor format can be selected for each lens on the camera. In some embodiments, each lens and sensor combination is the same around the camera. In some embodiments, at least one lens and sensor combination is different from at least one other lens and sensor combination on the camera. In some embodiments, the method of making the camera includes independently selecting the lens and sensor combination for one or more sides of the camera to create a desired image or set of images. In some embodiments, the method of making the camera includes independently selecting the lighting, lens, and sensor combination for one or more sides of the camera to create a desired image or set of images. And, in some embodiments, the method of using the camera includes creating a desired image or set of images, video image or still image, using the independently selected lens and sensor, in any combination desired.

Since the methods can include various ways of implementing computers, the methods can include configuring each of the image sensors for operably connecting to (i) a circuit that includes a processor and a memory on a non-transitory computer readable storage medium; and, (ii) a power source. As such, in some embodiments, the method of making the camera includes independently selecting instructions for executing one or more programs at one or more image sensors, for one or more sides of the camera respectively, to create a desired image or set of images. In some embodiments, the method of making the camera includes independently selecting the computer program, computer program instructions, lighting, lens, and/or sensor combination for one or more sides of the camera to create a desired image or set of images. And, in some embodiments, the method of using the camera includes creating a desired image or set of images, video image or still image, using the computer program, computer program instructions, lighting, lens, and/or sensor, in any combination desired.

In order to keep the lighting array at least substantially invisible to the lenses of the camera, the cameras have a plurality of blind spaces, n, each of which includes a blind area on the housing, the plurality of blind spaces including (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing. The methods can include integrating a plurality of light sources, n−x, where x ranges from 0 to (n−2), into the plurality of blind spaces, the integrating including placing each of the plurality of light sources in one of the plurality of blind spaces such that the plurality of light sources is at least substantially invisible to the camera when acquiring the plurality of imaging spaces, the placing including installing a first light source in the first blind area and a second light source in the second blind area.

In some embodiments, as described in the methods taught herein, the camera can comprise the circuit, connected to the image sensor, for example, the circuit including a processor and a memory on a non-transitory computer readable storage medium. And, in some embodiments, the camera comprises the circuit, connected to the image sensor, for example, that includes a processor and a memory on a non-transitory computer readable storage medium; and, a power source.

FIGS. 3A through 3G illustrate a camera with a cube-shaped camera housing, lens coverage and creation of blind spaces, and the use of the blind spaces to install any of a number of components such as, for example, one or more (i) lights; (ii) light sensors; (iii) mounting hardware or devices; (iv) computer hardware including, for example, processor, memory; (v) input/output ports; (vi) speaker/microphone; (vii) state selectors; (viii) video/LED screen graphical interface; (ix) Wi-Fi/Bluetooth; (x) a power source; and the like.

Figure 3A:
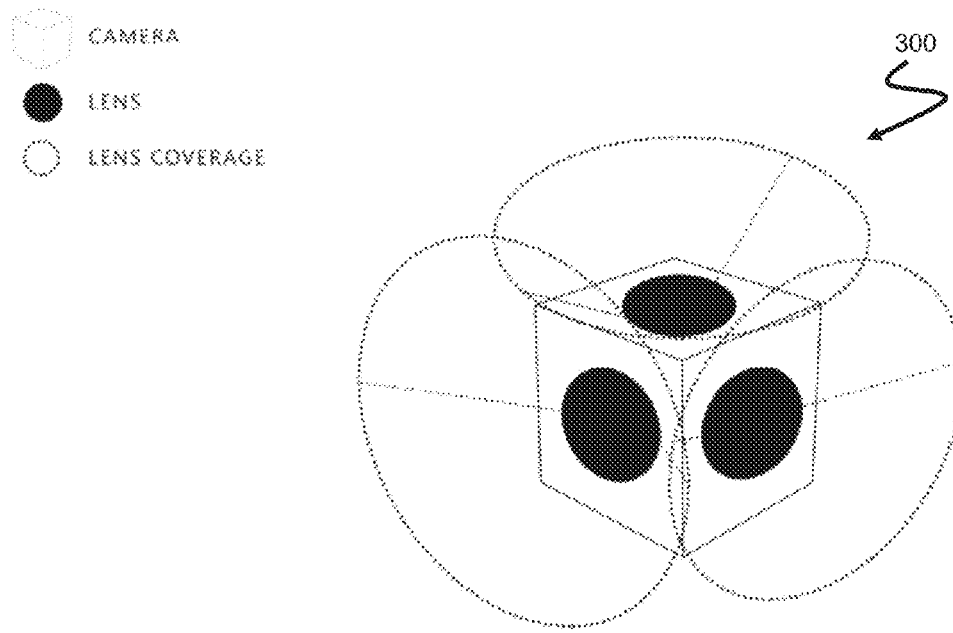
FIGS. 3A through 3G illustrate a camera with a cube-shaped camera housing, lens coverage and creation of blind spaces, and the use of the blind spaces to install, for example, lighting, state selectors, mounting devices, a display, a microphone, and the like, according to some embodiments.
Figure 3B:
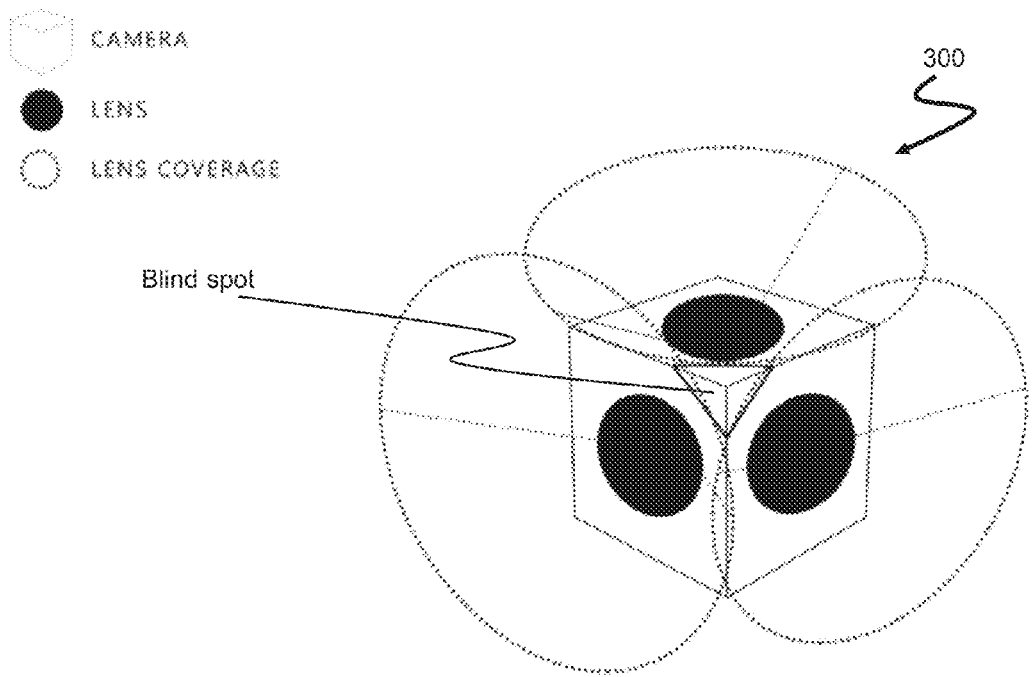
Figure 3C:
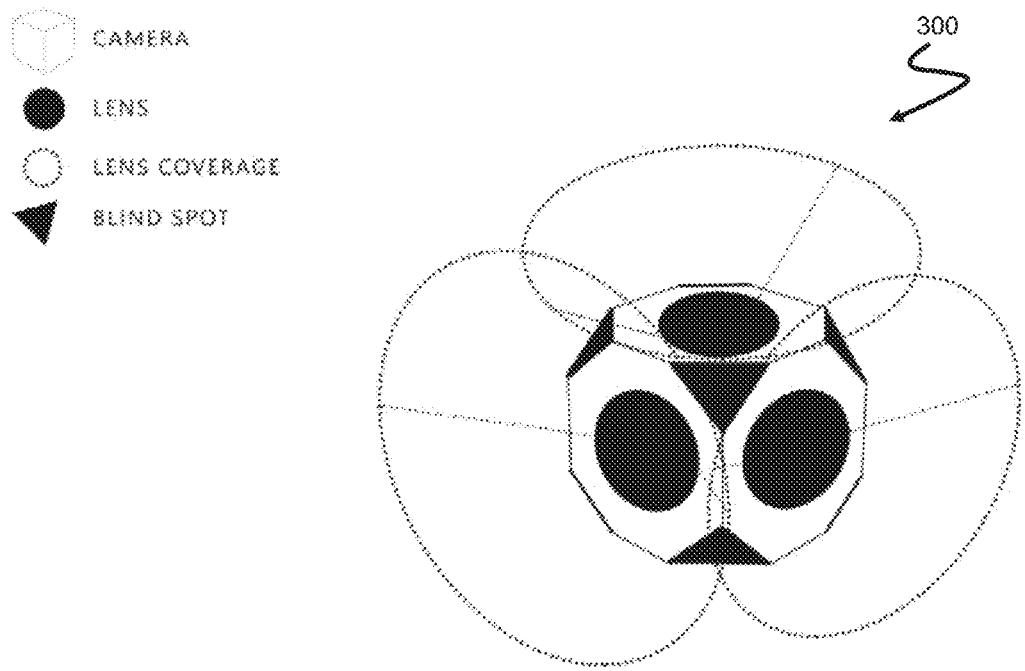
Figure 3D:
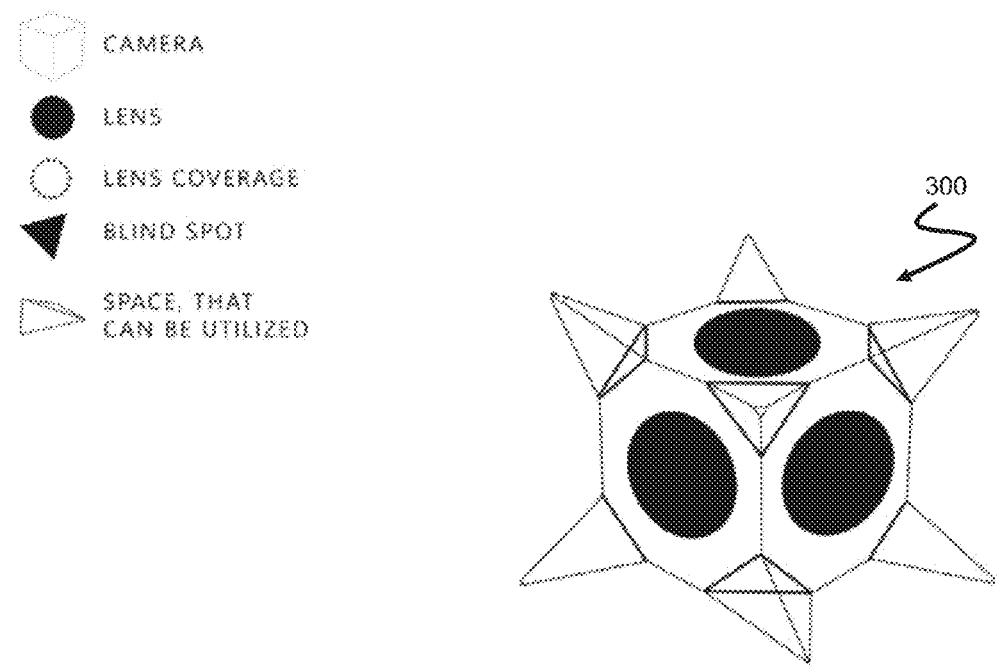
Figure 3E:
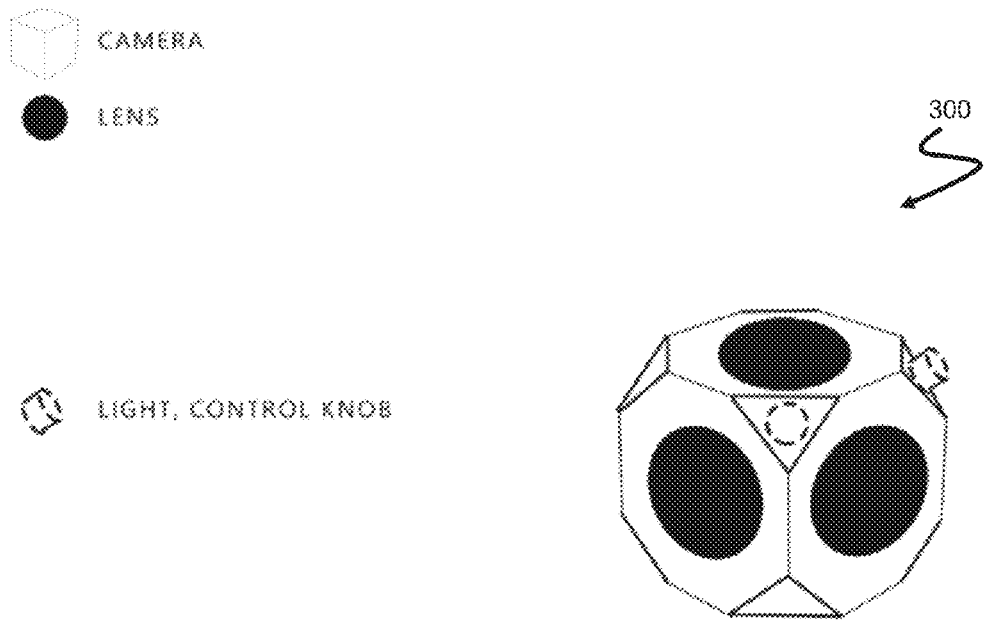
Figure 3F:
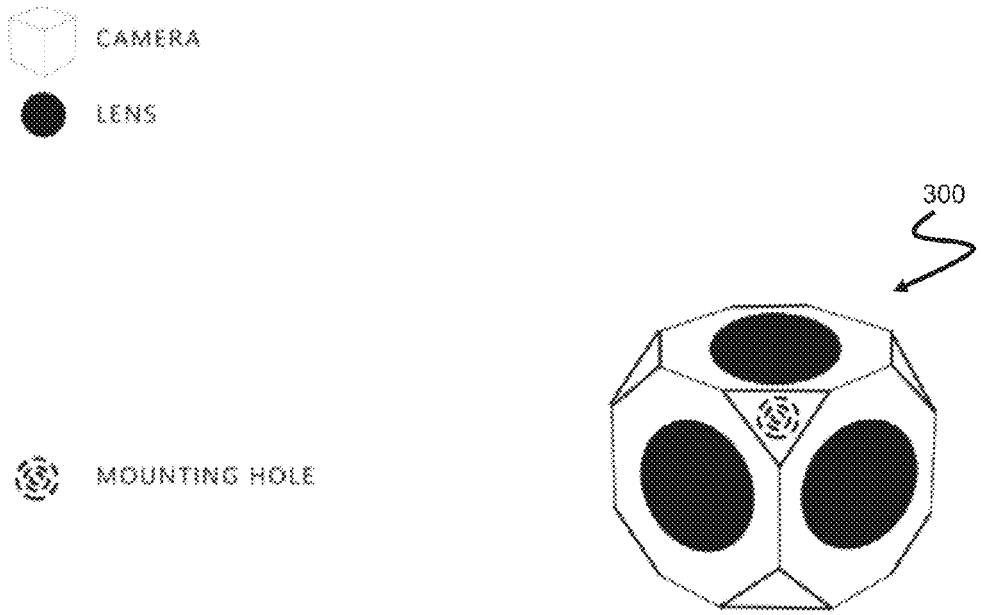
Figure 3G:
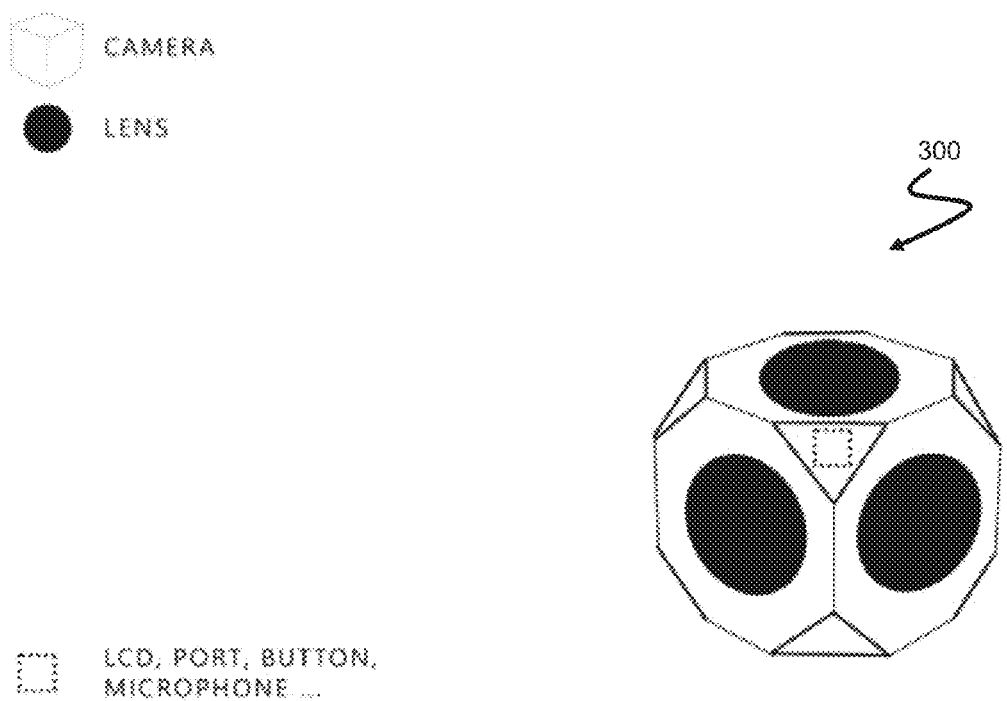

FIG. 3A illustrates the camera 300, a configuration of the lens, and a display of the lens coverage. FIG. 3B shows a blind spot that exists outside of the lens coverage, between the overlapping lens coverage of adjacent lenses. FIG. 3C shows how there are 8 blind spots for this particular camera configuration, one at each vertex of the cube-shaped housing (one is not shown). FIG. 3D provides an illustration of the shape of the blind space volume that could contain an object that would be outside the scope of coverage of each lens after the overlap. FIG. 3E shows that, for example, the blind space could be used to place a light, or a control knob (state selector), which would not be seen in a spherical image taken by the camera 300. FIG. 3F illustrates how other devices could be installed in such a blind space such as, for example, a mounting device in a mounting hole. Such a device would likely leave an object within the overlap of one or more lens coverage areas, but such an object would be at least substantially invisible to the camera, meaning that what remains can be removed from the image in the process of assembling the image data. In some embodiments, the process of assembling the image data can be referred to as "stitching", which is a process that is well known to those skilled in the art. FIG. 3G illustrates other ways in which the blind space can be used such as, for example, to install a graphical display (LCD, LED, etc), a port for connecting to a peripheral device, state selectors (knob, button, etc), or perhaps an audio device such as a microphone, speaker, etc.

One of skill will appreciate how the use of the blind spaces between lens coverages can be used to place components on the periphery of the camera rather than the inside of the camera, thereby reducing the size of the camera, allowing for better heat displacement, better functional utility with regard to lighting, audio (microphone, speaker, etc), mounting, ports for connections, and the like. Lighting is of particular interest, as no 360-degree camera on the market today has solved the problem of lighting. In some embodiments, the lighting that is placed in the blind spaces can be a cool lighting such as, for example, LED lighting. In some embodiments, the illumination can be adjustable, for example, across all lights, lights per side, and/or each individual light. In some embodiments, the camera can include light sensors which provide feedback that allows the camera to adjust lighting automatically and, in some embodiments, dynamically. In some embodiments, the lighting can be used as a source of a flash across all lights, lights per side, and/or each individual light. In some embodiments, the lighting effects and controls can be operated through an external tethered device and/or any wired or wireless connection. Any and all lighting effects known to the art could be obtained at the source of image acquisition, the camera, rather than from a source that is visible to the lenses of the camera.

Placing and moving the camera in a manner that is at least substantially invisible to the camera presents its own problems with state-of-the-art devices. In some embodiments, the camera can have the lumen taught herein to accept a carrier that is used to mount, move, and/or perhaps cool, the camera. In some embodiments, one or more blind spaces can be used as a mounting hole for any accessory, such as a stand for a rigid mount that can be still or moveable, an eyelet for a wire that can be used as a still mechanism or transit device, an electric component that attaches to other mechanical means to move the camera, wheels or pulleys to assist in placing the camera, and the like. As noted above, in some embodiments, some of these accessories can be at least substantially invisible, meaning that part of it may breach the blind space and become visible, but only to a limited extent, such that it extends from a blind space into an imaging space where imaging is overlapping, and the visible structure can be removed during the assembly of the image. In some embodiments, the assembly includes "stitching" of the images, and this is where the part of the object that enters the spherical image space can be removed.

One of skill will appreciate that the amount and placement of illumination can vary according to the environment in which the image is taken, and the look and feel that is being sought in the image. The cameras taught herein provide a great deal of flexibility in the amount and placement of the lights, as the shape of the camera housing can vary tremendously, and the shape can be used to provide the versatility sought in taking the image. In some embodiments, the number of lights that can be installed on the camera is equal to the number of blind spaces, n, minus one space, or (n−1), to allow for at least a single mount to hold and/or carry the camera.

Figure 4:
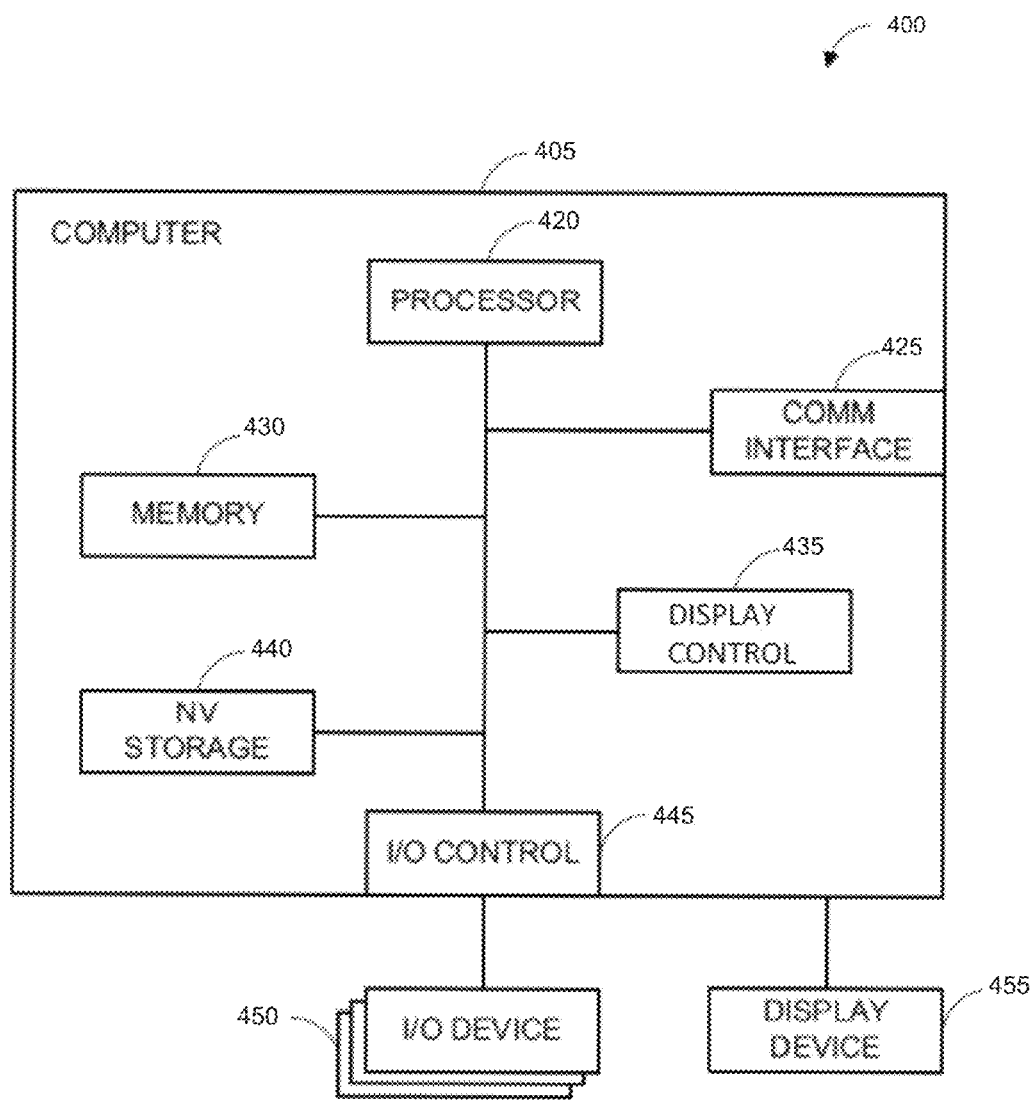
FIG. 4 shows a general technology platform for the system, according to some embodiments

FIG. 4 shows a general technology platform for the system, according to some embodiments. The computer system 400 may be a conventional computer system and includes a computer 405, I/O devices 450, and a display device 455. The computer 405 can include a processor 420, a communications interface 425, memory 430, display controller 435, non-volatile storage 440, and I/O controller 445. The computer system 400 may be coupled to or include the I/O devices 450 and display device 455.

The computer 405 interfaces to external systems through the communications interface 425, which may include a DSL modem, cable modem, ISDN modem, satellite transmission, or any other network interface. It will be appreciated that the communications interface 425 can be considered to be part of the computer system 400 or a part of the computer 405. The communications interface 425 can be any interface for coupling the computer system 400 to other computer systems, including a cellular network, some form of cabled interface, radio interface, or a cabled or cradled interface, for example. In a personal digital assistant, the communications interface 425 typically includes a cradled or cabled interface and may also include some form of radio interface, such as a BLUETOOTH or 802.11 interface, or a cellular radio interface, for example.

The processor 420 may be, for example, any suitable processor, such as a conventional microprocessor including, but not limited to, an 8-bit, 16-bit, 32-bit, 64-bit, 128-bit, 256-bit design, for example. Examples include any suitable Intel and AMD processors. Intel Pentium microprocessors, a Texas Instruments microprocessors, an RISC processor, a multicore processor, or a combination thereof. The memory 430 is coupled to the processor 420 by a bus. The memory 430 can be dynamic random access memory (DRAM) and can also include static ram (SRAM). The bus couples the processor 420 to the memory 430, also to the non-volatile storage 440, to the display controller 435, and to the I/O controller 445. In some embodiments, an ADI chipset can be used.

The I/O devices 450 can include a keyboard, disk drives, printers, a scanner, and other input and output devices, including a mouse or other pointing device. The display controller 435 may control in the conventional manner a display on the display device 455, which can be, for example, a cathode ray tube (CRT), liquid crystal display (LCD), light-emitting diode (LED), or organic light-emitting diode OLED. The display controller 435 and the I/O controller 445 can be implemented with conventional well known technology, meaning that they may be integrated together, for example.

The non-volatile storage 440 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 430 during execution of software in the computer 405. One of skill in the art will immediately recognize that the terms "machine-readable medium" or "computer-readable medium" includes any type of storage device that is accessible by the processor 420 and also encompasses a carrier wave that encodes a data. Objects, methods, inline caches, cache states and other object-oriented components may be stored in the non-volatile storage 440, or written into memory 430 during execution of, for example, an object-oriented software program.

The computer system 400 is one example of many possible different architectures. For example, personal computers based on an Intel microprocessor often have multiple buses, one of which can be an I/O bus for the peripherals and one that directly connects the processor 420 and the memory 430 (often referred to as a memory bus). The buses are connected together through bridge components that perform any necessary translation due to differing bus protocols.

In addition, the computer system 400 can be controlled by operating system software which includes a file management system, such as a disk operating system, which is part of the operating system software. One example of an operating system software with its associated file management system software is the family of operating systems known as WINDOWS from Microsoft Corporation of Redmond, Wash., and their associated file management systems. Another example of operating system software with its associated file management system software is the LINUX operating system and its associated file management system. Another example of an operating system is an ANDROID, or perhaps an iOS, operating system. The file management system is typically stored in the non-volatile storage 440 and causes the processor 420 to execute the various acts required by the operating system to input and output data and to store data in memory, including storing files on the non-volatile storage 440. Other operating systems may be provided by makers of devices, and those operating systems typically will have device-specific features which are not part of similar operating systems on similar devices. Similarly, it is conceivable that any operating may be adapted to specific devices for specific device capabilities for the utilities provided herein.

The computer system 400 may be integrated, for example, onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 5:
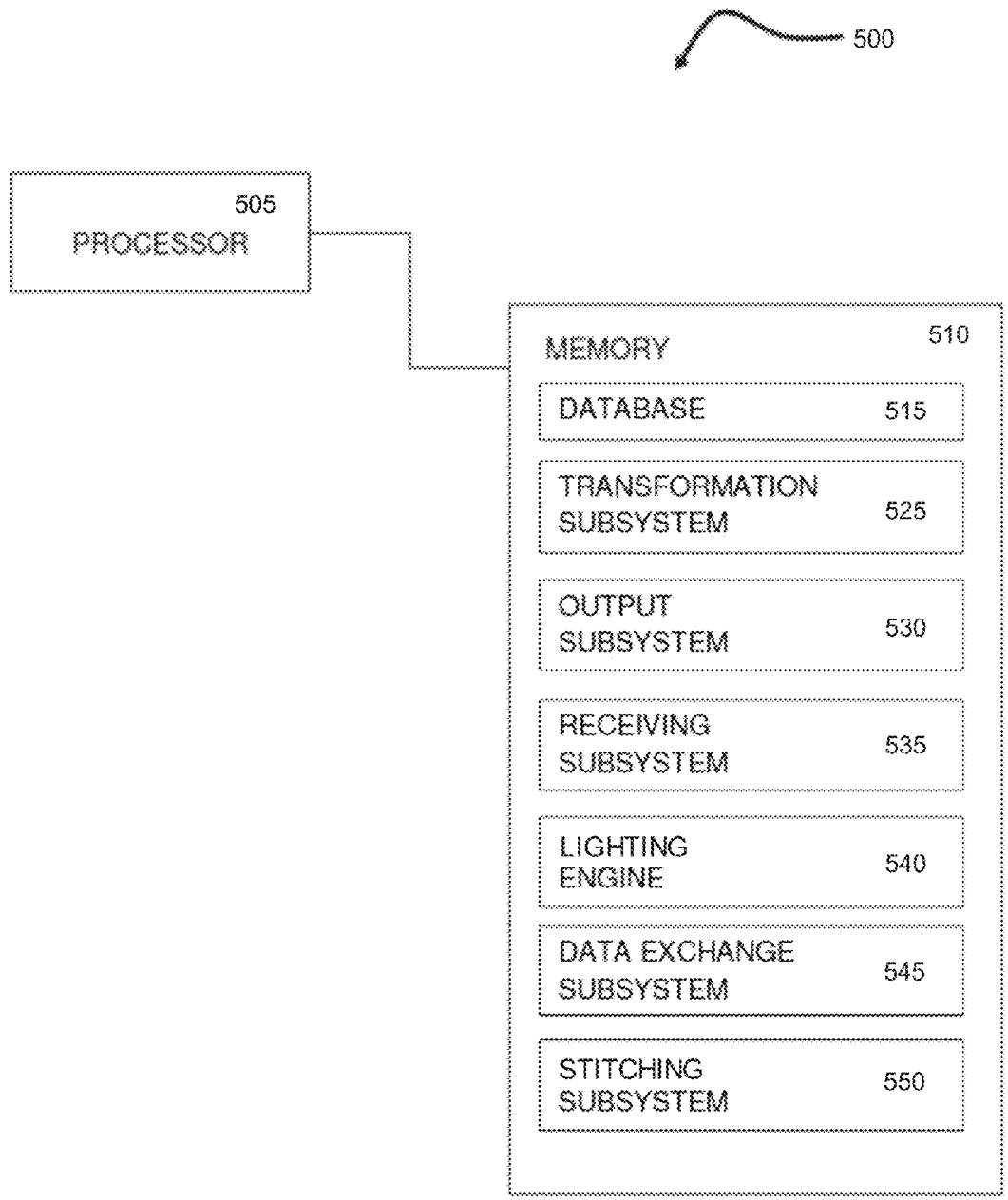
FIG. 5 illustrates a processor-memory diagram to describe components of the system, according to some embodiments.

FIG. 5 illustrates a processor-memory diagram to describe components of the system, according to some embodiments. The system 500 contains a processor 505 and a memory 510 (that can include non-volatile memory), wherein the memory 510 includes a database 515, a transformation system 525, and an output subsystem 530. The system can also have a receiving subsystem 535 on a non-transitory computer readable medium for receiving a set of user-selected output lighting instructions from a peripheral device, the receiving subsystem 535 operably connected to the database for storing the set of user-selected output lighting instructions. The instructions can be received, for example, through a port for connecting a peripheral device to the computer to receive the set of user-selected output lighting instructions from the peripheral device. The system can also have a lighting engine 540 on a non-transitory computer readable storage medium for selecting a set of output lighting instructions from a plurality of sets of output lighting instructions. Moreover, the system can further comprise a data exchange subsystem 545 embodied in a non-transitory computer readable medium, wherein the data exchange subsystem is operable to exchange data with external computer readable media. The system can also include a stitching subsystem 550 for a splicing of one set of image data with at least a second set of image data to form a spherical image, in some embodiments.

The system includes an input device (not shown) operable to receive image-oriented data on a non-transitory computer readable medium. Examples of input devices include a data exchange subsystem operable to interact with external data formats, voice-recognition software, a hand-held device in communication with the system including, but not limited to, a microphone, and the like. It should be appreciated that the input and output data can be analog or digital.

The database 515 is operable to store image, lighting control, and lighting instruction files for access on a non-transitory computer readable storage medium. The transformation subsystem 520 is operable to transform a first set of illumination instructions to a preselected set of illumination instructions to create a desired spherical image. One of skill will also appreciate that the desired illumination can be obtained by attenuating or boosting lighting intensities to produce desired spherical image. As such, in some embodiments, a software is included herein that provides a set of output lighting instructions through a transformation module on a non-transitory computer readable medium for executing the set of output lighting instructions. The executing includes transforming the input lighting data set received, for example, from illumination sensors near each of the lens of the camera into a structured output lighting profile using the set of output lighting instructions.

As described above, the system can include an output subsystem 535 embodied in a non-transitory computer readable medium. The output subsystem 535 can be operable, for example, to transmit lighting data to an output device, such as a set of lights or lighting array, a peripheral device, or a graphical user interface, for example, which can optionally be supported by the output subsystem 530.

As described above, the system can further comprise a data exchange subsystem 545 embodied in a non-transitory computer readable medium, wherein the data exchange subsystem is operable to exchange data with external computer readable media, such as to share image data. The data exchange subsystem 545 can, for example, also serve as a messaging module operable to allow users to communicate with other users. The users can email one another, post blogs, have instant messaging capability, or audiovisual conferencing, for real-time communications. In some embodiments, in which the users have video and audio capability in the communications, the system implements data streaming methods known to those of skill in the art. In some embodiments, the system is contained in a hand-held device; operable to function as a particular machine or apparatus having the additional function of telecommunications, word processing, or the like; or operable to function as a particular machine or apparatus not having other substantial functions.

The system 500 can also have an output subsystem embodied in a non-transitory computer readable medium, wherein the output subsystem can be operable to transmit image data, including audiovisual data and, in some embodiments, image data, still or video imaging, including audiovisual data, to an output device. Moreover, the system 500 can include a user control interface (not shown).

The systems taught herein can be practiced with a variety of system configurations, including personal computers, multiprocessor systems, microprocessor-based or programmable consumer electronics, network PCs, minicomputers, mainframe computers, and the like. The teachings provided herein can also be practiced in distributed computing environments where tasks are performed by remote processing devices that are linked through a communications network. As such, in some embodiments, the system further comprises an external computer connection through the data exchange module 545 and a browser program subsystem (not shown). The browser program subsystem (not shown) can be operable to access external data as a part of the data exchange subsystem 545.

Figure 6:
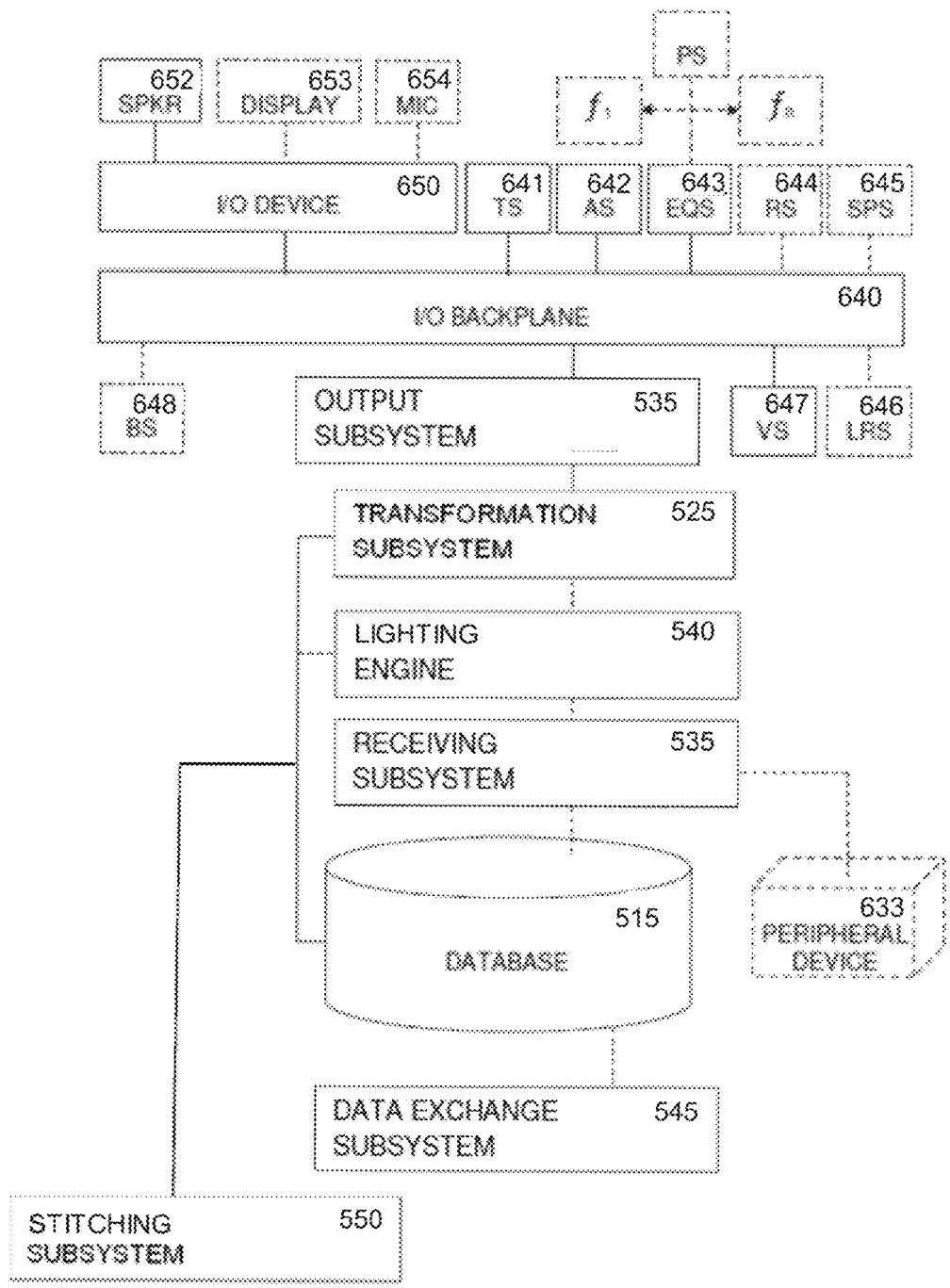
FIG. 6 is a concept diagram illustrating the system, according to some embodiments.

FIG. 6 is a concept diagram illustrating the system, according to some embodiments. The system 600 contains components that can be used in a typical embodiment. In addition to the database 415, the transformation subsystem 425, and the output subsystem 430 shown in FIG. 5, the memory of the device 600 also includes a data exchange subsystem 545 and the browser program subsystem (not shown) for accessing the external data. The system can also have a receiving subsystem 535 on a non-transitory computer readable medium for receiving a set of user-selected output lighting instructions from a peripheral device, the receiving subsystem 535 operably connected to the database for storing the set of user-selected output lighting instructions. The instructions can be received, for example, through a port for connecting a peripheral device 633 to the computer to receive the set of user-selected output lighting instructions from the peripheral device 633. The system can also have a selection engine 540 on a non-transitory computer readable storage medium for selecting a set of output lighting instructions from a plurality of sets of output lighting instructions.

As described above, the stitching subsystem 550 is operable for the stitching of the image data from each of the cameras on the 360-degree camera into a spherical image. Of course, the system can also have a speaker 652, display 653, and microphone 654 connected directly or through I/O device 650, which is connected to I/O backplane 640.

The system 600 can be implemented in a stand-alone device, a computer system, or network. In FIG. 6, for example, the I/O device 650 connects to the speaker 652, display 653, and microphone 654, but could also be coupled to other features. Such a device can have a variety of state selectors such as, for example, a transformation state selector (TS) 641 as a manual control of lighting output, an amplifier state selector (AS) 642 to amplifier the power distributed among the lighting array, an equalizer state selector (EQS) 643 to equalize the lighting distribution in an effort to remove hot and cold spots, a regional state selector (RS) 644 to select light regions for control around the 360-degree camera, a special placement state selector (SPS) 645 to select regions that are not controlled by the control program but, rather, are controlled only manually, a background state selector (BS) 648 to allow for control over the background (ambient) lighting effect on the control program, a volume state selector (VS) 647 for the speaker, and a balance (LRS) state selector for controlling lighting on one side of the 360-degree camera relative to the opposing side to provide additional control over ambient lighting effects; wherein, each state selector connected directly to the I/O backplane 640.

In some embodiments, the system further comprises security measures to protect privacy and the integrity of data. Such security measures are those well-known in the art such as firewalls, data encryption, anti-spy software, and the like. In addition, the system can be configured for use in an environment that requires administrative procedures and control. For example, the system can include an administrative module (not shown) operable to control access, configure the engines, and perform quality assurance tests. The security measures allow the systems and methods taught herein to be safely used in a network environment.

In some embodiments, the system is a web enabled application and can use, for example, Hypertext Transfer Protocol (HTTP) and Hypertext Transfer Protocol over Secure Socket Layer (HTTPS). These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as iPhone, PocketPCs, Microsoft Surface, Video Gaming Consoles, and the like. In some embodiments, the system can be accessed using any wireless application protocol (WAP). By way of example, such protocols can serve non HTTP enabled mobile devices such as, for examples, devices like cell phones, BlackBerries, Droids, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on iPhones using the iPhone Operating System, Java or .Net-enabled platforms, Android operating system devices, Windows operating system devices, etc. One of skill will appreciate that the system is not limited to any of the platforms discussed above and will be amenable to new platforms as they develop.

EXAMPLES

Example 1. The Problem of Shadowing

The systems, methods, and devices herein address the problem of shadowing, which is a problem that needed to be overcome in the development of the technology set-forth herein.

FIGS. 7A through 7D illustrate the problem of shadowing due to lighting apparatus that remains visible to a camera while acquiring an image, and a solution to the problem, according to some embodiments. FIG. 7A shows how a shadow is produced when placing a light next to a lens in or on a camera housing to project the direction of the light in the same direction in which the lens is acquiring image data. One of skill will appreciate that this problem is exacerbated when trying to create a spherical image from a single camera. FIG. 7B shows how this problem is not overcome by aligning the lighting source adjacent to the lens itself, as the lens itself will cast a shadow that will be visible in the final image. FIG. 7C shows how this problem increases with the multiple lenses that can be present with a 360 degree camera, providing a graphical interpretation of why such images will suffer at least uneven lighting, if not also insufficient lighting, providing a poor image quality.

FIG. 7D shows how blind spots between lenses can be used to thwart the problem of shadowing and uneven lighting.

Given the above, one of skill will understand how position of lighting on the periphery of the spherical camera will improve the art of obtaining spherical images.

Example 2. The Problem of Uneven Lighting

The use of blind spots to thwart the problem of shadowing only begins to address the problem of uneven lighting. The overlap of the lighting itself, in the absence of shadowing, can create hot spots which is also a source of uneven lighting.

Figure 8C:
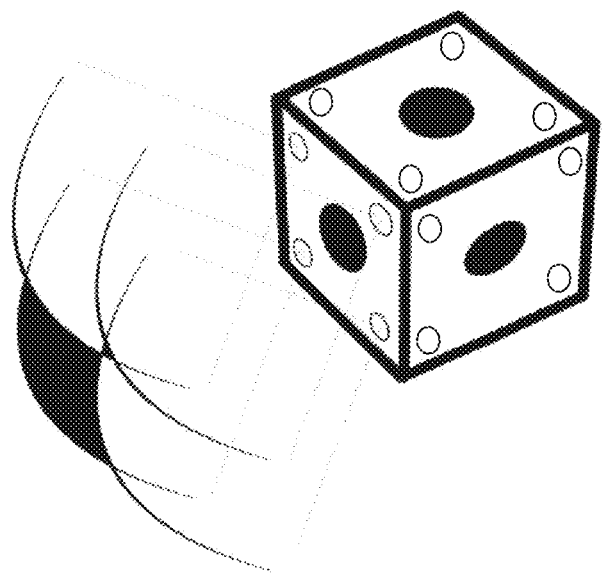
Figure 8D:
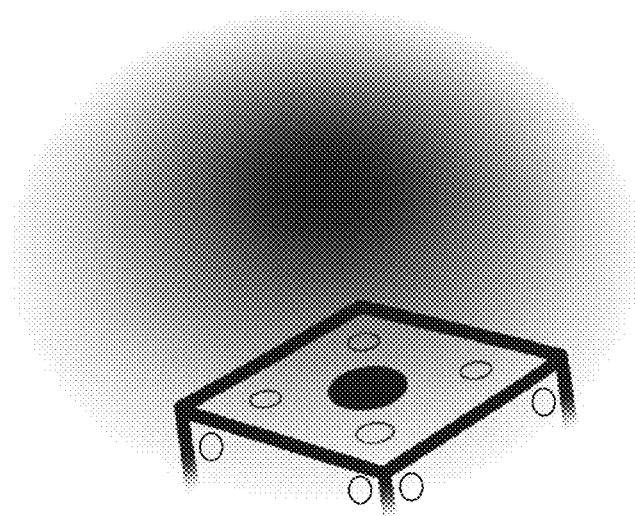

FIGS. 8A through 8D illustrate the problem of hot spots and cold spots due to lighting that overlaps and is visible to the camera while acquiring an image, and a solution to the problem, according to some embodiments. FIG. 8A shows a camera having a housing, lens, and lighting configuration that is in agreement with FIG. 7D. FIGS. 8B through 8D show how the lighting will overlap and create bright spots, also referred to as "hot spots". Incidentally, since there are hot spots in areas of lighting overlap, this accentuates the formation of relative "cold spots" at the ends, or edges, of the image acquisition area on the image sensors due to lack of lighting overlap and fading light intensity of a single light beam at its edge. These overexposed and underexposed regions provide uneven illumination and an image that suffers due to the lighting.

In some embodiments, the camera can be designed with lighting having different luminosities. In some embodiments, the luminosities are automatically adjusted by the camera, meaning that the camera can have software that receives luminosity measurements at luminosity sensors, and the power to the light is adjusted to adjust the lumens that are transmitted by the bulb at that location. In some embodiments, a light on the camera can have a light output ranging from about 100 lumens to about 5000 lumens, from about 200 lumens to about 4000 lumens, from about 300 lumens to about 3000 lumens, from about 400 lumens to about 2800 lumens, from about 450 lumens to about 2600 lumens, or any range therein in increments of 10 lumens. In some embodiments, a light on the camera can have a light output of about 400 lumens, about 500 lumens, about 600 lumens, about 700 lumens, about 800 lumens, about 900 lumens, about 1000 lumens, about 1200 lumens, about 1400 lumens, about 1600 lumens, about 1800 lumens, about 2000 lumens, about 2200 lumens, about 2400 lumens, about 2600 lumens, about 2800 lumens, about 3000 lumens, about 3200 lumens, about 3400 lumens, about 3600 lumens, about 3800 lumens, about 4000 lumens, about 4200 lumens, about 4400 lumens, about 4600 lumens, about 4800 lumens, about 5000 lumens, or any luminosity therein in increments of 10 lumens. One of skill will appreciate that each light can have the same luminosity output potential, or each can be independently selected to have a luminosity that differs from at least one other light that is used on the camera. As such, in some embodiments, a lighting array used with a camera taught herein can have an array of lights, each with the same output luminosity. In some embodiments, however, a camera taught herein can have an array of lights, each independently selected to have a luminosity that is different from at least one other light in the array.

In some embodiments, the cameras taught herein can be controlled by software that adjusts luminosity manually, automatically, or a combination of manually and automatically. A manual adjustment can be set using software interface controls or by adjusting one or more state selectors on the camera. An automatic adjustment can be set by the software taking luminosity measurements from one or more sensors near the light that is being adjusted. The lighting for a camera can first be set using an automatic adjustment, and a manual adjust can follow in order to fine tune the image to one that is desired.

Example 3. A 360-Degree Camera in the Shape of a Snub Cuboctahedron with Integrated Lighting Array In addition to the shapes presented herein, there are several other desirable shapes that can be configured such that the lighting array being at least substantially invisible to the lens of the camera when taking a spherical image.

Figure 9A:
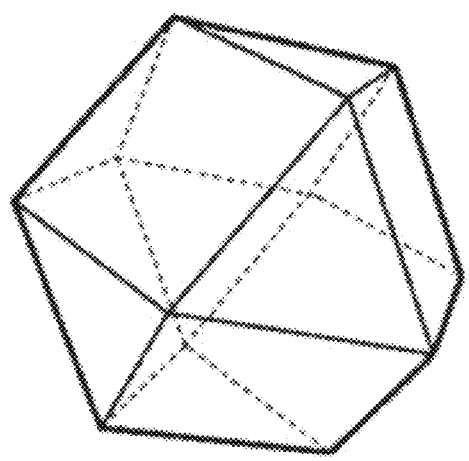
FIGS. 9A through 9C illustrate cuboctahedron camera housing shapes, according to some embodiments.
Figure 9B:
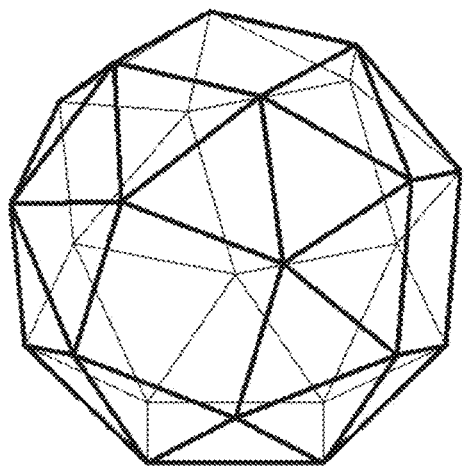
Figure 9C:
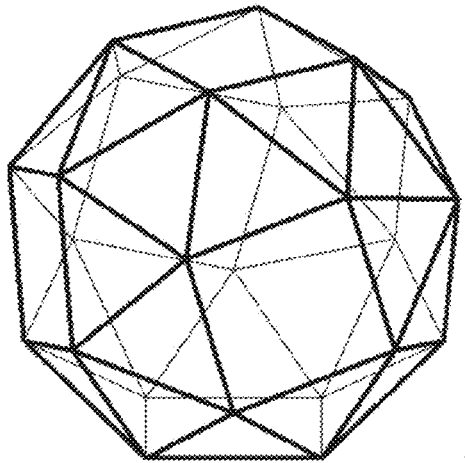

FIGS. 9A through 9C illustrate cuboctahedron camera housing shapes, according to some embodiments. As shown in FIG. 9A, a cuboctahedron is a polyhedron with 8 triangular faces and 6 square faces. The cuboctahedron has 12 identical vertices, with 2 triangles and 2 squares meeting at each, and 24 identical edges, each separating a triangle from a square. This configuration provides plenty of opportunity to place a plurality of lenses, lights, and other desired or necessary components around the camera housing. The snub cuboctahedron of FIGS. 9B and 9C, however, provides even more opportunity to place a plurality of lenses, lights, and other desired or necessary components around the camera housing. The snub cuboctahedron has 38 faces which include 6 squares, 32 equilateral triangles, 60 edges, and 24 vertices. The snub cuboctahedron is a chiral polyhedron having two distinct forms which are mirror images (or "enantiomorphs") of each other, as shown by FIGS. 9B and 9C. A 360 degree camera has at least two individual cameras in its housing. The snub cuboctahedron housing provides much flexibility in the design of a 360 degree camera.

Figure 10A:
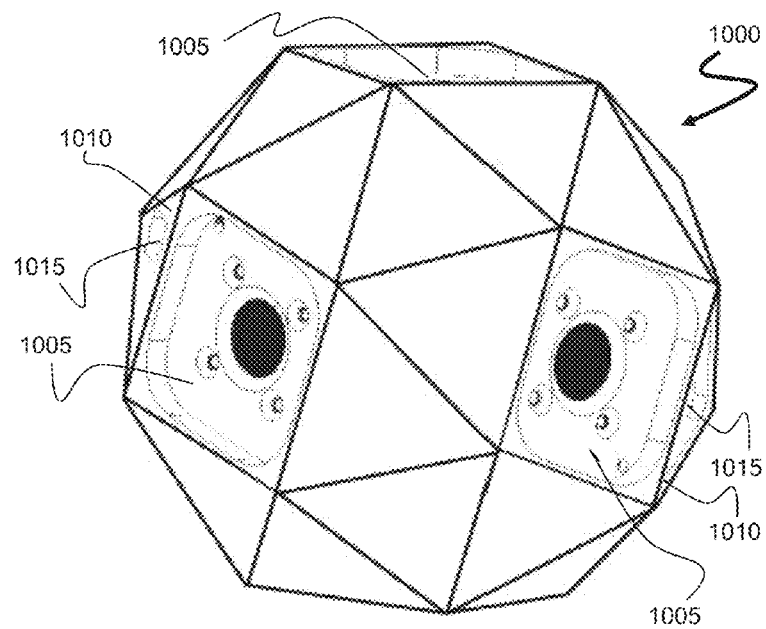
FIGS. 10A through 10H illustrate camera and lighting array configurations that can be used with the snub cuboctahedron, according to some embodiments.
Figure 10B:
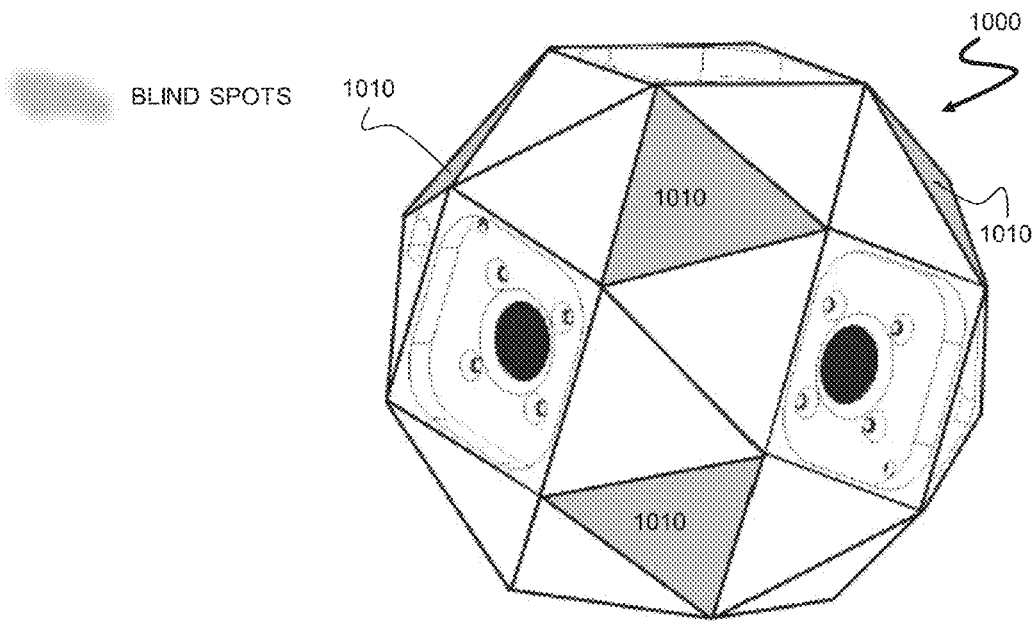
Figure 10C:
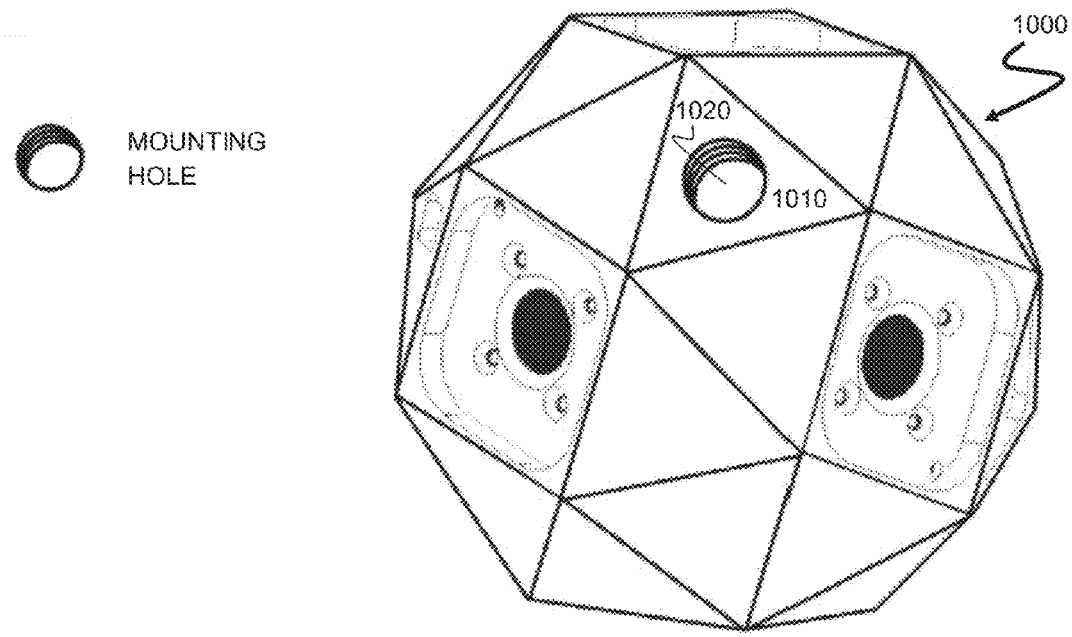
Figure 10D:
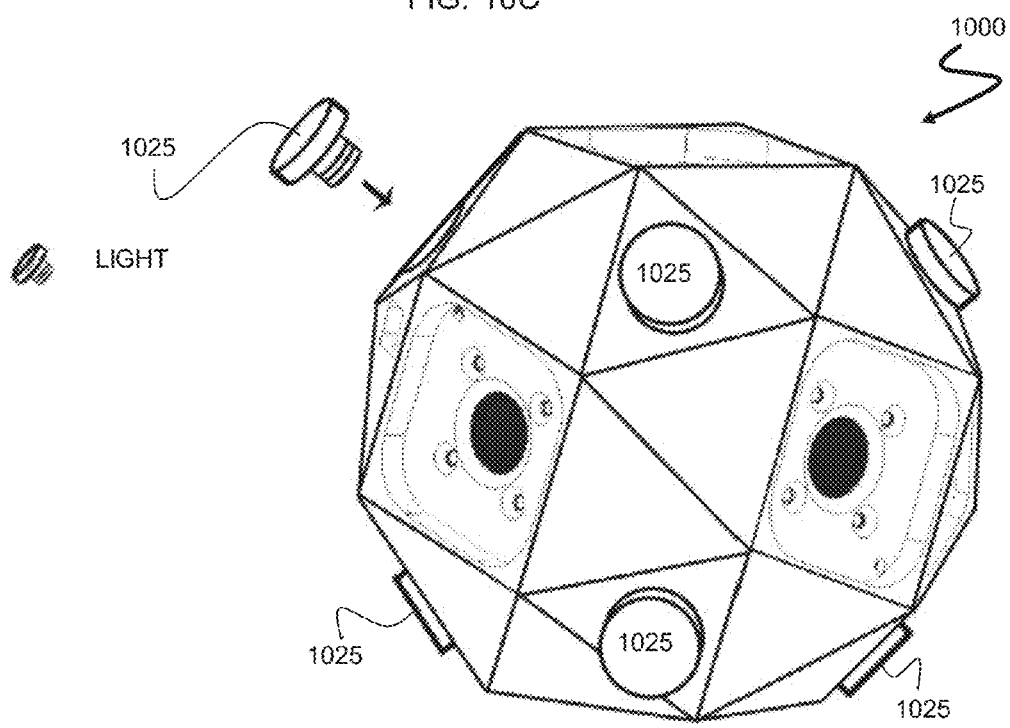
Figure 10E:
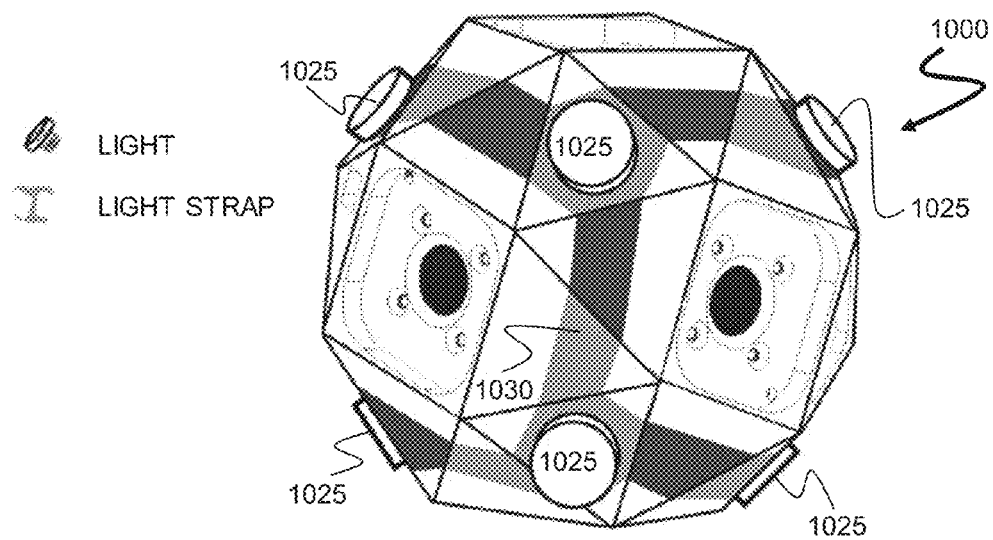
Figure 10F:
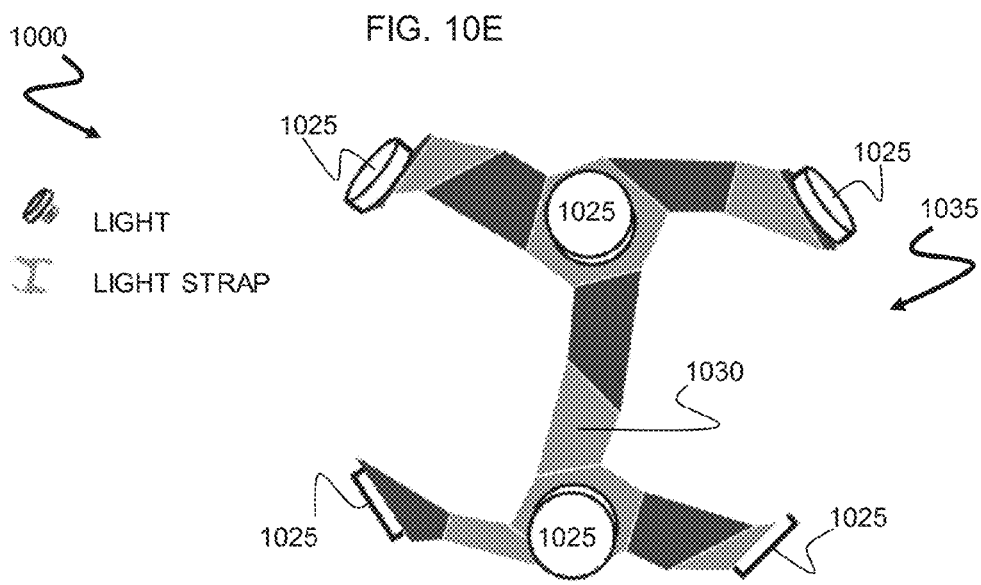

FIGS. 10A through 10H illustrate camera and lighting array configurations that can be used with the snub cuboctahedron, according to some embodiments. FIGS. 10A and 10B show a 360 degree camera 1000 having blind areas 1010 near the lenses of its individual cameras 1005 that can be used as a place to position components 1015 that are at least substantially invisible to the lenses of the cameras 1005. FIG. 10O shows how a mounting hole can be used to mount any of a variety of components including one or more (i) lights; (ii) light sensors; (iii) mounting hardware or devices; (iv) computer hardware including, for example, processor, memory; (v) input/output ports; (vi) speaker/microphone; (vii) state selectors; (viii) video/LED screen graphical interface; (ix) Wi-Fi/Bluetooth; (x) a power source; and the like. FIG. 10D shows how the component can be a removable light 1025. FIG. 10E shows how the removable light can be placed on the 360 degree camera as one unit using, for example, a strap 1030 that contains all of the lights 1025. FIG. 10F is a view of the strap 1030 alone.

Figure 10G:
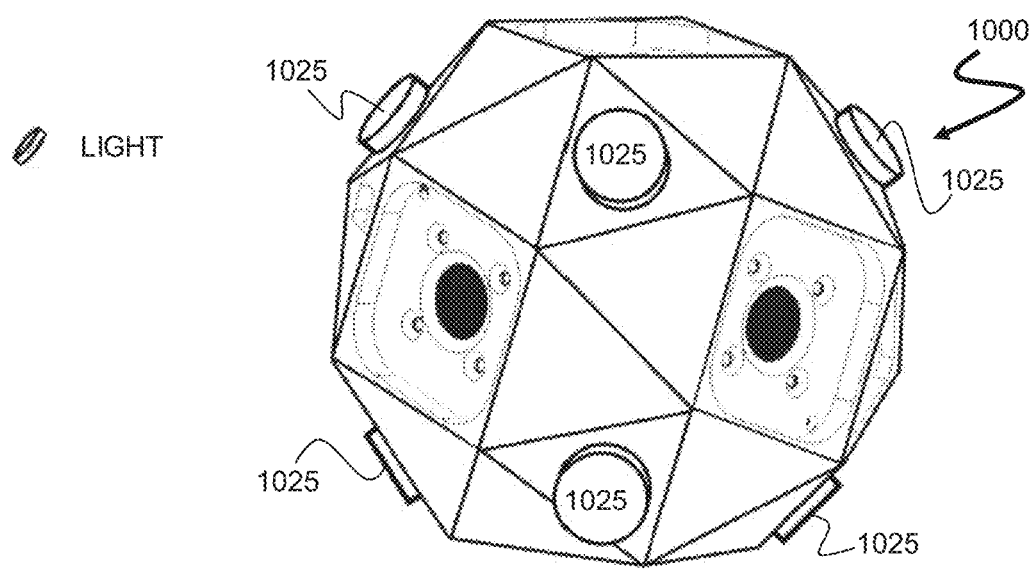
Figure 10H:
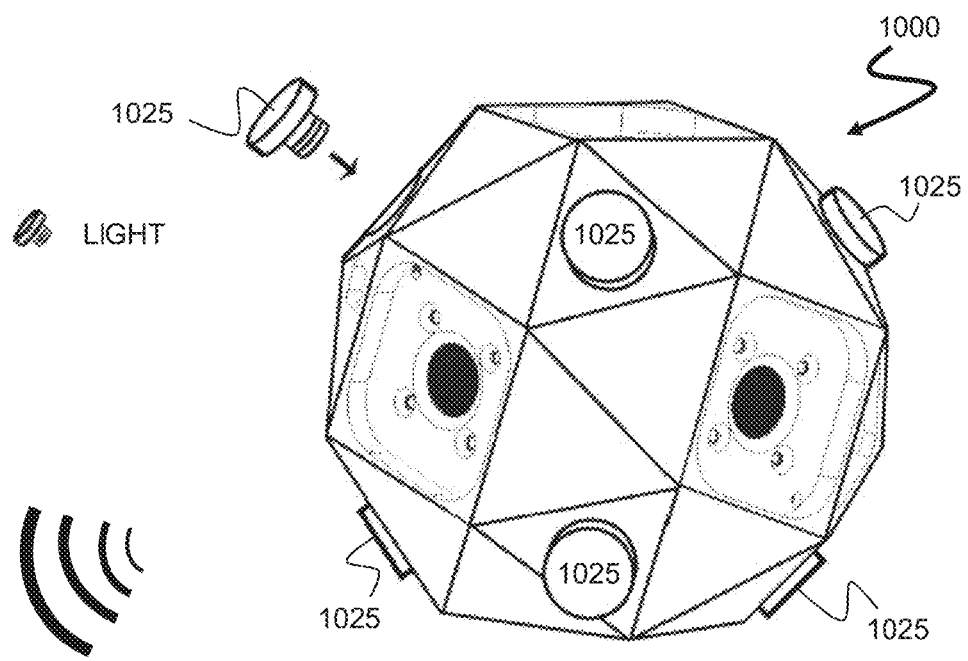

As noted, the components can fixed or removable. FIG. 10G shows how the lights can be added as a fixed unit with the camera. FIG. 10H, on the other hand, shows how the light can be removable, wherein the insertion of the removable light activates a WiFi/Bluetooth transmitter that pairs with a peripheral control computer to control the lighting output on the camera.

Example 4. Using a Peripheral Computer to Control the Camera

The computer processor and memory can be on, at, or near, the outer periphery of the 360-degree camera. In fact, in some embodiments, the computer processor and memory can be least substantially entirely contained in the 360-degree camera, near the periphery of the camera, in many embodiments. However, in some embodiments, it may be desirable to place a substantial amount of the computer processor and memory components in a peripheral computer to control the camera.

Figure 11:
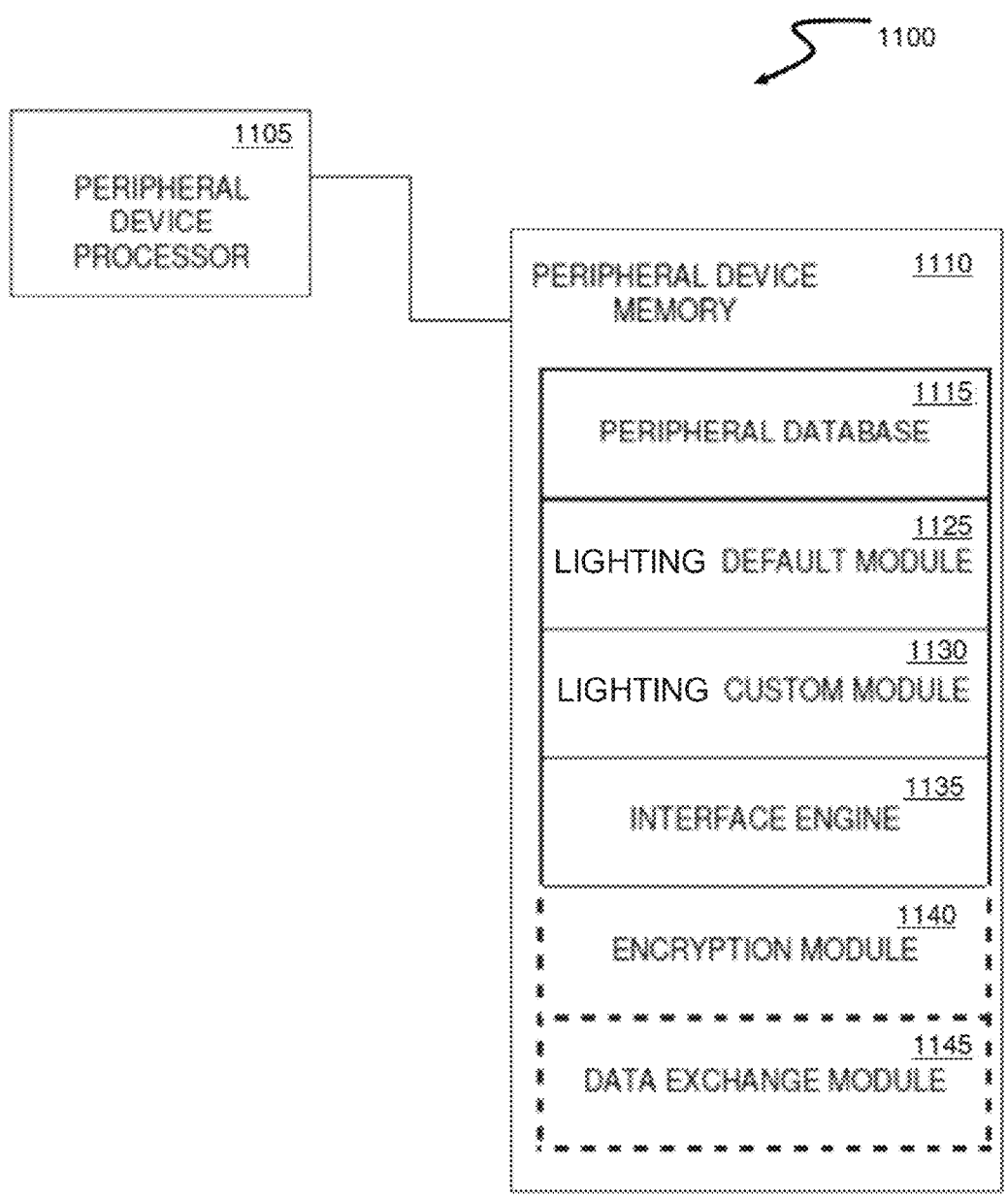
FIG. 11 illustrates a processor-memory diagram to describe components of the peripheral computer control system, according to some embodiments.

FIG. 11 illustrates a processor-memory diagram to describe components of the peripheral computer control system, according to some embodiments. The system 1100 contains a peripheral device processor 1105 and a peripheral device memory 1110 (that can include non-volatile memory), wherein the peripheral device memory 1110 includes a peripheral database 1115, a lighting default module 1125, an lighting custom module 1130, an interface engine 1135, as well as an optional encryption module 1140 to protect data exchanged, and an optional data exchange module 1145, of course, operable to exchange data with external computer readable media. An output module (not shown) is included to output data.

The instructions can be received, for example, through a port 1009 for connecting a peripheral device 1011 to receive the set of user-selected output lighting instructions from the peripheral device. The system 1100 can also have a selection engine (not shown) for selecting a set of output lighting instructions from a plurality of sets of output lighting instructions. Each of the modules and engines are on a non-transitory computer readable medium.

The system includes an input device (not shown) operable to receive lighting instructions on a non-transitory computer readable medium. Examples of input devices include a data exchange module operable to interact with external data formats, voice-recognition software, a hand-held device in communication with the system including, but not limited to, a microphone, and the like. It should be appreciated that the input and output can be an analog audio source or digital audio source.

Example 5. Controlling Lighting Conditions Using the 360-Degree Camera in Manual and/or Automatic Modes The 360-degree cameras taught herein can be configured to control lighting conditions at each lens either manually, automatically, or by using a combination of manual and automatic controls. This allows the user the freedom to set a default lighting level for a particular look and feel of an image, as well as override the lighting level. In general terms, the method of controlling lighting output can include, for example, installing a control program for the lighting system on a computer, placing the lighting system in pairing mode by turning on the lighting system, and pairing the lighting system to the computer for a control of the lighting system through the control program.

Figure 12:
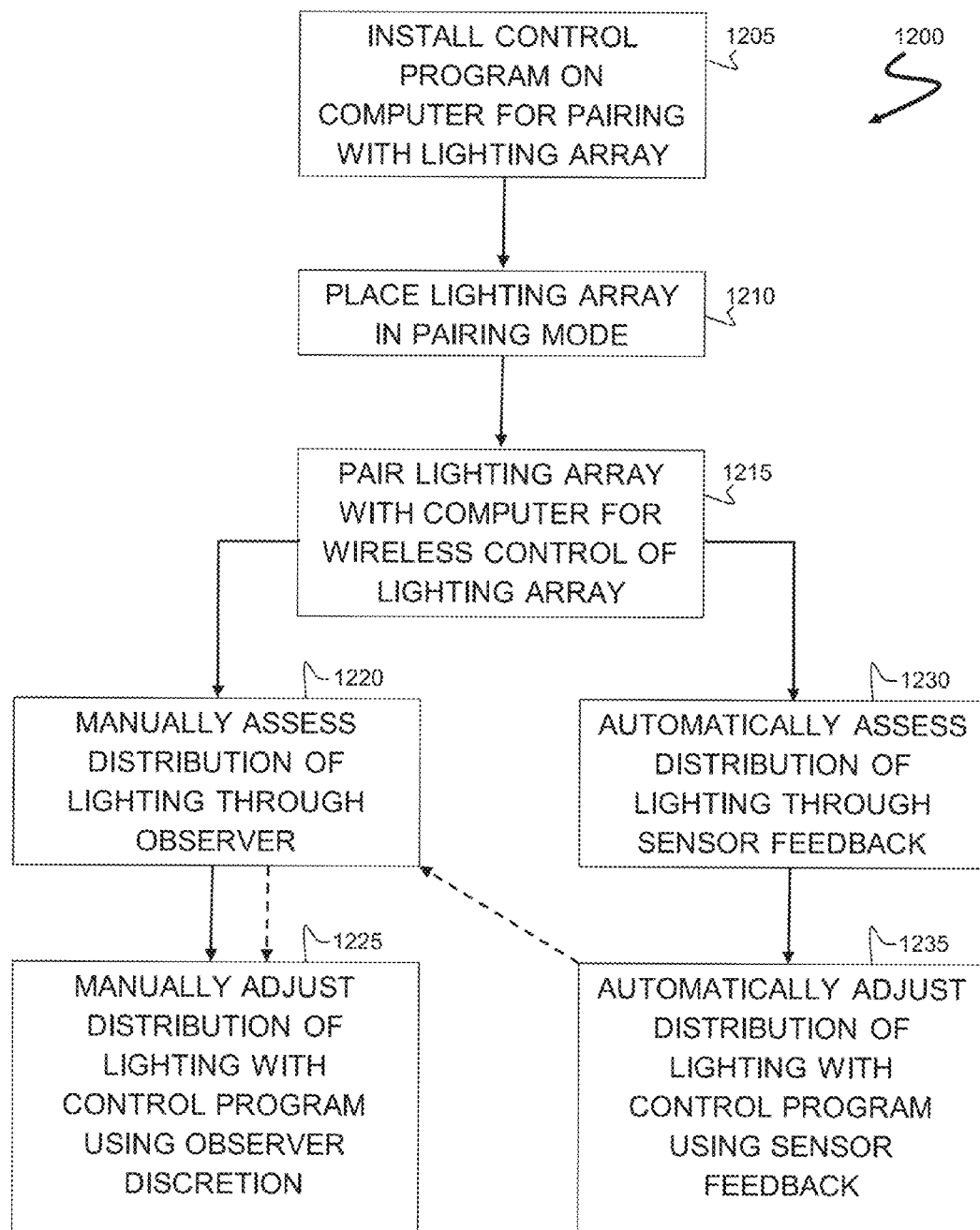
FIG. 12 is an operational flowchart for a single unit, 360-degree camera with an integrated lighting array that is at least substantially invisible to the camera when taking a spherical image, according to some embodiments.

FIG. 12 is an operational flowchart for a single unit, 360-degree camera with an integrated lighting array that is at least substantially invisible to the camera when taking a spherical image, according to some embodiments. The user can first install 1205 a control program on a computer for pairing with a lighting array on a 360 degree camera. Next, the user can then place 1210 the lighting array in pairing mode and pair 1215 the lighting array with the computer for a wireless control of the lighting array. Finally, the user decides whether to use a manually controlled lighting setting, an automatically controlled lighting setting, or both. For example, the user can manually assess 1220 the distribution of the lighting from the camera as, or through, an observer and then manually adjust 1225 the distribution of the lighting with the control program using the discretion of the user, or observer. In the alternative, the user can use sensors on the camera to automatically assess 1230 the distribution of the lighting through feedback from one or more sensors on the camera, each camera on the 360-degree camera potentially having its own sensor. The 360-degree camera can then automatically adjust 1235 the distribution of the lighting with the control program using the sensor feedback and default, or preset, settings. Optionally, the user can then also manually assess 1220 the distribution of the lighting from the camera as, or through, an observer and then manually adjust 1225 the distribution of the lighting with the control program using the discretion of the user, or observer.

Example 6. Miniaturizing a 360-Degree Camera

It may be desirable to create a 360-degree camera with all components arranged in a manner that reduces the cross-sectional diameter of the camera. For example, cameras with opposing lenses will require a cross-sectional diameter that allows for the placement of the opposing lens and sensor arrangements on the opposing sides of the camera housing. In some embodiments, that distance may be reduced by reducing the distance at which the lens and sensor combinations are placed relative to one another, such that the minimum distance is that which allows for adequate heat dissipation from the sensor.

FIGS. 13A and 13B illustrate a configuration for the miniaturization of a 360-degree camera, according to some embodiments. As described in the teachings herein, FIG. 13A illustrates how the angle-of-view, the focal length, and the sensor format can be selected for each lens on the camera by combining design principles that may be recognized those of skill with the flexibility of design of the cameras taught herein. In these embodiments, the angle-of-view lenses 1320L,1325L, the focal length, and the format of the sensors 1340,1345 can be selected for each lens on the camera in order to reduce the cross-sectional diameter of the housing of the camera, for example, to miniaturize the camera to a desired size. By selecting a desired configuration for the camera the distance, dSensor, between the image sensors 1340,1345 can be reduced while providing adequate dissipation of heat from the image sensors. In some embodiments, the dissipation of heat can be assisted using any mechanism known to one of skill including, for example, a heat sink, HS, and/or a fan. FIG. 13B illustrates how camera components can be placed at or near the periphery of the housing 1305 in order to reduce the space required for the volume required to place the components, thus reducing the cross-sectional diameter required to assemble the camera; and, reduce the accumulation of heat in the housing 1305 and increase the dissipation of any such heat produced from such components. As described herein, the components can include one or more (i) lights; (ii) light sensors; (iii) mounting hardware or devices; (iv) computer hardware including, for example, processor, memory; (v) input/output ports; (vi) speaker/microphone; (vii) state selectors; (viii) video/LED screen graphical interface; (ix) Wi-Fi/Bluetooth; (x) a power source; and the like. Other components can help facilitate dissipation of heat such as, for example a fan, F, and/or a heat sink, HS, as shown in FIG. 13B.

One of skill will appreciate that the design of the camera can include a housing 1305 that facilitates heat dissipation by design. For example, the housing 1305 can be conductive and/or perforated, in some embodiments, to help facilitate the release of heat from the camera.

The cross-sectional diameter can be referred as the cross-sectional dimension, of course, as the camera can be any shape, and one of skill will appreciate that reducing the size of the camera is a reduction in the maximum cross-sectional dimension required by the camera's design. The cross sectional dimension, in some embodiments, can be measured from the midpoint of the outer convex surface of one lens to the midpoint of the outer convex surface of the opposing lens, along the cross-section of the housing that connects those two points. In embodiments where there may be no opposing lens along the cross-section of the housing, then the cross-section can be measured from the midpoint of the outer convex surface of one lens to the opposing outer surface of the housing, along the cross-section of the housing that connects those two points. In some embodiments, the maximum cross-sectional dimension of the camera can range from about 10 mm to about 100 mm, from about 20 mm to about 80 mm, from about 30 mm to about 70 mm, from about 40 mm to about 60 mm, or any range therein in increments of 1 mm. In some embodiments, the maximum cross-sectional dimension of the camera can range from about 10 mm to about 100 mm, from about 20 mm to about 80 mm, from about 30 mm to about 70 mm, from about 40 mm to about 60 mm, or any range therein in increments of 1 mm. In some embodiments, the maximum cross-sectional dimension of the housing can be, for example, about 3 mm, about 5 mm, about 7 mm, about 9 mm, about 11 mm, about 13 mm, about 15 mm, about 17 mm, about 19 mm, about 21 mm, about 23 mm, about 25 mm, about 27 mm, about 29 mm, about 31 mm, about 33 mm, about 35 mm, about 37 mm, about 39 mm, about 41 mm, about 43 mm, about 45 mm, about 47 mm, about 49 mm, about 51 mm, about 53 mm, about 55 mm, about 57 mm, about 59 mm, or any diameter therein in increments of 1 mm.

Example 7. The Collection, Control, Transmission, and Sharing of Image Data

Since the camera is computerized, the collection, control, transmission, and sharing of image data can be done in a variety of ways, including in a network or in the cloud.

Figure 14:
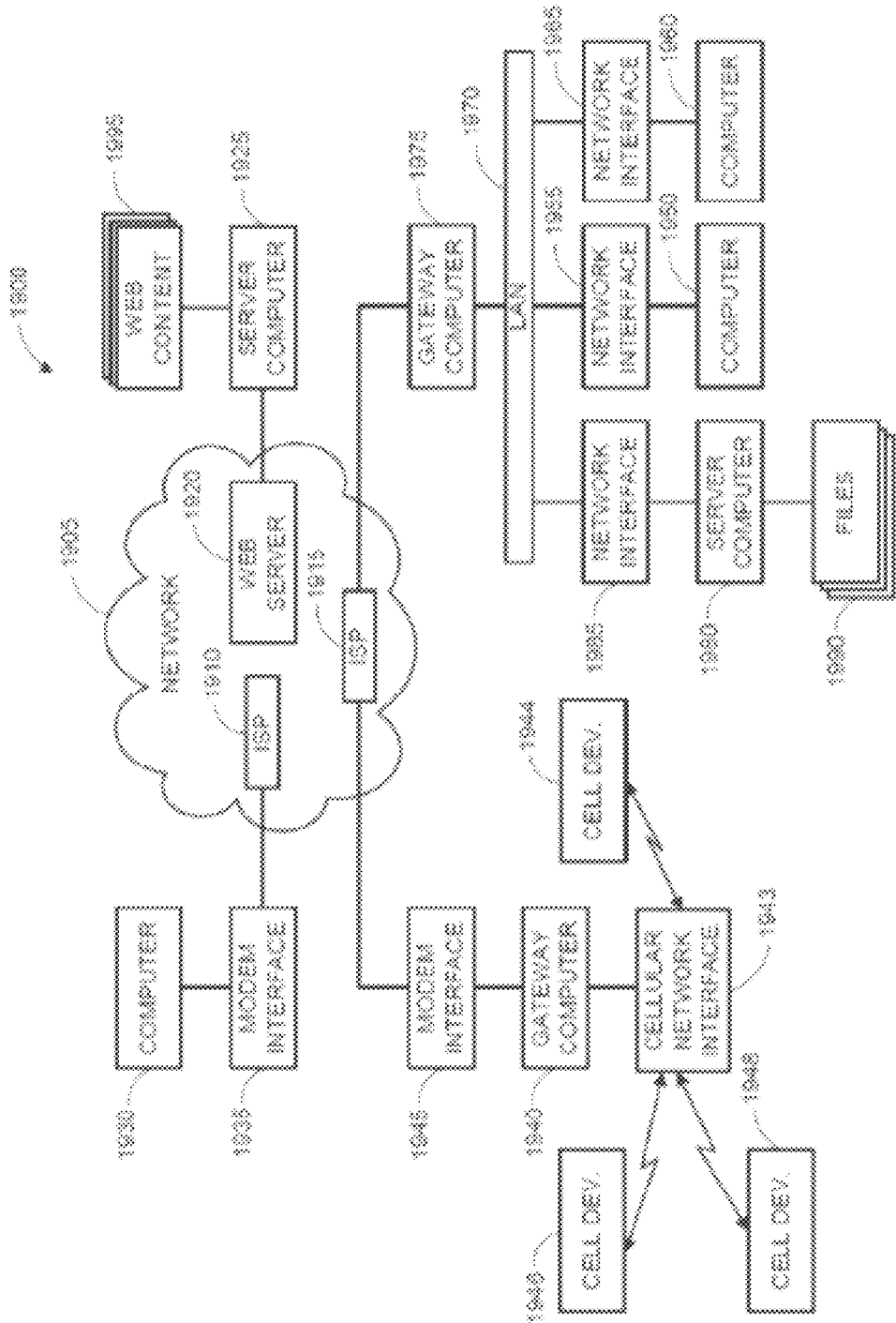
FIG. 14 illustrates how a network may be used for a single unit, 360-degree camera with an integrated lighting array that is at least substantially invisible to the camera when taking a spherical image, according to some embodiments.

FIG. 14 shows how a network may be used for the system, according to some embodiments. shows several computer systems coupled together through a network 1905, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1905 is typically provided by internet service providers (ISP), such as the ISPs 1910 and 1915. Users on client systems, such as client computer systems 1930, 1950, and 1960 obtain access to the internet through the internet service providers, such as ISPs 1910 and 1915. Access to the internet allows users of the client computer systems to exchange information, receive and send e-mails, and view documents, such as documents which have been prepared in the HTML format. These documents are often provided by web servers, such as web server 1920 which is considered to be "on" the internet. Often these web servers are provided by the ISPs, such as ISP 1910, although a computer system can be set up and connected to the internet without that system also being an ISP.

The web server 1920 is typically at least one computer system which operates as a server computer system and is configured to operate with the protocols of the world wide web and is coupled to the internet. Optionally, the web server 1920 can be part of an ISP which provides access to the internet for client systems. The web server 1920 is shown coupled to the server computer system 1925 which itself is coupled to web content 1995, which can be considered a form of a media database. While two computer systems 1920 and 1925 are shown, the web server system 1920 and the server computer system 1925 can be one computer system having different software components providing the web server functionality and the server functionality provided by the server computer system 1925 which will be described further below.

Cellular network interface 1943 provides an interface between a cellular network and corresponding cellular devices 1944, 1946 and 1948 on one side, and network 1905 on the other side. Thus cellular devices 1944, 1946 and 1948, which may be personal devices including cellular telephones, two-way pagers, personal digital assistants or other similar devices, may connect with network 1905 and exchange information such as email, content, or HTTP-formatted data, for example. Cellular network interface 1943 is coupled to computer 1940, which communicates with network 1905 through modem interface 1945. Computer 1940 may be a personal computer, server computer or the like, and serves as a gateway. Thus, computer 1940 may be similar to client computers 1950 and 1960 or to gateway computer 1975, for example. Software or content may then be uploaded or downloaded through the connection provided by interface 1943, computer 1940 and modem 1945.

Client computer systems 1930, 1950, and 1960 can each, with the appropriate web browsing software, view HTML pages provided by the web server 1920. The ISP 1910 provides internet connectivity to the client computer system 1930 through the modem interface 1935 which can be considered part of the client computer system 1930. The client computer system can be a personal computer system, a network computer, a web TV system, or other such computer system.

Similarly, the ISP 1915 provides internet connectivity for client systems 1950 and 1960, although as shown, the connections are not the same as for more directly connected computer systems. Client computer systems 1950 and 1960 are part of a LAN coupled through a gateway computer 1975. While interfaces 1935 and 1945 are shown as generically as a "modem," each of these interfaces can be an analog modem, isdn modem, cable modem, satellite transmission interface (e.g. "direct PC"), or other interfaces for coupling a computer system to other computer systems.

Client computer systems 1950 and 1960 are coupled to a LAN 1970 through network interfaces 1955 and 1965, which can be Ethernet network or other network interfaces. The LAN 1970 is also coupled to a gateway computer system 1975 which can provide firewall and other internet related services for the local area network. This gateway computer system 1975 is coupled to the ISP 1915 to provide internet connectivity to the client computer systems 1950 and 1960. The gateway computer system 1975 can be a conventional server computer system. Also, the web server system 1920 can be a conventional server computer system.

Alternatively, a server computer system 1980 can be directly coupled to the LAN 1970 through a network interface 1985 to provide files 1990 and other services to the clients 1950, 1960, without the need to connect to the internet through the gateway system 1975.

Through the use of such a network, for example, the system can also provide an element of social networking, in some embodiments, whereby users can contact other users having an interest in sharing the data and other relevant information, for example, on an intranet, internet, or cloud environment. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, in an MMO environment, from a user to a server to a user, from a server to a user (or plurality of users).

Example 8. A 360-Degree, Single-Unit Camera Having a Lumen for Mounting a Carrier, while Keeping the Operator and Mounting and Moving Components at Least Substantially Out of the Field of View of the Lenses and Enhancing Image Stability and Clarity One of skill will appreciate that the lighting is not always necessary and, therefore, can be considered optional in some embodiments. However, in such embodiments, it may still be desired to keep the mounting, locking, and moving the 360-degree, single-unit camera while keeping the operator and mounting locking, and moving components at least substantially out of the field of view of the camera while enhancing image stability and clarity.

Figure 15A:
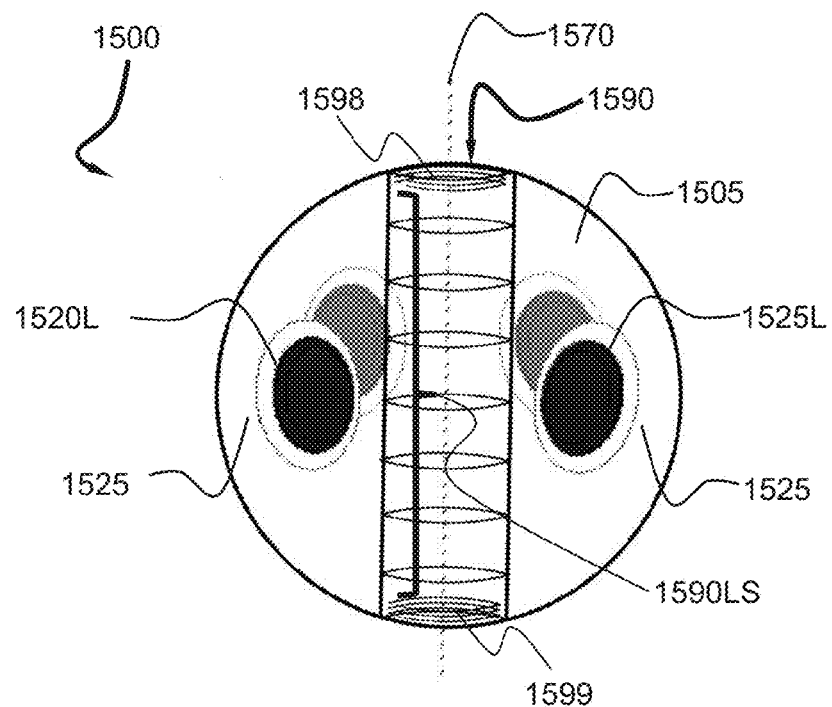
FIGS. 15A through 15D illustrate a variety of lumen configurations for the 360-degree cameras taught herein, according to some embodiments.
Figure 15B:
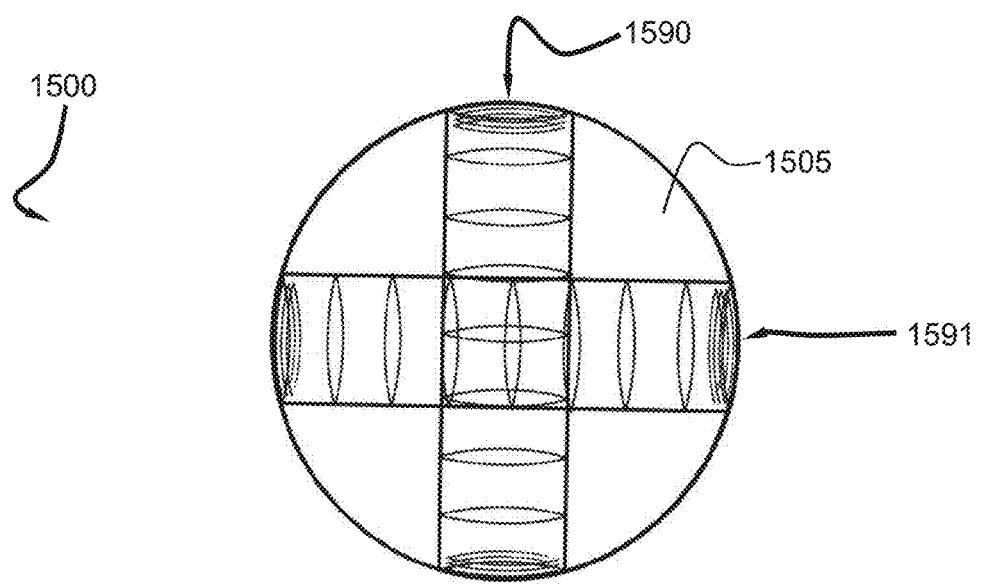

FIGS. 15A through 15D illustrate a variety of lumen configurations for the 360-degree cameras taught herein, according to some embodiments. FIG. 15B shows, for example, an embodiment wherein a 360 degree camera 1500 hays a lumen 1590 for mounting, moving, and/or cooling the camera in a manner that is at least substantially invisible to the camera when acquiring a spherical image. The lumen has a luminal surface 1590LS that can be used to releasably mount the camera to a carrier. It should be appreciated that the term "releasably mount" can be used to refer, for example, to "releasably fixed" and "releasably locked" as a way to teach that a component, device or system can be mounted, fixed, or locked in a manner that is mechanically releasable by the user, either manually, automatically, or remotely. A component, device, or system, for example, can be releasably fixed or locked using any torque, friction, snaps, clips, threads, pinch mechanisms, gear/transmission mechanisms, pulley/weight mechanisms, fluid pressure controls including gas and liquid, and the like, known to those of skill, in some embodiments.

The camera can include, for example, a housing 1505 having a plurality of surfaces 1520,1525 that includes at least a first outer surface 1520, and a second outer surface 1525, the housing 1505 configured (i) for passage of the lumen 1590 with an inlet port 1598 and an exit port 1599 and (ii) to have a plurality of surfaces that includes at least a first outer surface and a second outer surface. Of course, the camera also has a plurality of lenses 1520L,1525L on the housing, the plurality of lenses 1520L,1525L configured to collect a plurality of imaging spaces (not shown; refer to FIG. 1A) that are stitched together to form the spherical image, the plurality of lenses including at least a first lens 1520L on the first outer surface 1520 and a second lens 1525L on the second outer surface 1525; wherein, the first lens 1520L is configured to obtain a first image data set corresponding to a first imaging space and the second lens 1525L is configured to obtain a second image data set corresponding to a second imaging space. The camera housing 1505 can have any configuration taught herein, including a 4-sided, 5-sided, 6-sided, 8-sided, 12-sided, or 20-sided polyhedron. a cuboctahedron, a snub cuboctahedron, a sphere, and a capsule. The lumen 1590, for example, can have an axis that is coincident with the long axis of the capsule, at least in some embodiments.

Each lens is operably connected to an image sensor, such that the camera 1500 has a plurality of image sensors (not shown; refer to FIG. 1A) in the housing 1505, each of the plurality of image sensors (not shown; refer to FIG. 1A) configured for operably connecting to a respective lens in the plurality of lenses 1520L,1525L, the plurality of image sensors (not shown; refer to FIG. 1A) including at least a first image sensor (not shown; refer to FIG. 1A) placed in the camera housing behind the first lens and a second image sensor (not shown; refer to FIG. 1A) placed in the camera housing behind the second lens. Each image sensor is operably connected to a circuit (not shown; refer to FIG. 1B) that includes a processor (not shown; refer to FIG. 1B) and a memory (not shown; refer to FIG. 1B) on a non-transitory computer readable storage medium; and, a power source.

In order to keep the carrier at least substantially invisible to the lenses 1520L,1525L, the inlet port 1598 and exit port 1599 can be placed such that the carrier enters an exits the camera in a blind space (not shown; refer to FIG. 1B). As such, in some embodiments, a plurality of blind spaces, n, each of which include a blind area on the housing, include an inlet port blind space that is at least substantially excluded from the plurality of imaging spaces. The inlet port blind space can include, for example, the inlet port 1598 of the lumen; and, an outlet port blind space that is at least substantially excluded from the plurality of imaging spaces, the outlet port blind space including the outlet port 1599 of the lumen.

One of skill will select a carrier that is appropriate for a given camera shoot and location, as the ability to use the carrier 1570 will depend, at least in part, on the environment in which the camera shoot is occurring. In some embodiments, for example, the carrier 1570 can include a wire; rope; cable; rod; a conductive carrier such as a conductive metal, polymer, or optical fiber; or, a combination thereof. The wire, for example, may increase stability of the camera 1500 as length of the carrier 1570 increases, allowing for the application of more tensile force than the rope, allowing the wire to be more taut than the rope, at least in some embodiments. The rope, for example, may be easier to use as a carrier in some embodiments than the wire, due to perhaps its flexibility, portability, friction coefficient, and the like, but the rope will often not be as stable as the wire. The cable, for example, may provide a nice combination of features of the wire and rope, as the cable is also braided like the rope but may have a tensile yield strength that is at least as high as the wire to provide a taught connection, and it may have other useful characteristics, such as a higher ignition temperature, higher resistance to frictional wear, and the like. The rod, for example, can be used as a rigid, or at least substantially rigid carrier that can attach at a single end, which may be useful under some environmental mounting constraints, such as mounting on a single point vehicle, a single point on a building or other structure, and the like. The conductive carrier such as a conductive metal, polymer, or optical fiber allows a hardwire communication to occur with the camera to send instructions and data, or to receive data, including images, in some embodiments. In some embodiments, the conductive wire can send power to the camera, and/or data to and from the camera. It should be appreciated that having a real-time ability to transmit data will allow for extending the filming time, as images, whether still or video, require a large amount of storage space in the camera 1500, and if the carrier 1570 transmits data, whether intermittently or real-time, this allows for a regular, or even constant, move of data from the camera 1500 which addresses operator concerns regarding the camera 1500 that may arise from an otherwise limited data storage capacity in the camera 1500.

In some embodiments, the camera 1500 can be configured to include a plurality of blind spaces, n, (not shown; see FIG. 1A) which include (i) a first blind space (not shown; see FIG. 1A) that is at least substantially excluded from the plurality of imaging spaces (not shown; see FIG. 1A), the first blind space (not shown; see FIG. 1A) including a first blind area (not shown; see FIG. 1A) on the housing 1505; and, (ii) a second blind space (not shown; see FIG. 1A) that is at least substantially excluded from the plurality of imaging spaces (not shown; see FIG. 1A), the second blind space including a second blind area (not shown; see FIG. 1A) on the housing 1505; and, a plurality of light sources, n–x, (not shown; see FIG. 1A) where x ranges from 0 to (n–4), are integrated into the plurality of blind spaces (not shown; see FIG. 1A), each of plurality of light sources (not shown; see FIG. 1A) placed in one of the plurality of blind spaces (not shown; see FIG. 1A) such that the plurality of light sources (not shown; see FIG. 1A) is at least substantially invisible to the camera 1500 when acquiring the plurality of imaging spaces (not shown; see FIG. 1A), the plurality of light sources (not shown; see FIG. 1A) including a first light source (not shown; see FIG. 1A) in the first blind area (not shown; see FIG. 1A) and a second light source (not shown; see FIG. 1A) in the second blind area (not shown; see FIG. 1A).

Example 9. Systems Including a 360-Degree, Single-Unit Camera Having a Lumen for Mounting and Moving a Camera Using a Carrier, and the Carrier One of skill will appreciate that the cameras with the lumens provide operators with great flexibility in how the camera can be mounted and moved. The flexibility can be obtained in the design of a system that is used for the mounting and moving of the cameras taught here. In some embodiments, the systems generally include at least a camera as taught herein, and the carrier. One of skill will appreciate that the carrier can include a means for mounting the camera at a desired location to obtain the spherical image. Naturally, the systems can further comprise a lighting array, as taught herein, for integrating with the camera for use in combination with the mounting and moving of the camera for a camera shoot.

Figure 15C:
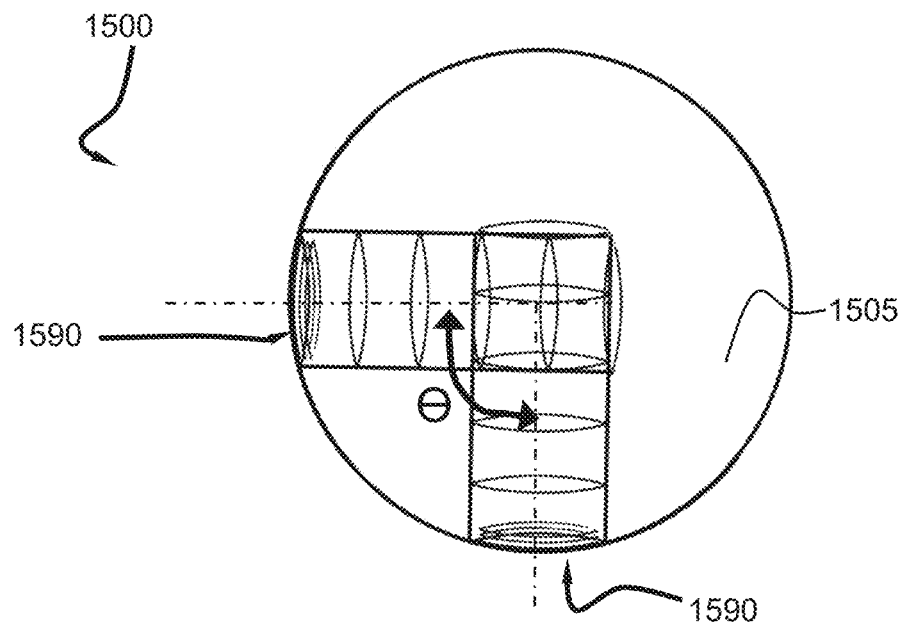
Figure 15D:
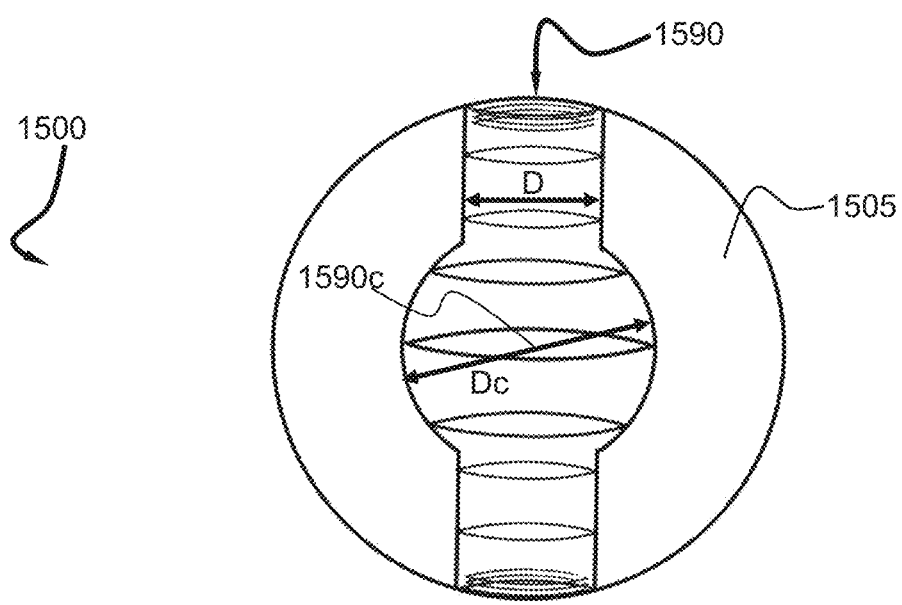

The camera 1500 having a lumen 1590 is discussed above, and one of skill should appreciate that the lumen configuration can also be designed to an operators preference. FIG. 15B, for example, shows the use of a second lumen 1591, and FIG. 15C shows the use of a lumen that is non-linear which can be, for example, a lumen with a single angle, $\theta$, ranging from about 0° to about 175°, from about 0° to about 175°, from about 0° to about 150°, from about 0° to about 120°, from about 0° to about 90°, from about 0° to about 45°, from about 10° to about 80°, from about 100° to about 170°, or any range therein in increments of about 1°, in some embodiments. FIG. 15D shows a lumen configured with a chamber 1590c, having a dimension, Dc, for example a chamber diameter, that is greater than the corresponding dimension, D, for example lumen diameter, of the lumen 1590. One of skill will appreciate that the chamber provides extra space and, as a result, the potential for extra functionality for the camera 1500 through the lumen 1590. In some embodiments, the chamber can be used for a cooling mechanism for the camera 1500, a movement mechanism to translate/rotate the camera 1500, a locking mechanism for the camera 1500, power storage for the camera 1500, counterweights to bias camera orientation of the camera 1500, and the like. In some embodiments, D can range from about 1 mm to about 50 mm, from about 5 mm to about 30 mm, from about 10 mm to about 20 mm, or any range therein in increments of 1 mm. In some embodiments, Dc can range from about 13 mm to about 30 mm, from about 5 mm to about 25 mm, from about 10 mm to about 20 mm, or any range therein in increments of 1 mm. In some embodiments the lumen configuration can at least resemble a round cylinder, a square cylinder, a triangular cylinder, a pentagonal cylinder, a hexagonal cylinder, an octagonal cylinder, and the like. Likewise, the chamber can at least resemble a 4-sided polygon, a 6-sided polygon, an 8-sided polygon, 4-sided, 5-sided, 6-sided, 8-sided, 12-sided, or 20-sided polyhedron, a cuboctahedron, a snub cuboctahedron, a sphere, or a capsule. The lumen 1590, for example, can have an axis that is coincident with the long axis of the capsule, at least in some embodiments.

It should be appreciated that the cameras taught herein, regardless of housing configuration, shape, and the like, can vary widely in size. In some embodiments, for example, the maximum dimension of the camera can range from about 1 inch to about 10 inches, from about 2 inches to about 8 inches, from about 3 inches to about 6 inches, from about 4 inches to about 5 inches, or any range therein in increments of 0.1 inches.

Figure 16A:
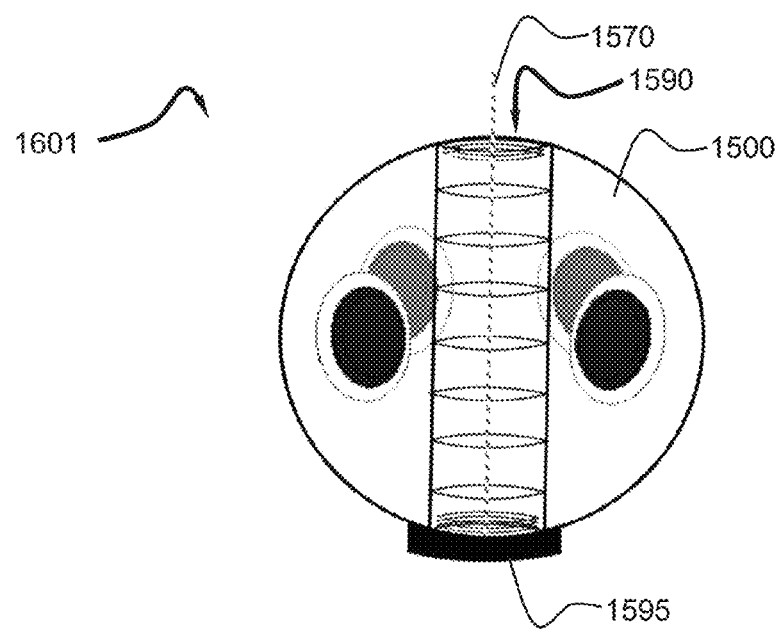
FIGS. 16A and 16B illustrate a plug mount system for a lumen of a 360-degree camera, according to some embodiments.
Figure 16B:
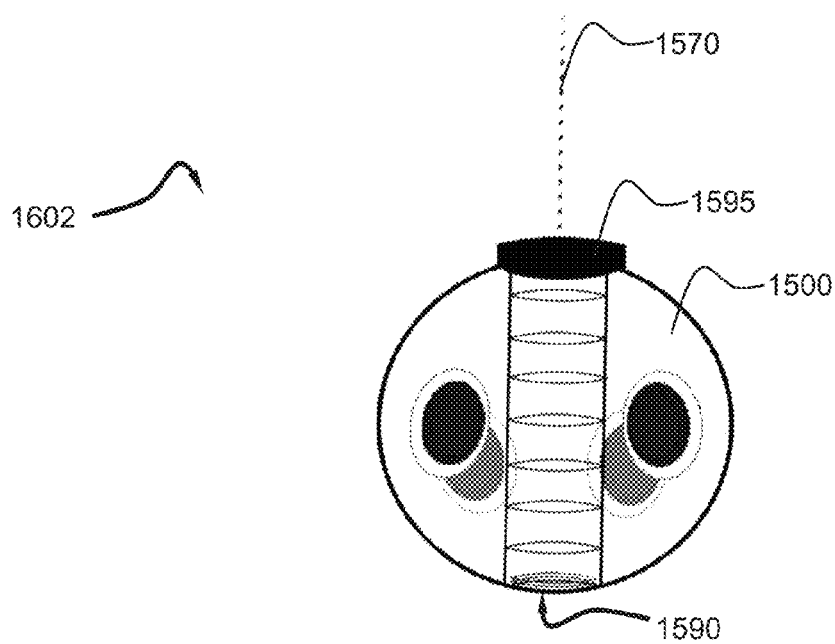

FIGS. 16A and 16B illustrate a plug mount system for a lumen of a 360-degree camera, according to some embodiments. FIG. 16A shows the use of a system 1601 having plug 1595 that can be attached at one end of the lumen, and the carrier 1570 can extend through the lumen 1590 to carry the camera for a camera shoot. In some embodiments, the carrier 1570 has a camera end (attaching to the luminal surface of plug 1595) and a fixed end (not shown) that attaches to a structure such as a crane, jig, boom, drone, or any other structure known to one of skill in the art from which the camera 1500 can be tethered, wherein such a structure can be mobile or fixed. FIG. 16B shows the use of a system 1602 having a carrier 1570 attached to an abluminal surface of the plug 1595.

Figure 17A:
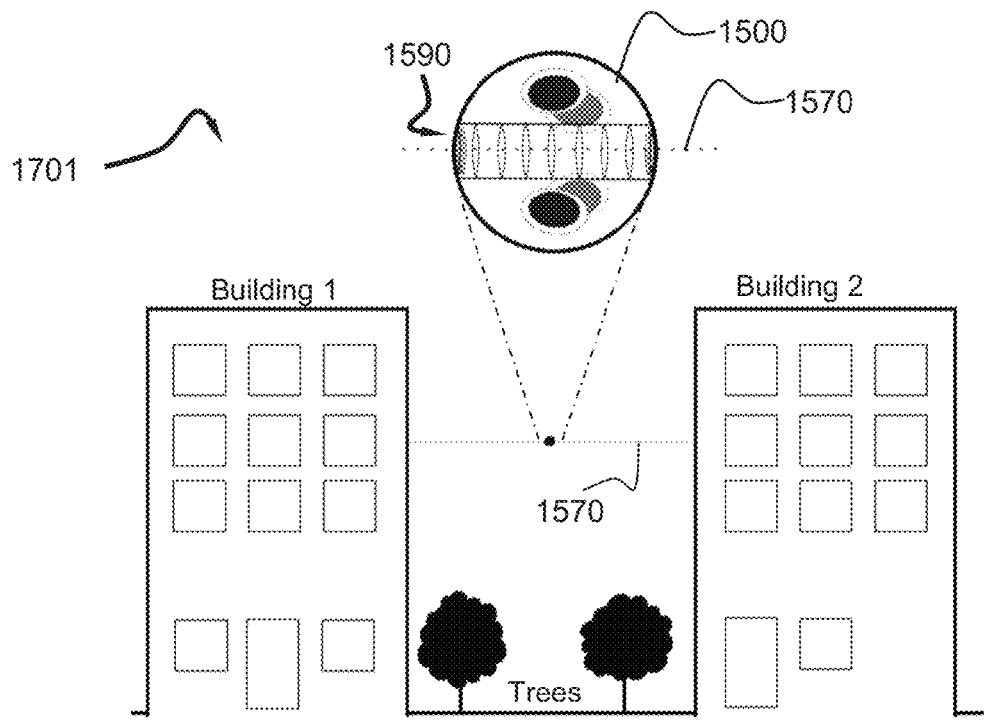
FIGS. 17A through 17E illustrate systems that use a wire, rope, rod, and hover mounts as carriers for a 360-degree camera with a lumen, according to some embodiments.
Figure 17B:
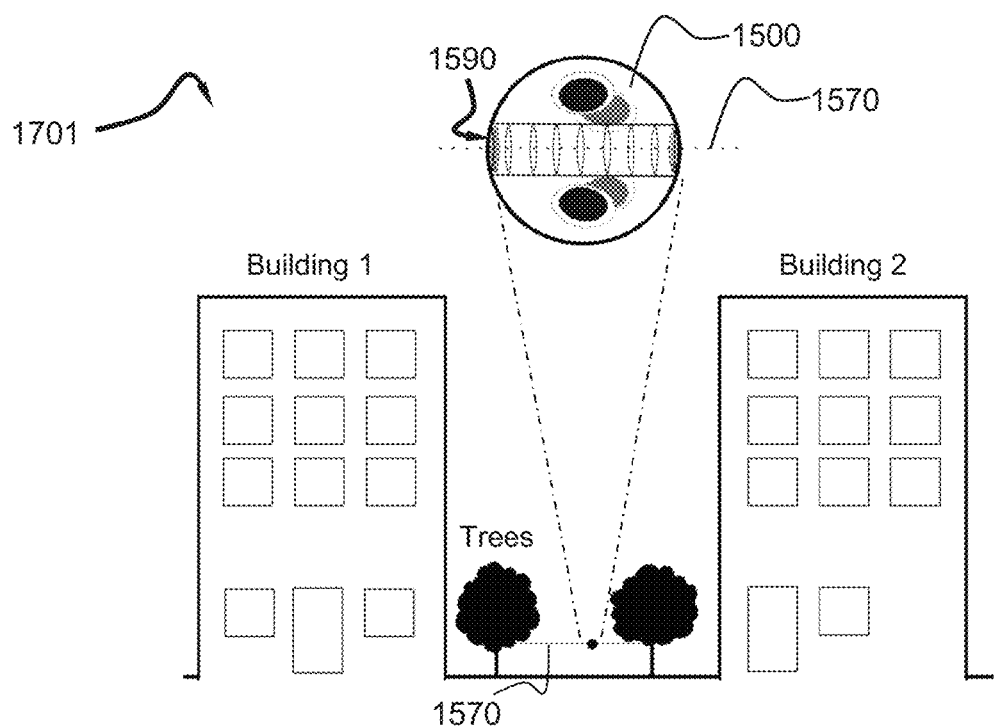
Figure 17C:
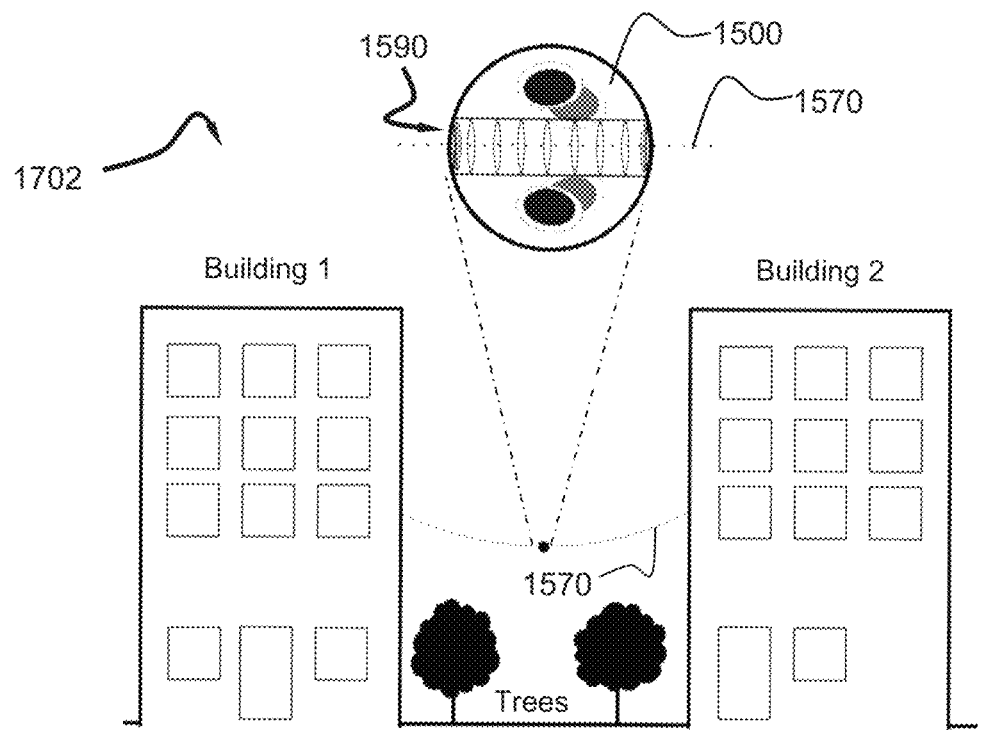
Figure 17D:
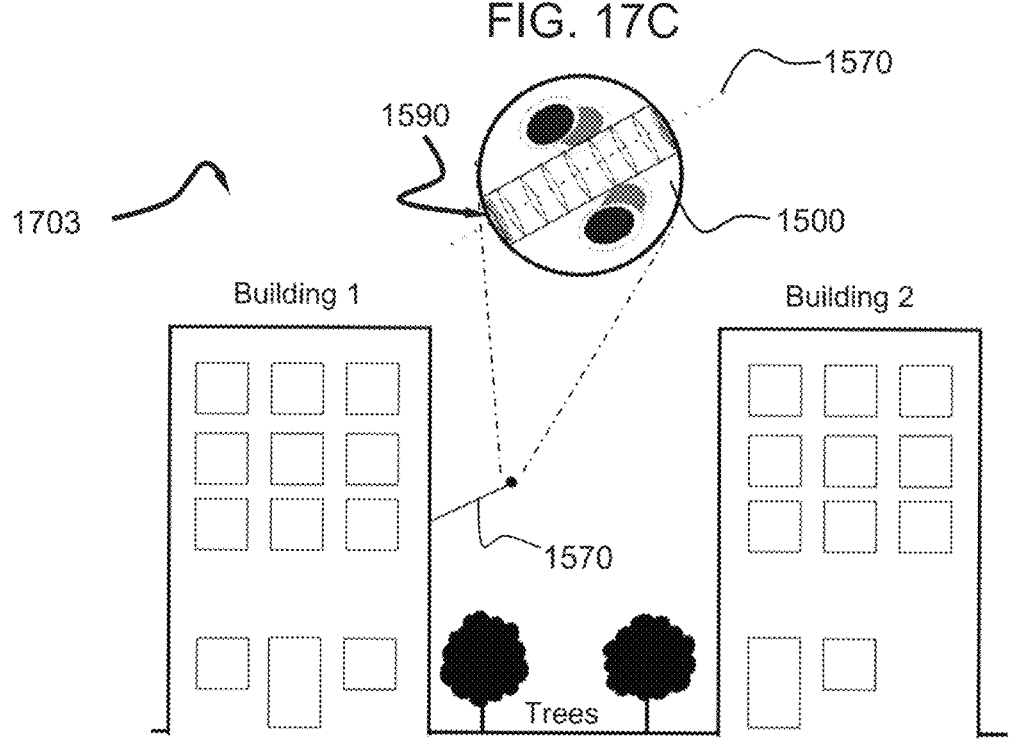
Figure 17E:
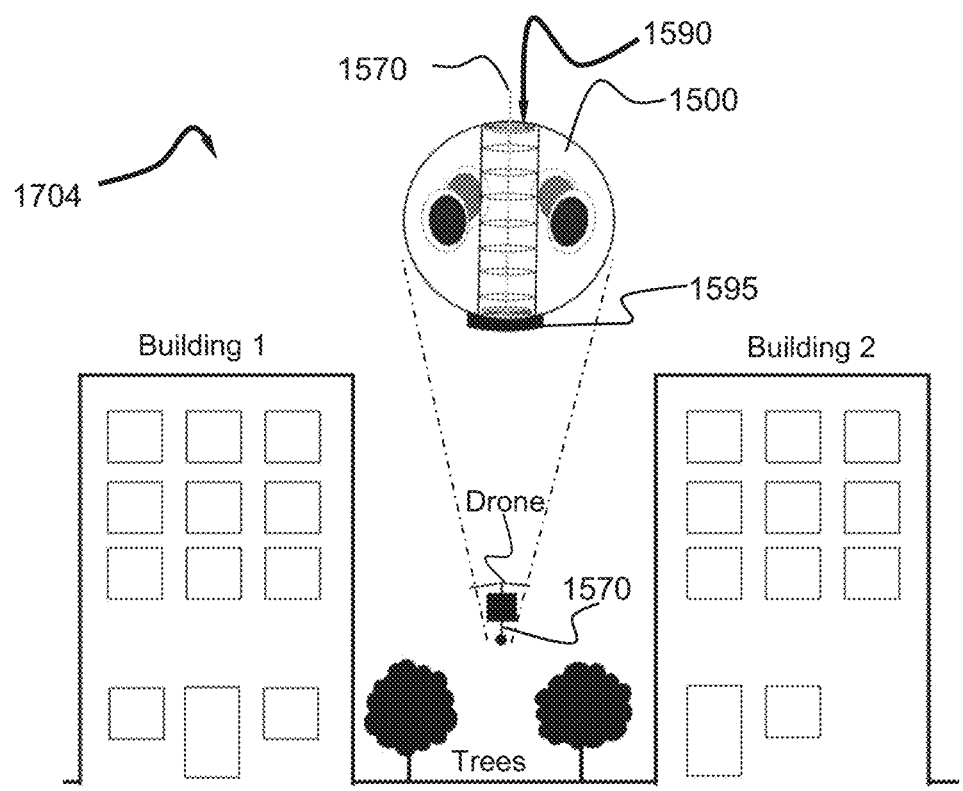

FIGS. 17A through 17E illustrate systems that use a wire, rope, rod, and hover mounts as carriers for a 360-degree camera with a lumen, according to some embodiments. FIG. 17A shows the use of a system 1701 having a taut wire or cable as the carrier 1570, wherein the wire or cable is attached at each end to adjacent buildings. FIG. 17B shows the use of the system 1701 having the use of the taught wire or cable as the carrier 1570, wherein the wire or cable is attached lower to the ground, for example, fastening at each end of the carrier 1570 to adjacent trees. FIG. 17C shows the use of a system 1702 having a rope, or a wire or cable that is not taught, as the carrier 1570, wherein the rope, wire, or cable is attached at each end to adjacent buildings. FIG. 17D shows the use of a system 1703 having a rigid carrier, such as a rod, which is attached at one end to a building. FIG. 17E shows the use of a system 1704 having a mobile structure, such as a drone, which is attached at one end to the mobile structure.

Figure 18A:
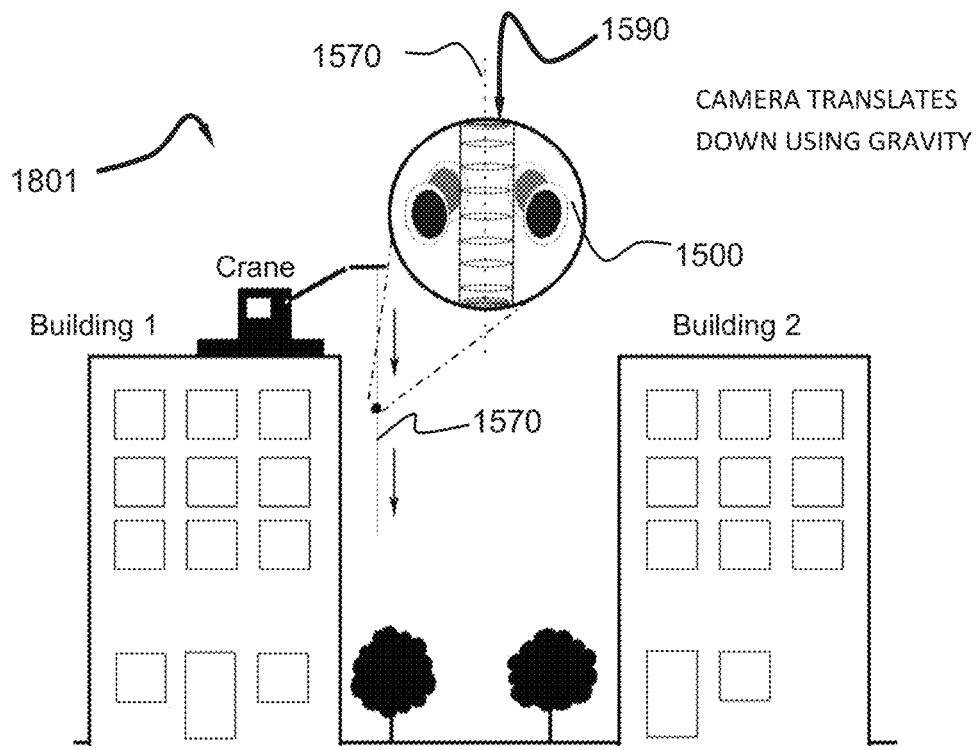
FIGS. 18A through 18C illustrate a system for movement of a 360-degree camera on the carrier using gravitational force, according to some embodiments.
Figure 18B:
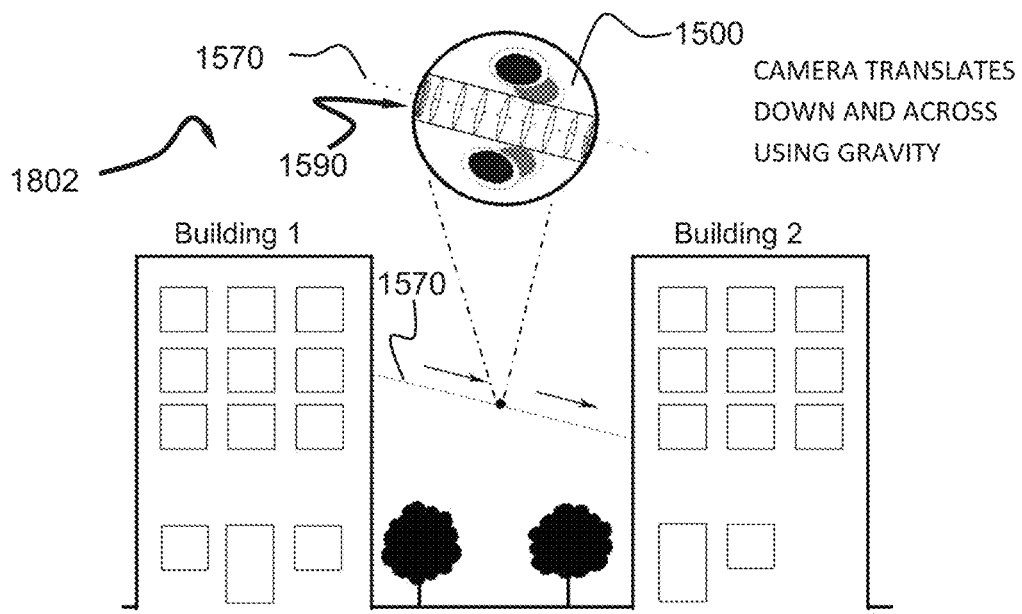
Figure 18C:
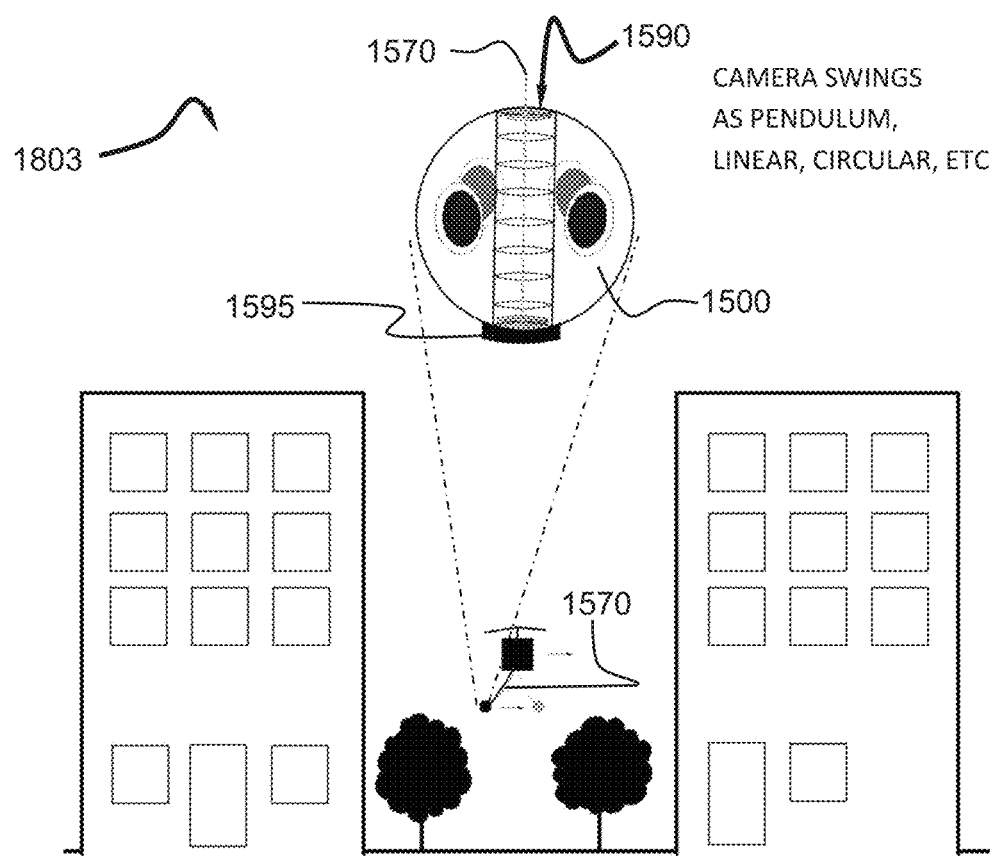

FIGS. 18A through 18C illustrate a system for movement of a 360-degree camera on the carrier using gravitational force, according to some embodiments. FIG. 18A shows a translation movement through the use of a system 1801 with a crane or jig, the carrier 1570 being attached at one end to the crane or jig. In some embodiments, the camera can be configured to allow the camera 1500 to translate down the carrier 1570 using the force of gravity, wherein the speed of the descent can be controlled through frictional forces created between the camera 1500 and the carrier 1570, In some embodiments, the movement can be stopped using a stopper (not shown), such as a fixed, or releasably fixed enlargement or clamp, for example, that is set at a given descent distance, or a locking mechanism in the camera that is activated over a preset distance, automatically activated, or remotely activated. FIG. 18B shows a translational movement through the use of system 1802 that is both horizontal and vertical, down and across, which can also have the same frictional and/or locking mechanisms of FIG. 18A. FIG. 18C shows the use of a system of 1803 having a mobile structure, such as a drone, which is attached at one end to the mobile structure, and the camera 1500 can be moved in a pendulum motion in any direction for a desired effect. In some embodiments, the components, devices, and systems taught herein have a "total lock" safety mechanism that locks the camera on the carrier to protect the users and equipment from potential injury due to camera acceleration such as from dropping inadvertently while on or off the carrier, or any other means of acceleration while attached to the carrier.

One of skill will appreciate that any suitable locking mechanism, whether manual, automatic, or remotely controlled, may be used to lock the camera 1500 in position on the carrier 1570. A clamping mechanism such as a pinching mechanism or set screw can be used in some embodiments. In some embodiments, the mechanism can control rate of descent due to gravity, for example, by controlling an amount of friction between the lumen 1590 and the carrier 1570. As such, the lock can be set for no movement, slow movement, fast movement, and the like. As such, in some embodiments, the systems can include a software control that includes a process and a memory on a non-transitory computer readable medium, the memory including a lock/release module that allows for control of the rate at which the camera 1500 moves on the carrier 1570.

Likewise, one of skill will appreciate that the movement of the camera 1500 in any embodiment taught herein can also be software controlled. As such, in some embodiments, the systems can include a software control that includes a process and a memory on a non-transitory computer readable medium, the memory including a translation module that allows for control of the rate at which the camera 1500 translates on the carrier 1570, and a rotation module that allows for control of the rate at which the camera 1500 rotates on the carrier 1570.

Figure 19A:
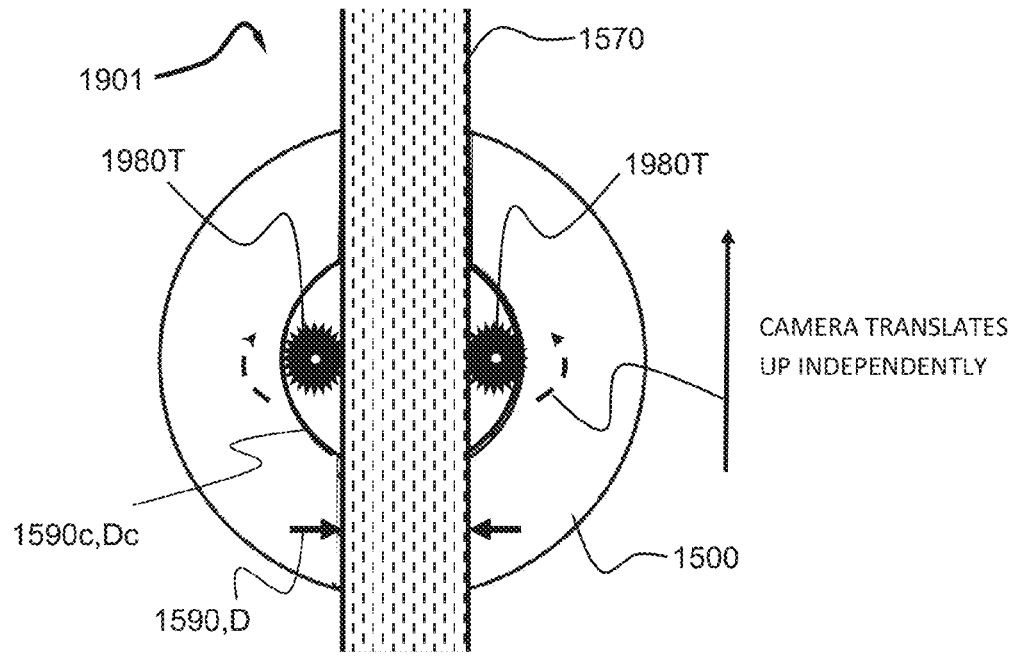
FIGS. 19A through 19D illustrate a system for movement of a 360-degree camera on the carrier using mechanical force, according to some embodiments.
Figure 19B:
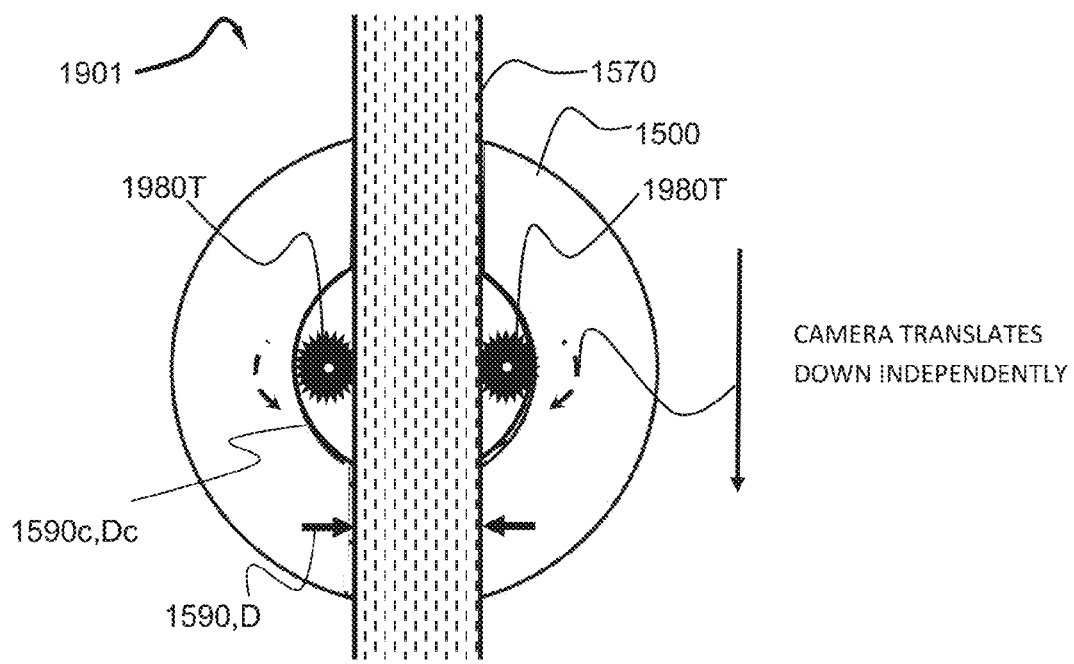
Figure 19C:
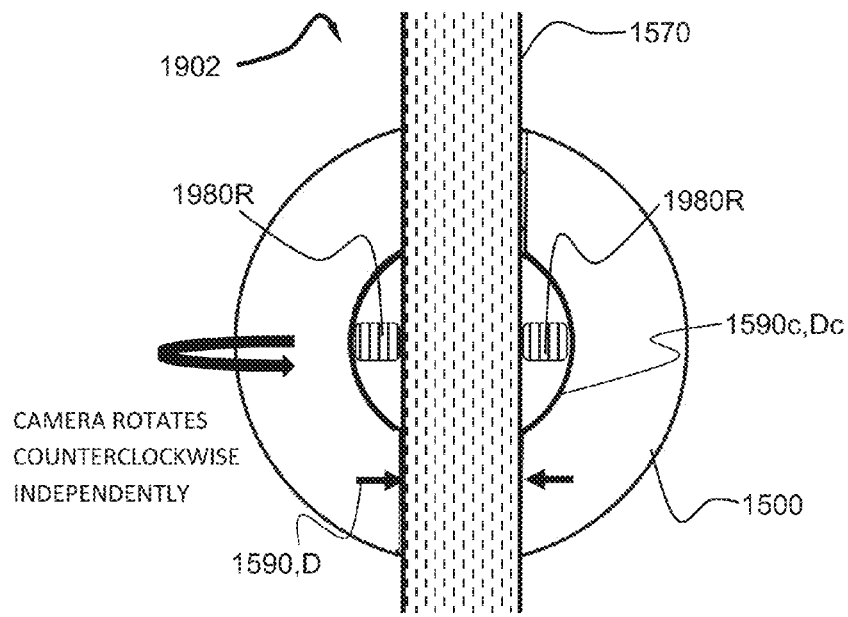
Figure 19D:
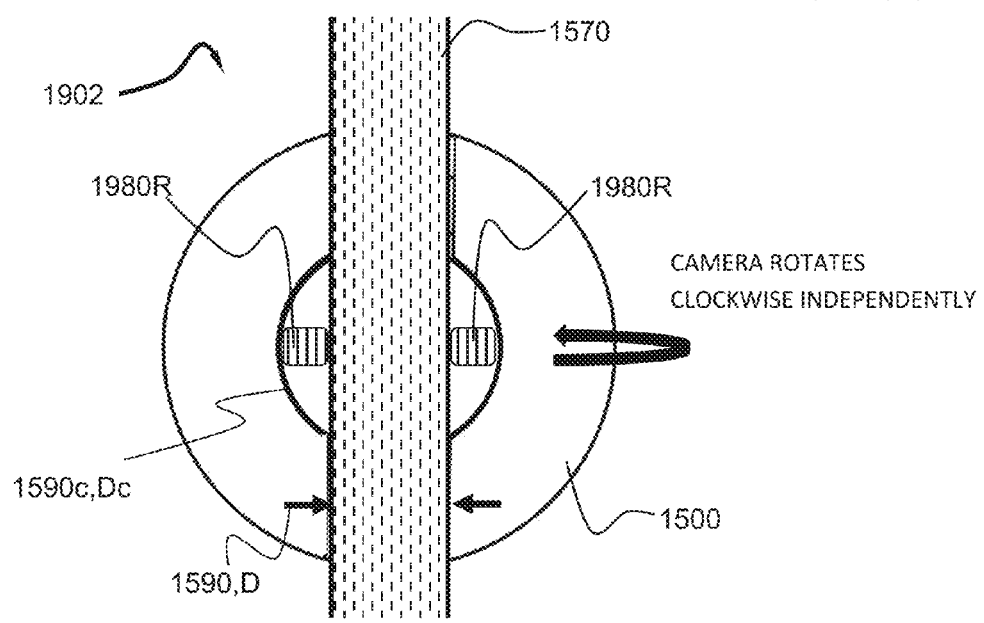

FIGS. 19A through 19D illustrate a system for movement of a 360-degree camera on the carrier using mechanical force, according to some embodiments. FIGS. 19A and 19B show how a mechanical force can be used in the system 1901 to translate a camera 1500 upward and downward on a carrier 1570, and independent of any movement of the carrier 1570. The translational movement can occur by any mechanical means known to one of skill, at least in many embodiments. In FIGS. 19A and 19B, a translational gear or other friction component 1980T is configured to operably connect to a drive mechanism that rotates the gear or other frictional component 1980T to translate the camera 1500 on the carrier 1570, independent of any movement of the carrier 1570. FIGS. 19C and 19D show how a mechanical force can be used in the system 1902 to rotate a camera 1500 clockwise and counterclockwise on a carrier 1570, and independent of any movement of the carrier 1570. As with the translational movement, the rotation movement can occur by any mechanical means known to one of skill, at least in many embodiments. In FIGS. 19C and 19D, a rotational gear or other friction component 1980R is configured to operably connect to a drive mechanism that rotates the gear or other frictional component 1980R to rotate the camera 1500 on the carrier 1570, independent of any movement of the carrier 1570. In FIGS. 19A through 19D, the mechanism for the translational and rotational movement can be located in the chamber 1590c of the lumen 1590, in some embodiments.

FIGS. 20A through 20C illustrate a system for translational and rotational movement of a 360-degree camera independent of the carrier using mechanical force, according to some embodiments. FIG. 20A shows how a system 2001 for moving the camera 1500 may be configured for the translational and rotational movement of the camera independent of the carrier using mechanical force. The carrier 1570 that traverses the lumen 1590 includes a guideshaft 2080GS having a long axis that runs at least substantially parallel to the long axis of a translational gear 2080TG. FIG. 20B illustrates the drive transmission 2080DRIVE for the translational and rotational movement of the camera 1570 that is independent of any movement of the carrier 1570. The drive transmission 2080DRIVE includes a rotational gear 2080RG for the rotation of the camera 1500 that is independent of any movement of the carrier 1570. The rotational gear 2080RG is driven by the rotation spindle gear 2080RSG which is rotated using the rotation spindle 2080RS which is in operable connection with a source of rotation, such as an electric motor, the operation of which can be manual, automatic (programmable), or remotely controlled by an operator. The translational movement of the camera 1500 which is independent of the rotational movement and any movement of the carrier 1570 can be accomplished by a rotation of the translation spindle 2080TS. FIG. 20C is a plug 1595 having (i) a guide-hole 2080GH to guide movement of the guideshaft 2080GS during translational movement of the camera 1500; and, (ii) a translational gear driver 2080TGD that drives the translation of the camera 1500 from rotation of the translational gear 2080TG. The plug 1595 can be configured with a rotatable portion 1595r and a bush portion 1595b to facilitate the desired independent movement between the camera 1500 and the carrier 1570, as well as between the translational and rotational movement of the camera 1500 on the carrier 1570.

Figure 21:
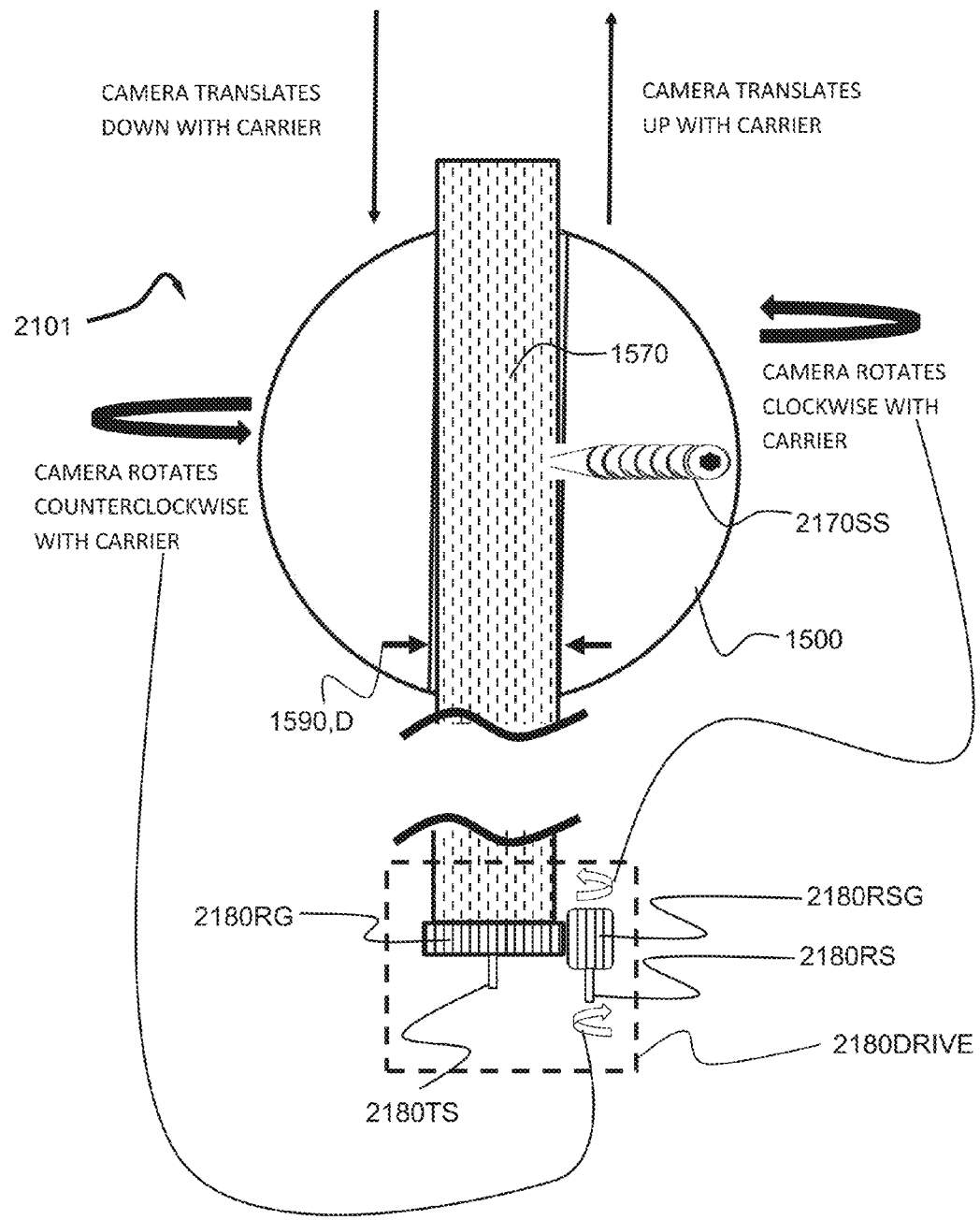
FIG. 21 illustrates a system for movement of a 360-degree camera with the carrier using mechanical force through movement of the carrier, the camera being releasably fixed on the carrier, according to some embodiments.

FIG. 21 illustrates a system for movement of a 360-degree camera with the carrier using mechanical force through movement of the carrier, the camera being releasably fixed on the carrier, according to some embodiments. FIG. 21 shows how a system 2101 for moving the camera 1500 may be configured for moving the camera 1500 with the carrier 1570 using mechanical force on the carrier 1570. A set screw 2170SS can be used to releasably lock the camera 1500 onto the carrier 1570. Translation movement of the camera can be obtained by translating the carrier 1570, and rotation movement of the camera 1500 can be obtained by rotating the carrier 1570. illustrates the drive transmission 2080DRIVE for the translational and rotational movement of the camera 1570 that is independent of any movement of the carrier 1570. The drive transmission 2180DRIVE includes a rotational gear 2180RG for the rotation of the camera 1500 that moves with any movement of the carrier 1570. The rotational gear 2180RG provides the clockwise and counterclockwise rotation of the camera 1500, and is driven by the rotation spindle gear 2180RSG which is rotated using the rotation spindle 2180RS which is in operable connection with a source of rotation, such as an electric motor, the operation of which can be manual, automatic (programmable), or remotely controlled by an operator.

It should be appreciated that the moving the camera 1500 horizontal finds use in many camera shoots. For example, videos from a concert are often desired for additional promotion of performers. A moving wire with a 360-degree camera fixably attached to the wire can be used to shoot all around while slowly moving the camera with the wire during the concert. In some embodiments, the wire can be pulled from left to right and right to left to move the camera. Using this technique, it can be possible to grab that "yet-unseen" concert feature the performers can use in their social media announcements. Also, people that attended the concert can see themselves in the audience and show the video to their friends and family.

Figure 22:
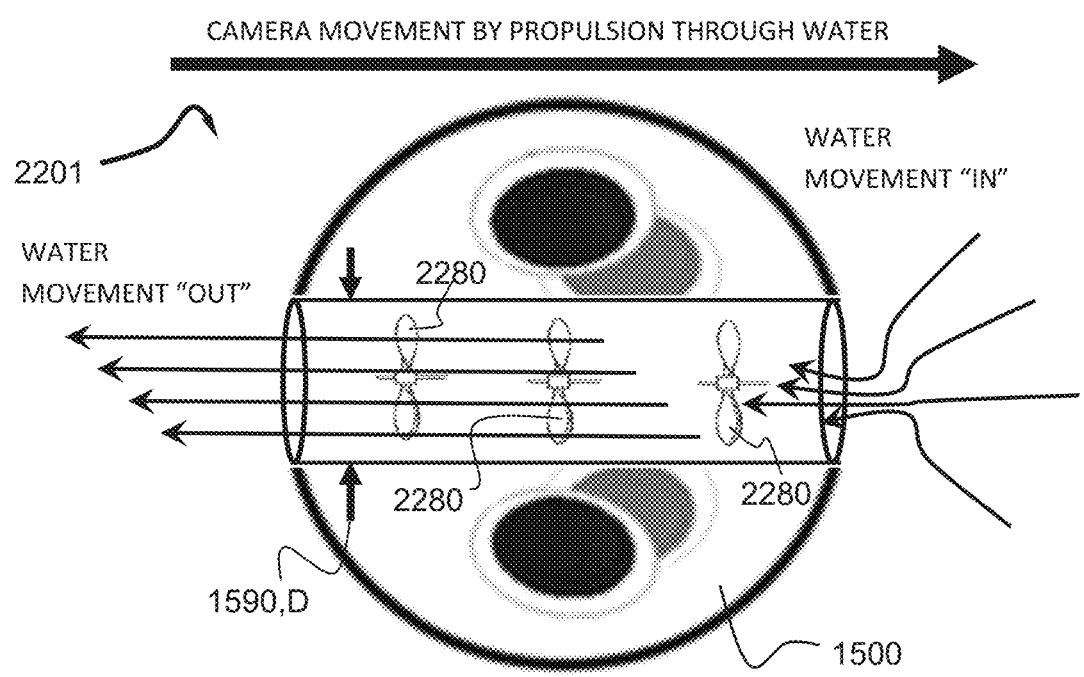
FIG. 22 illustrates a system for movement of a 360-degree camera using mechanical force through propulsion of the camera through water, according to some embodiments.

FIG. 22 illustrates a system for movement of a 360-degree camera using mechanical force through propulsion of the camera through water, according to some embodiments. In some embodiments, such as system 2201, the camera 1500 can waterproof, or placed in a suitable underwater casing, and propellers 2280 can be moved in the lumen 1590 by to create a propulsion by moving water into the tunnel and out of the tunnel with the propellers 2280. In some embodiments, the lumen can contain a chamber 1590c for position of a drive mechanism (not shown) for the propellers. The camera can be designed as a submarine with mechanism that assist in steering the camera through the water, perhaps to depths that would otherwise carry too much pressure, or simply too much risk, for manual operation of the camera by a diver. Similar to use of a drone in the air for ease of use and to reduce risk, the camera can be taken under water.

Figure 23:
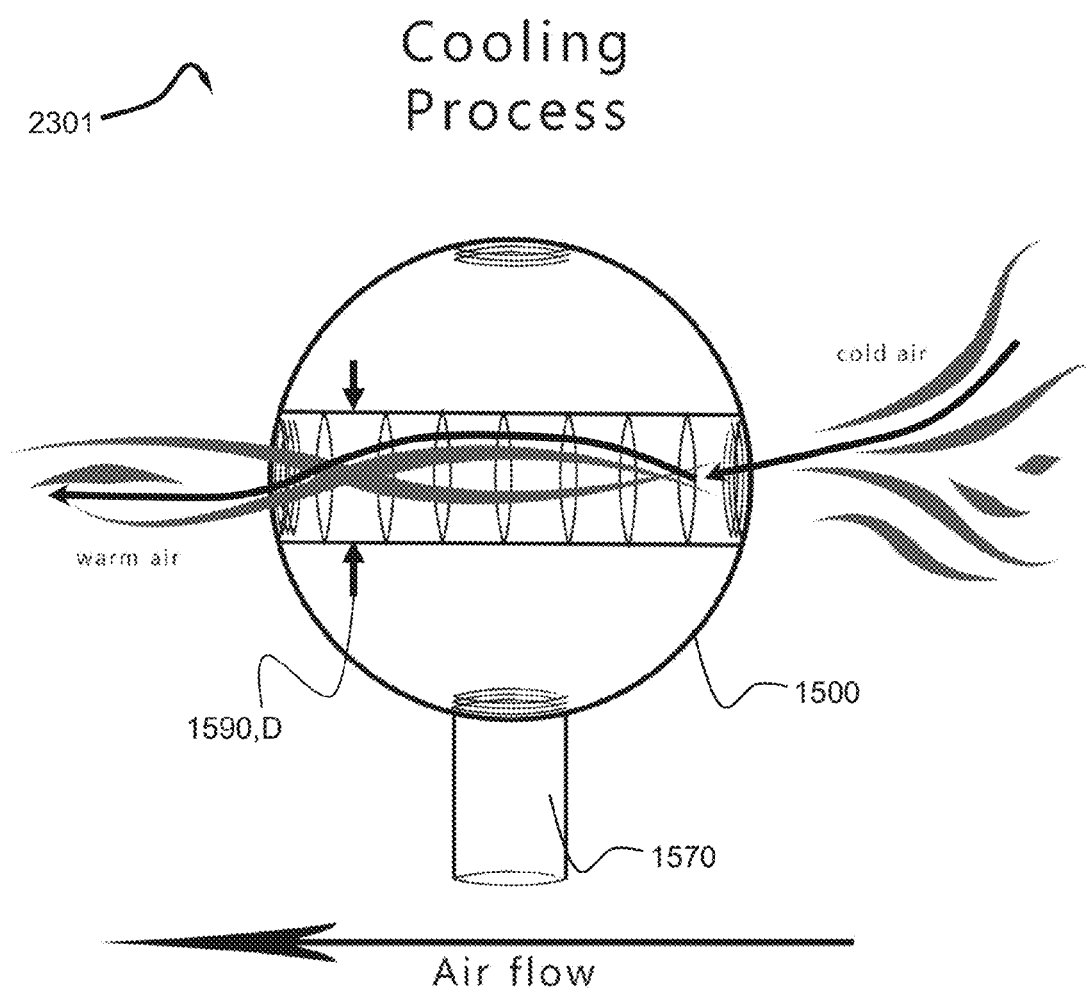
FIG. 23 illustrates a system for cooling a 360-degree camera using convection, according to some embodiments.

FIG. 23 illustrates a system for cooling a 360-degree camera using convection, according to some embodiments. In some embodiments, such as system 2301, the camera 1500 can be positioned to cool the camera 1500 using the lumen 1590 as a heat transfer component by moving air into the tunnel and out of the tunnel, the air serving as the convective component to remove heat. In some embodiments, the carrier 1570 can be releasably fastened to the camera 1500 on one end and mounted to a base (not shown) at the other end to position the camera for a camera shoot. The base can be, for example, a vehicle to enable motion, or a stationary device. One of skill will appreciate how this feature can be used to keep the camera cool using any fluid capable of cooling the camera such as, for example, air, water, or oil. For example, a user might be on a safari for a camera shoot in Tunisia. It is very hot, and temperatures exceed 40-degrees Celsius. As such, its desirable to stay in a cooled vehicle and mount the camera outside of the vehicle, in the hot environment. The lumen 1590 of the camera 1500 can then be used for air cooling, and the carrier can be otherwise mounted to the camera 1500 and the vehicle. In this way, the operation time of the camera can be extended in this hot environment.

Figure 24A:
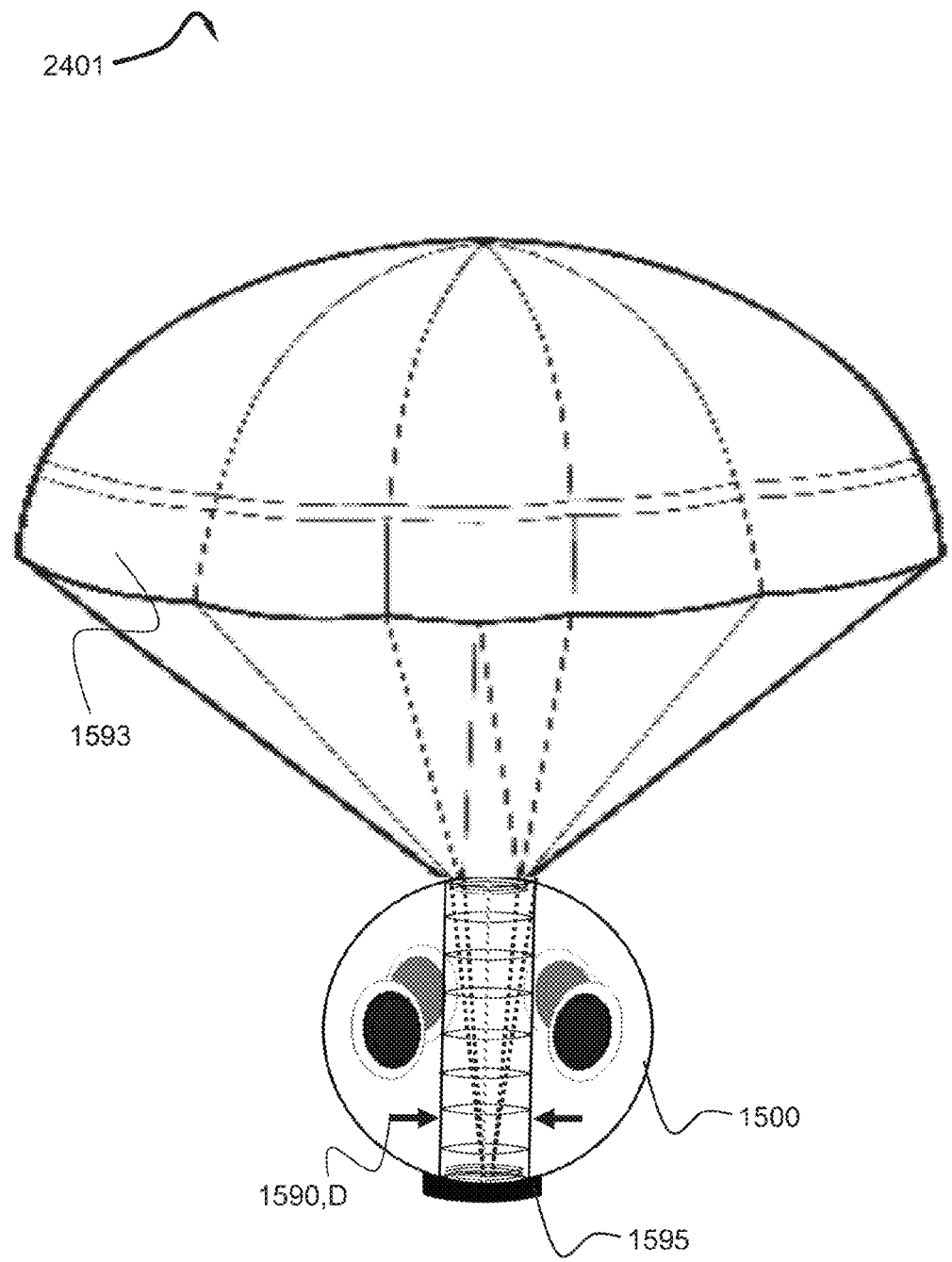
FIGS. 24A and 24B illustrate a system for containing components of the system in the lumen, according to some embodiments.
Figure 24B:
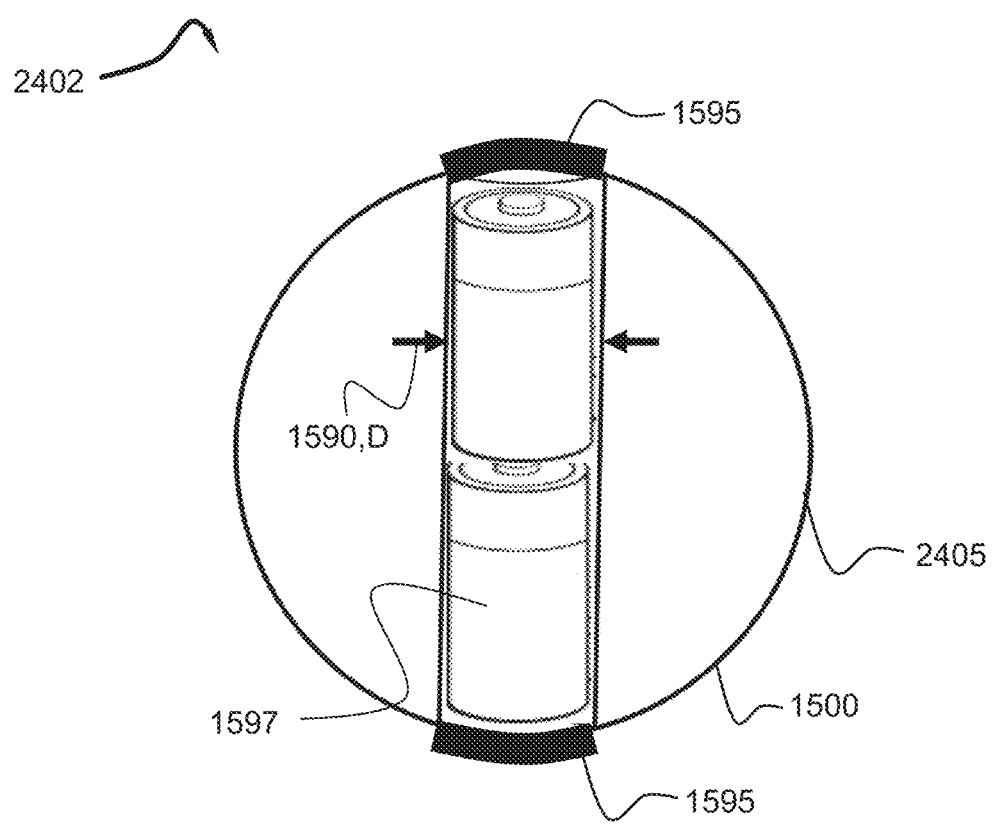

FIGS. 24A and 24B illustrate a system for containing components of the system in the lumen, according to some embodiments. FIG. 24 shows how a parachute 1593 can be contained in the lumen 1590, the parachute contained using a plug 1595 that can be configured to release either manually, automatically, or remotely, in some embodiments. For example, in some embodiments, a user may want to take an overhead view using a 360-degree camera, and perhaps the user wants to capture a party in the street, and there is no time for preparation. She could reach the top of a tall building, for example, and throw the camera in the direction of the party. The parachute 1593 hidden in the lumen 1590 automatically releases after 2 seconds. After that, camera floats down slowly. A person on the ground can, in some embodiments, catch the camera. FIG. 24B, on the other hand, shows how the lumen 1590 can be used to store batteries 1597. These batteries 1597 can be used as a primary or secondary power source, in some embodiments.

One of skill will appreciate that means for accomplishing functions of the components, devices, systems, and methods are discussed and illustrated herein, however, it is also understood that the system is not limited to any of the particular embodiments discussed above. Equivalents that accomplish at least substantially the same function, in at least the substantially the same way, and achieve at least substantially the same result are intended to be covered by the embodiments taught herein. Moreover, any lists of alternatives are meant to include a proviso that one or more of the items listed can be excluded, in some embodiments.

We claim:

1. A method of creating a 360 degree camera as a single unit for acquiring a spherical image with a lumen having an inlet port and an exit port, the creating comprising:

selecting a housing for the 360 degree camera, the housing configured (i) for passage of the lumen with the inlet port and the exit port and (ii) to have a plurality of surfaces that includes at least a first outer surface and a second outer surface, the lumen having a luminal surface for releasably mounting the camera to a carrier;

positioning a plurality of lenses on the housing to collect a plurality of imaging spaces that are stitched together to form the spherical image, the plurality of lenses including a first lens on the first outer surface to collect a first imaging space and a second lens on the second outer surface to collect a second imaging space;

operably connecting a plurality of image sensors to the plurality of lenses, each of the plurality of image sensors operably connected to a respective lens in the plurality of lenses, the operably connecting including placing a first image sensor in the housing behind the first lens and a second image sensor in the housing behind the second lens;

configuring each of the image sensors for operably connecting to (i) a circuit that includes a processor and a memory on a non-transitory computer readable storage medium; and, (ii) a power source; and, defining a plurality of blind spaces, n, each of which includes a blind area on the housing, the plurality of blind spaces including an inlet port blind space that is at least substantially excluded from the plurality of imaging spaces, the inlet port blind space including the inlet port of the lumen; and, an outlet port blind space that is at least substantially excluded from the plurality of imaging spaces, the outlet port blind space including the outlet port of the lumen;

further defining the plurality of blind spaces, n, to include (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing; and, integrating a plurality of light sources, n–x, where x ranges from 0 to (n–4), into the plurality of blind spaces, the integrating including placing each plurality of light sources in a respective blind space in the plurality of blind spaces such that each light in the plurality of light sources is invisible to the camera when acquiring the plurality of imaging spaces, the placing including installing a first light source in the first blind area and a second light source in the second blind area;

wherein, the camera functions to provide a desired amount of lighting for the capture of the spherical image
(i) without the plurality of light sources being visible to the camera; and,
(ii) without creating shadows in the spherical image from the camera.

2. The method of claim 1, further comprising selecting the carrier to include a wire, rope, cable, rod, or optical fiber.

3. The method of claim 1, wherein the selecting includes selecting the housing to be a 4-sided, 5-sided, 6-sided, 8-sided, 12-sided, or 20-sided polyhedron.

4. The method of claim 1, wherein the selecting includes selecting the housing to be a cuboctahedron.

5. The method of claim 1, wherein the selecting includes selecting the housing to be a snub cuboctahedron.

6. The method of claim 1, wherein the selecting includes selecting the housing to be a sphere.

7. The method of claim 1, wherein the selecting includes selecting the housing to be a capsule.

8. A 360 degree camera having both an integrated lighting array and a lumen for mounting, moving, and/or cooling the camera, the lighting array configured in a manner that is invisible to the camera when acquiring a spherical image, the camera including:

a housing having a plurality of surfaces that includes at least a first outer surface, and a second outer surface, the housing configured (i) for passage of the lumen having an inlet port and an exit port and (ii) to have a plurality of surfaces that includes at least a first outer surface and a second outer surface;

a plurality of lenses on the housing, the plurality of lenses configured to collect a plurality of imaging spaces that are stitched together to form the spherical image, the plurality of lenses including at least a first lens on the first outer surface and a second lens on the second outer surface; wherein, the first lens is configured to obtain a first image data set corresponding to a first imaging space and the second lens is configured to obtain a second image data set corresponding to a second imaging space;

a plurality of image sensors in the housing, each of the plurality of image sensors configured for operably connecting to
a respective lens in the plurality of lenses, the plurality of image sensors including at least a first image sensor placed in the camera housing behind the first lens and a second image sensor placed in the camera housing behind the second lens;

a circuit that includes a processor and a memory on a non-transitory computer readable storage medium;

a power source; and, a plurality of blind spaces, n, each of which include a blind area on the housing, the plurality of blind spaces including an inlet port blind space that is at least substantially excluded from the plurality of imaging spaces, the inlet port blind space including the inlet port of the lumen; and, an outlet port blind space that is at least substantially excluded from the plurality of imaging spaces, the outlet port blind space including the outlet port of the lumen;

wherein, the plurality of blind spaces, n, further includes (i) a first blind space that is at least substantially excluded from the plurality of imaging spaces, the first blind space including a first blind area on the housing; and, (ii) a second blind space that is at least substantially excluded from the plurality of imaging spaces, the second blind space including a second blind area on the housing; and, a plurality of light sources, n–x, where x ranges from 0 to (n–4), placed in the plurality of blind spaces such that each light in the plurality of light sources is invisible to the camera when acquiring the plurality of imaging spaces, a first light source placed in the first blind area and a second light source placed in the second blind area;

wherein, the camera functions to provide a desired amount of lighting for the capture of the spherical image
(i) without the plurality of light sources being visible to the camera; and,
(ii) without creating shadows in the spherical image from the camera.

9. The camera of claim 8, wherein the housing is a 4-sided, 5-sided, 6-sided, 8-sided, 12-sided, or 20-sided polyhedron.

10. The camera of claim 8, wherein the housing is a cuboctahedron.

11. The camera of claim 8, wherein the housing is a snub cuboctahedron.

12. The camera of claim 8, wherein the housing is a sphere.

13. The camera of claim 8, wherein the housing is a capsule.

14. A system comprising:
    the camera of claim 8; and,
    a carrier.

15. The system of claim 14, wherein the carrier comprises a means for mounting the camera at a desired location to obtain the spherical image.

16. The system of claim 14, wherein the carrier is selected from the group consisting of a wire, rope, cable, rod, or optical fiber.

17. A method of mounting and/or moving the camera of claim 8 at a desired location for obtaining the spherical image, the method comprising:
    installing a carrier to at least a single point of attachment for mounting the camera at a desired location to obtain the spherical image, the carrier including at least a first point of attachment; and,
    releasably attaching the carrier to the camera, the releasably attaching including inserting the carrier in and/or through the lumen.

18. The method of claim 17, further comprising moving the camera to a second desired location.

19. The method of claim 17, further comprising selecting the carrier to include a wire, rope, cable, rod, or optical fiber.

* * * * *